(12) United States Patent
Takenaka et al.

(10) Patent No.: US 9,221,439 B2
(45) Date of Patent: Dec. 29, 2015

(54) ROAD SURFACE FRICTIONAL COEFFICIENT ESTIMATING APPARATUS

(75) Inventors: Toru Takenaka, Wako (JP); Yoshihiro Mori, Wako (JP); Hiroyuki Urabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1409 days.

(21) Appl. No.: 12/704,081

(22) Filed: Feb. 11, 2010

(65) Prior Publication Data
US 2010/0211255 A1 Aug. 19, 2010

(30) Foreign Application Priority Data

Feb. 16, 2009 (JP) .................................. 2009-032570
Feb. 16, 2009 (JP) .................................. 2009-032571

(51) Int. Cl.
*G06F 7/00* (2006.01)
*B60T 8/172* (2006.01)
*B60W 40/068* (2012.01)

(52) U.S. Cl.
CPC .............. *B60T 8/172* (2013.01); *B60W 40/068* (2013.01); *B60T 2210/12* (2013.01); *B60T 2230/02* (2013.01)

(58) Field of Classification Search
CPC .......... B60W 10/184; B60W 2520/10; B60W 2520/125; B60W 10/06; B60W 2540/106; B60W 2550/148; B60W 2710/18; B60T 2201/16; B60T 2230/02; B60T 2270/86; B60T 8/1755; B60T 8/17551; B60T 8/246
USPC .................... 701/72; 180/167, 412; 303/140; 152/534; 280/124.134; 318/432; 123/339.18
See application file for complete search history.

(56) References Cited

U.S. PATENT DOCUMENTS

| 6,285,944 B1* | 9/2001 | Tange .................... B60K 28/16 180/167 |
| 6,456,920 B1* | 9/2002 | Nishio ................ B60T 8/17551 303/140 |
| 2003/0074127 A1 | 4/2003 | Kin et al. |
| 2004/0026001 A1* | 2/2004 | Kohno .................. B60C 9/2009 152/534 |

(Continued)

FOREIGN PATENT DOCUMENTS

| DE | 10156823 | 6/2002 |
| DE | 102006054805 | 5/2008 |

(Continued)

*Primary Examiner* — James Trammell
*Assistant Examiner* — Sanjeev Malhotra
(74) *Attorney, Agent, or Firm* — Rankin, Hill & Clark LLP

(57) ABSTRACT

A road surface frictional coefficient estimating apparatus includes a device which determines a first estimated value of a to-be-compared external force acting on a vehicle due to the resultant force of road surface reaction forces using a determined frictional coefficient estimated value and the like, and a device which determines a second estimated value of the to-be-compared external force from the observed value of motional state amounts of the vehicle that define an inertial force corresponding to the to-be-compared external force. The estimated value of a road surface frictional coefficient is updated based on the difference between the first estimated value and the second estimated value. When the first estimated value and the second estimated value have opposite polarities, the updating of the estimated value of the road surface frictional coefficient based on the difference is not carried out.

26 Claims, 16 Drawing Sheets

(56) References Cited

U.S. PATENT DOCUMENTS

| | | | |
|---|---|---|---|
| 2004/0201196 A1* | 10/2004 | Katagiri | B60G 7/02 280/124.134 |
| 2006/0001392 A1* | 1/2006 | Ajima | B62D 5/046 318/432 |
| 2006/0042860 A1* | 3/2006 | Endo | B62D 6/008 180/412 |
| 2006/0129300 A1* | 6/2006 | Ishimoto | B60T 8/1755 701/72 |
| 2010/0206266 A1* | 8/2010 | Tsunooka | F02D 31/003 123/339.18 |

FOREIGN PATENT DOCUMENTS

| | | |
|---|---|---|
| EP | 1407950 | 4/2004 |
| EP | 1627790 | 2/2006 |
| EP | 1950113 | 7/2008 |
| JP | 2000-025599 | 1/2000 |
| JP | 2003-118554 | 4/2003 |

* cited by examiner

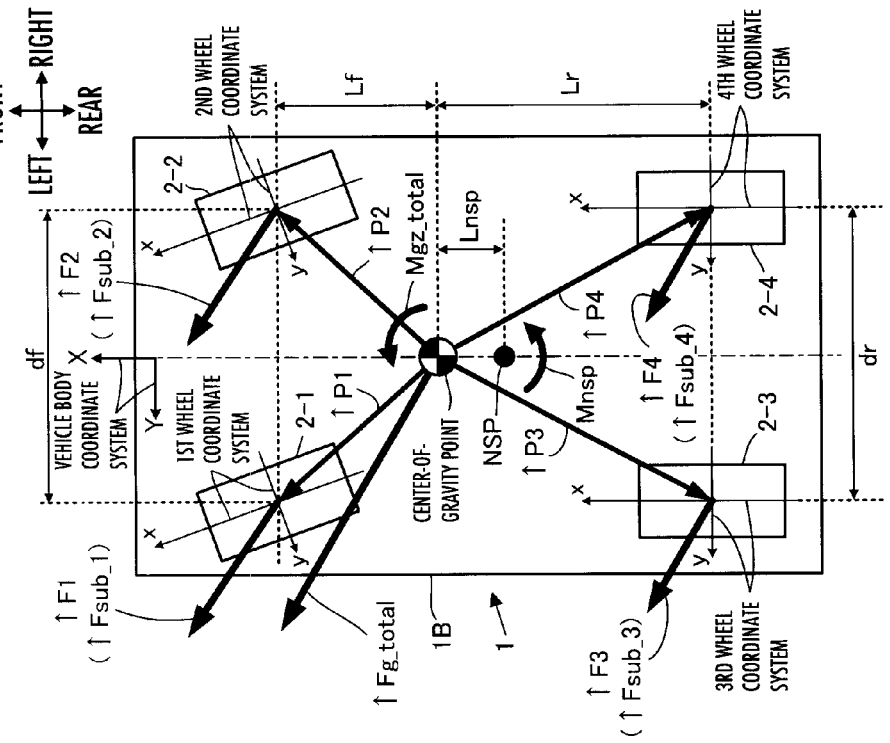
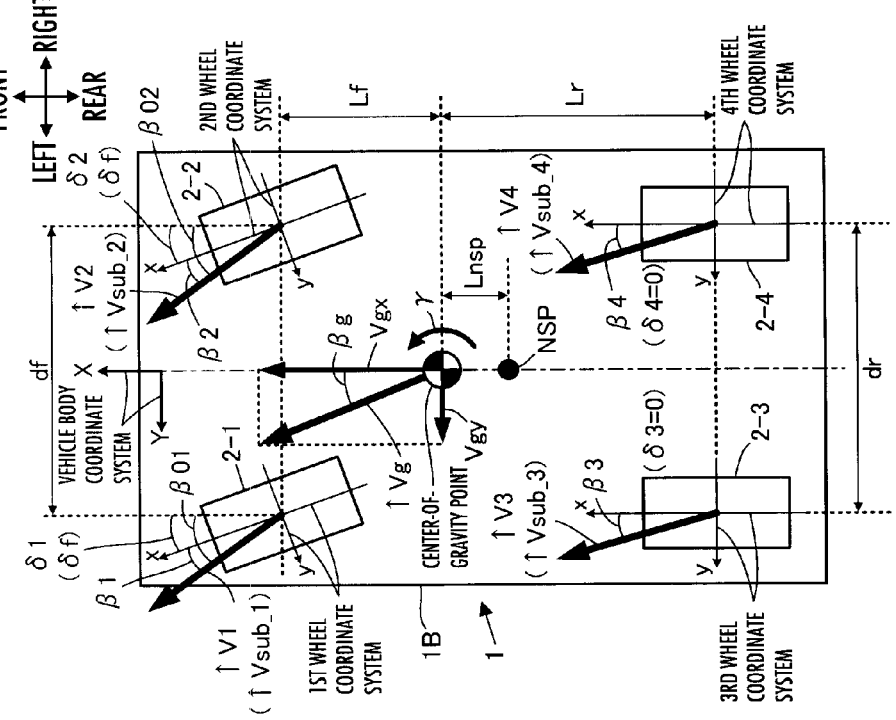

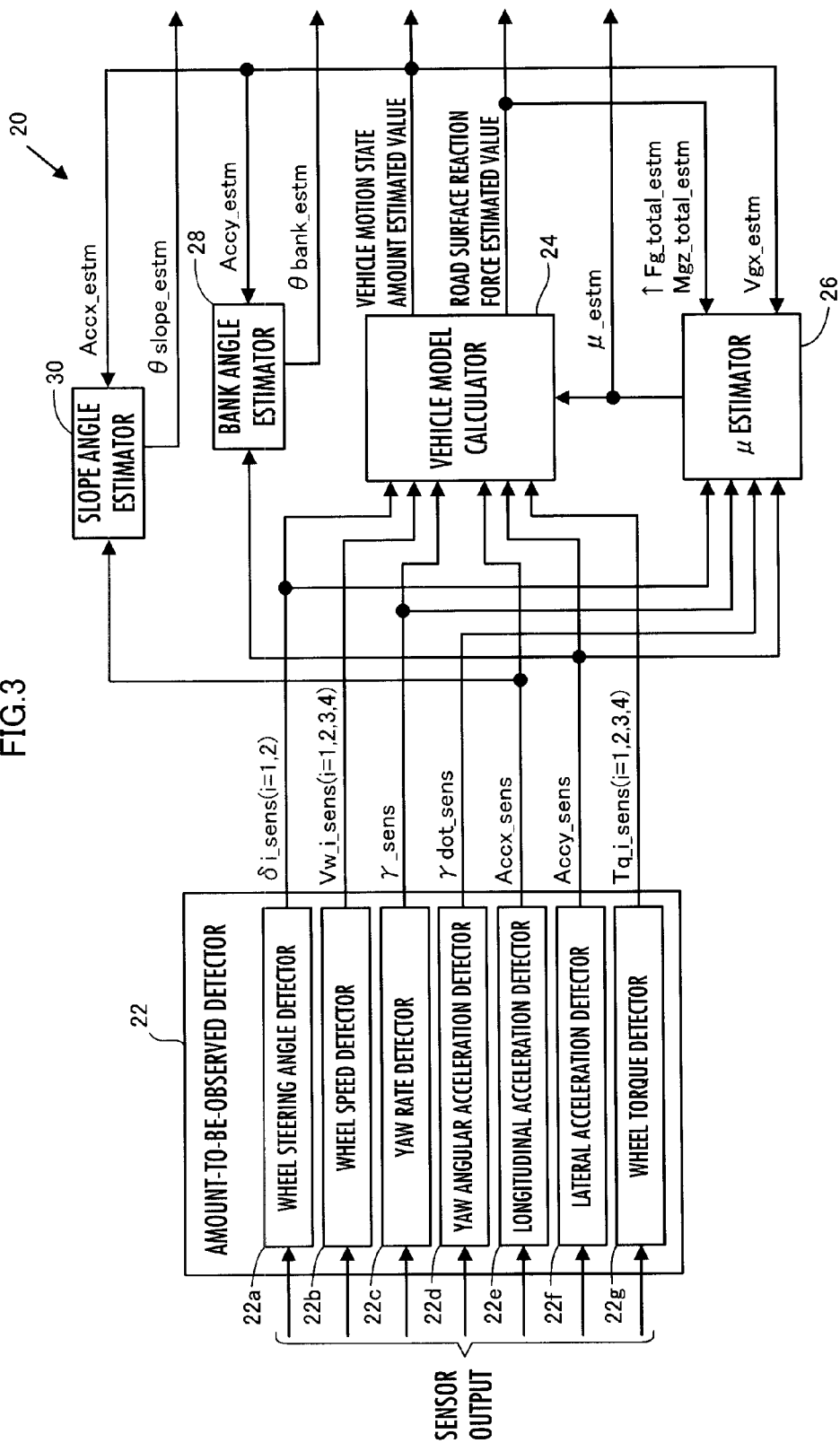

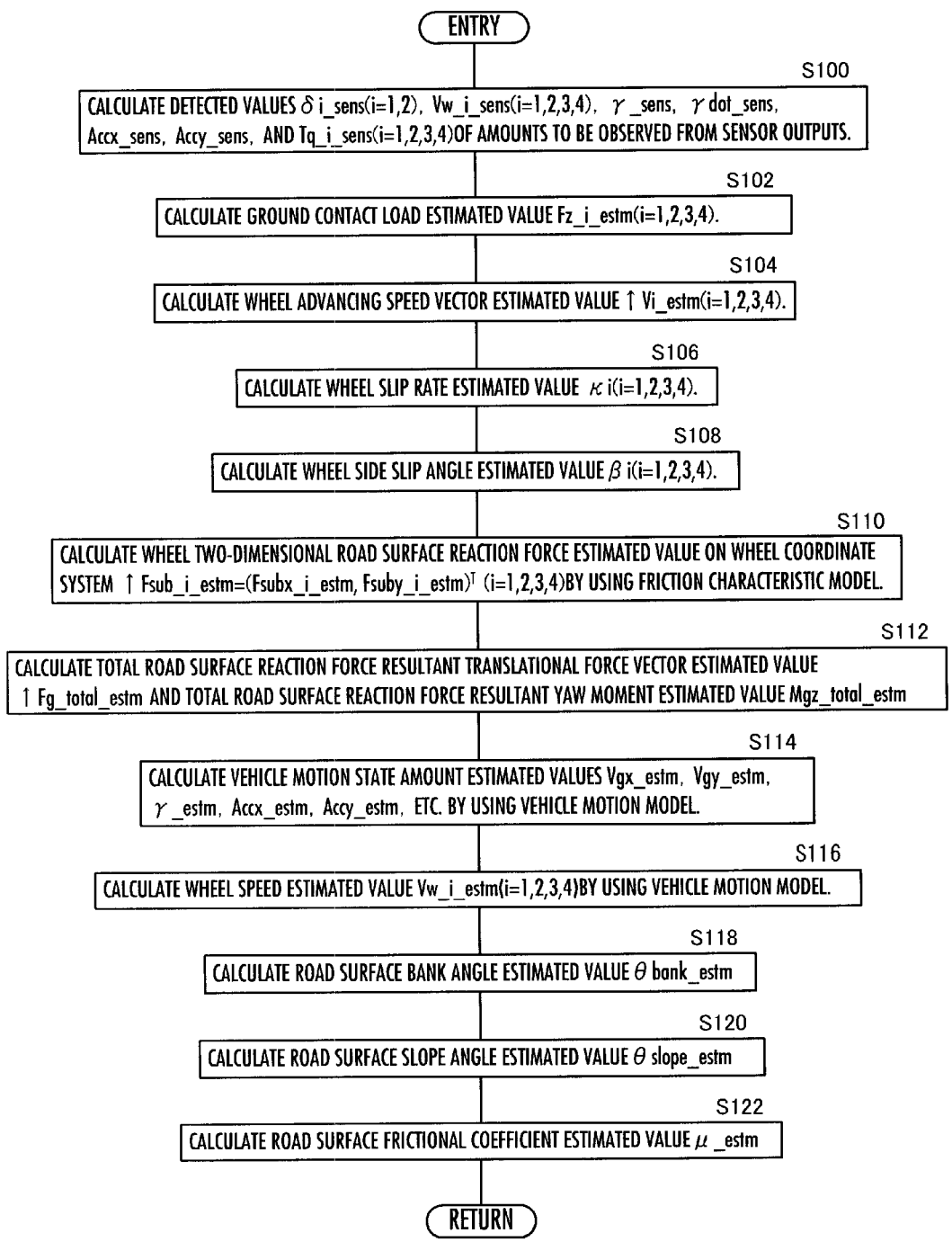

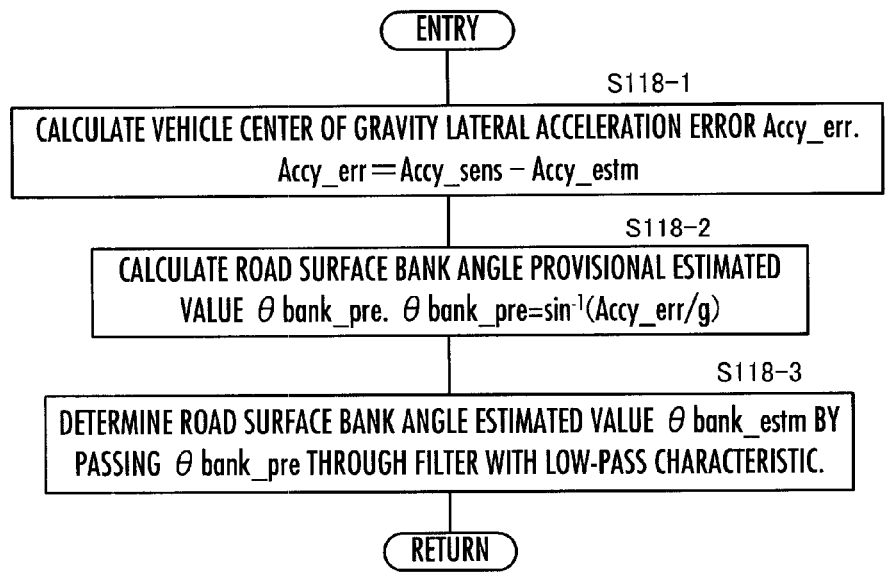
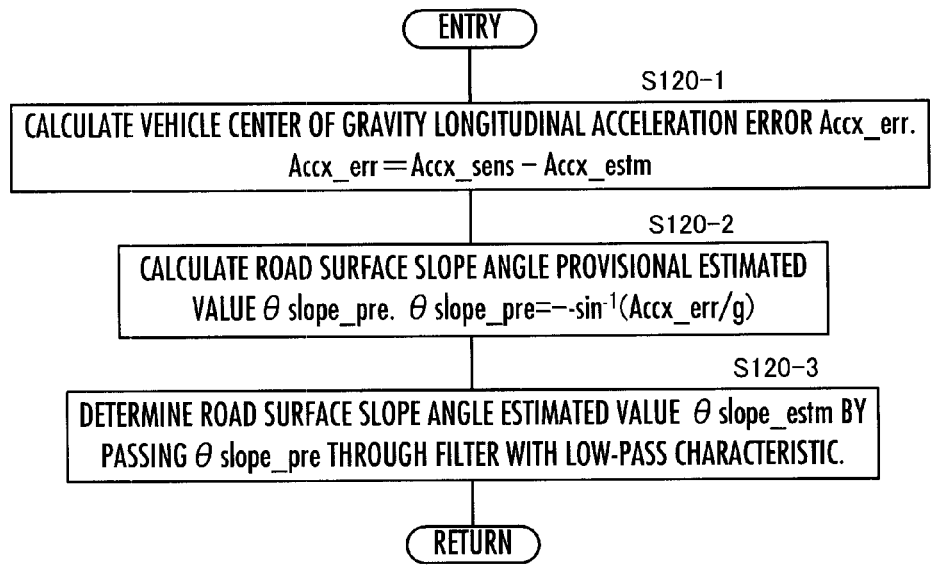

ROAD SURFACE FRICTIONAL COEFFICIENT ESTIMATING APPARATUS

BACKGROUND OF THE INVENTION

1. Field of the Invention

The present invention relates to a road surface frictional coefficient estimating apparatus which estimates the frictional coefficient of a road surface on which a vehicle is traveling.

2. Description of the Related Art

As techniques for estimating the frictional coefficient (hereinafter referred to simply as "µ" in some cases) of a road surface on which a vehicle is traveling, the techniques disclosed in, for example, JP Patent Publication No. 3669668 (hereinafter referred to as "patent document 1") and Japanese Patent Application Laid-Open No. 2003-118554 (hereinafter referred to as "patent document 2") have been proposed by the present applicant.

According to the technique disclosed in patent document 1, a road surface reaction force acting on each wheel from a road surface (a cornering force (a lateral force of a vehicle) and a braking/driving force (a longitudinal force of the vehicle)) is estimated using a tire characteristic set on the basis of an estimated value of µ. Then, based on the estimated value of the road surface reaction force, the estimated value of a lateral acceleration of the vehicle and the estimated value of a yaw rate change velocity of the vehicle (the yaw rate change velocity at the center of gravity of the vehicle), which are motional state amounts of the vehicle and which occur due to the resultant force of the road surface reaction forces, are calculated. Further, according to the technique disclosed in patent document 1, a previous estimated value of µ is updated on the basis of the difference between the value of the lateral acceleration detected by an acceleration sensor and the estimated value of the lateral acceleration or the difference between the differential value of the yaw rate values detected by the yaw rate sensor (the detected value of the yaw rate change velocity) and the estimated value of the yaw rate change velocity, whichever difference is greater, thereby determining a new estimated value of µ.

According to the technique disclosed in patent document 2, a tire model set on the basis of the estimated value of µ is used to estimate the road surface reaction force acting on each wheel from a road surface (the cornering force and the braking/driving force). Then, based on the estimated value of the road surface reaction force, the estimated value of a lateral acceleration of the vehicle and the estimated value of the longitudinal acceleration of the vehicle indicative of the motional state amounts of the vehicle generated by the resultant force of the road surface reaction forces are calculated. According to the technique disclosed in patent document 2, in the case where a slip angle (side slip angle) of a rear wheel is small, the estimated value of µ is sequentially updated by incrementing or decrementing the estimated value of µ by a predetermined value according to a magnitude relationship between the estimated value of the longitudinal acceleration of the vehicle and the detected value of the longitudinal acceleration provided by the sensor. In the case where the slip angle of a rear wheel is large, the estimated value of µ is updated by incrementing or decrementing the estimated value of µ by a predetermined value according to the magnitude relationship between the estimated value of the lateral acceleration of the vehicle and the detected value of the lateral acceleration provided by the sensor.

The road surface reaction force acting on a wheel depends not only on µ but also on the slip rate or the side slip angle (slip angle) of a wheel. For this reason, according to the techniques disclosed in patent documents 1 and 2, the slip rate of a wheel is estimated and the side slip angle of a vehicle or the side slip angle of a wheel is also estimated using a motional model of the vehicle.

Meanwhile, the direction of the actual lateral acceleration or longitudinal acceleration of the vehicle or the direction of the yaw rate change velocity naturally is not always fixed to a certain direction. Hence, the estimated value of each of the lateral acceleration, the longitudinal acceleration, and the yaw rate change velocity (the estimated value of µ and the value obtained by using a model, such as a wheel friction characteristic model) or the detected value thereof (the value obtained by a sensor) will have positive or negative polarity indicative of the direction of each of the lateral acceleration, the longitudinal acceleration, and the yaw rate change velocity.

On the other hand, for example, the estimated value and the detected value of the lateral acceleration carry a meaning as the observed values obtained by observing the same object, namely, the lateral acceleration, of an actual vehicle in different ways, so that these two values should basically share the same polarity. This applies also to the relationship between the estimated value and the detected value of the longitudinal velocity and the relationship between the estimated value and detected value of a yaw rate change velocity.

Meanwhile, there are cases where, for example, if the absolute value of an actual lateral acceleration, an actual longitudinal acceleration, or an actual yaw rate change velocity of a vehicle is relatively small, the estimated value and the detected value develop polarities that are opposite to each other due to an error component included in the estimated value or the detected value. In such a case, it is highly likely that the difference between the estimated value and the detected value contains relatively many unwanted components that are not dependant upon an error of an estimated value of µ used to determine the estimated value.

According to the technique disclosed in patent document 1 described above, the polarities of the lateral acceleration and the yaw rate change velocity used for estimating µ are not taken into account. Similarly, the technique disclosed in patent document 2 described above does not consider the polarities of the lateral acceleration and the longitudinal acceleration of the vehicle used for estimating µ.

Hence, according to the aforesaid techniques disclosed in patent documents 1 and 2, in the situation wherein the estimated value and the detected value of each of the lateral acceleration, the longitudinal acceleration and the yaw rate change velocity of the vehicle have polarities that are opposite to each other due to the influence of error components contained therein, the estimated value of µ may be inconveniently subjected to improper updating based on the difference. In other words, there is an inconvenient case where the estimated value of µ is improperly updated on the basis of the difference in the situation wherein it is highly likely that the dependency of the difference between the estimated value and the detected value upon an error of an estimated value of µ is low. Inconveniently, therefore, according to the techniques disclosed in patent documents 1 and 2, the estimated value of µ develops unstable changes, i.e., the estimated value diverges, or the accuracy of the estimated value deteriorates.

Further, the difference between the estimated value and the detected value of the lateral acceleration and the difference between the estimated value and the detected value of the yaw rate change velocity are also susceptible to an estimation error or the like of a side slip motional state amount of the vehicle in addition to an error of an estimated value of µ. For this reason, even if the estimated value of μ is updated on the basis of the aforesaid difference on the lateral acceleration or the aforesaid difference on the yaw rate change velocity, the error of the estimated value of μ may not be properly reflected. In such a case, it is difficult to determine the estimated value of μ accurately and stably.

In addition, according to a finding of the present inventor, the change rate of the lateral acceleration, the longitudinal acceleration or the yaw rate change velocity relative to a change in the μ of a road surface, i.e., the sensitivity of the lateral acceleration, the longitudinal acceleration or the yaw rate change velocity in response to a change in the μ, changes according to a behavior state or the like of the vehicle. In a situation wherein the sensitivity is low (in a situation wherein the sensitivity is close to zero), the dependency of the difference between the estimated value and the detected value of each of the lateral acceleration, the longitudinal acceleration or the yaw rate change velocity of the vehicle will be low. Hence, in the situation wherein the sensitivity of the lateral acceleration, the longitudinal acceleration or the yaw rate change velocity in response to a change in the μ is low, it is considered desirable to restrain the updating of the estimated value of μ on the basis of the difference between the estimated value and the detected value of each of the lateral acceleration, the longitudinal acceleration or the yaw rate change velocity of the vehicle or on the basis of a magnitude relationship between the estimated value and the detected value.

However, the techniques disclosed in patent documents 1 and 2 mentioned above do not take the aforesaid sensitivity into account. This leads to a possibility that the estimated value of μ is undesirably updated unduly even when the sensitivity of the lateral acceleration, the longitudinal acceleration or the yaw rate change velocity in response to a change in μ is low. As a result, the estimated value of μ inconveniently exhibits unstable changes or the accuracy of the estimated value of the μ undesirably deteriorates.

SUMMARY OF THE INVENTION

The present invention has been made in view of the background described above, and an object of the present invention is to provide a road surface frictional coefficient estimating apparatus capable of estimating the frictional coefficient of a road surface on which a vehicle is traveling while restraining an estimated value of the frictional coefficient from developing unstable changes and also restraining deterioration in the accuracy of the estimated value.

To this end, a road surface frictional coefficient estimating apparatus in accordance with the present invention is a road surface frictional coefficient estimating apparatus which estimates a frictional coefficient of a road surface on which a vehicle is traveling while updating the frictional coefficient, including:

a first estimator of a to-be-compared external force which defines a predetermined type of external force component acting on a vehicle due to the resultant force of road surface reaction forces acting on each wheel of the vehicle from a road surface as an external force to be compared and determines a first estimated value of the to-be-compared external force by using a friction characteristic model indicating a relationship between a slip between a wheel of the vehicle and the road surface and a road surface reaction force, an estimated value of a frictional coefficient already determined, and an observed value of a predetermined type of amount to be observed, which is related to a behavior of the vehicle;

a second estimator of a to-be-compared external force which determines a value of an external force component balancing out an inertial force corresponding to the to-be-compared external force on the basis of an observed value of a motional state amount of the vehicle that defines the inertial force, which is a part of an inertial force generated by a motion of the vehicle, and obtains the determined value of the external force component as a second estimated value of the to-be-compared external force;

a frictional coefficient increasing/decreasing manipulated variable determiner which determines an increasing/decreasing manipulated variable of an estimated value of the frictional coefficient of the road surface on the basis of at least the first estimated value and the second estimated value; and a frictional coefficient estimated value updater which determines a new estimated value of a frictional coefficient by updating the estimated value of the frictional coefficient of the road surface on the basis of the increasing/decreasing manipulated variable, wherein the frictional coefficient increasing/decreasing manipulated variable determiner comprises an updating cancellation condition determiner which determines whether or not a predetermined updating cancellation condition applies, the condition including at least a condition that the first estimated value and the second estimated value have opposite polarities against each other, and determines the increasing/decreasing manipulated variable on the basis of at least a difference between the first estimated value and the second estimated value such that the difference therebetween is converged to zero provided that at least a determination result of the updating cancellation condition determiner is negative, and determines either zero or a manipulated variable of a predetermined value for incrementing the estimated value of the frictional coefficient as the increasing/decreasing manipulated variable in the case where the determination result is affirmative (a first aspect of the invention).

The term "observed value" in the present invention means a detected value directly observed from a sensor output or an estimated value indirectly observed by using an appropriate model or a natural law from one or more sensor outputs related to an amount to be observed. This applies to other aspects of the invention, which will be discussed hereinafter, in addition to the first aspect of the invention.

According to the first aspect of the invention, the first estimator of the to-be-compared external force determines the estimated value of the to-be-compared external force by using a friction characteristic model indicating a relationship between a slip between a wheel of a vehicle and a road surface and a road surface reaction force, the estimated value of the frictional coefficient that has already been determined (hereinafter referred to as "the determined estimated value" in some cases), and the observed value of a predetermined type of amount to be observed, which is related to a behavior of the vehicle.

Thus, the first estimated value is determined as the value of the to-be-compared external force identified depending upon the determined estimated value of the frictional coefficient.

In this case, more specifically, the road surface reaction force acting on each wheel of the vehicle can be estimated by identifying, i.e., estimating, the aforesaid slip in the friction characteristic model from the observed value of the predetermined type of the amount to be observed, which is related to a behavior of the vehicle, then supplying the identified slip and the determined estimated value of the frictional coefficient to the friction characteristic model. Then, the value of the to-be-compared external force determined from the estimated road surface reaction force may be obtained as a first estimated value.

Hence, the observed value of the predetermined type of amount to be observed may be the observed value of an amount to be observed that is necessary to identify the slip between a wheel and a road surface in the friction characteristic model. The amount to be observed is selected beforehand according to the construction of the friction characteristic model.

For example, a slip rate of each wheel, a side slip angle, or the like may be used as an index value indicative of the slip between a wheel and a road surface. Similarly, for example, a translational force in a predetermined direction acting on the entire vehicle due to the road surface reaction force, a moment about a predetermined axis, or the like may be used as the to-be-compared external force.

The determined estimated value of the frictional coefficient is preferably a latest value among determined estimated values. However, the value may be older than the latest value if the value lies in a sufficiently short time of period wherein the estimated value of the frictional coefficient is maintained substantially constant.

Meanwhile, the second estimator of to-be-compared external force determines the value of an external force component that balances out an inertial force from an observed value of a motional state amount of the vehicle that defines the inertial force corresponding to the to-be-compared external force in the inertial force produced by a motion of the vehicle. The second estimator then obtains the determined value of the external force component as a second estimated value of the to-be-compared external force.

This makes it possible to determine the second estimated value of the to-be-compared external force from the observed value of the motional state amount of the vehicle that defines the inertial force corresponding to the to-be-compared external force without using the estimated value of the frictional coefficient of a road surface.

The first aspect of the invention determines an increasing/decreasing manipulated variable of the estimated value of the frictional coefficient of the road surface by the frictional coefficient increasing/decreasing manipulated variable determiner on the basis of at least the first estimated value and the second estimated value. Further, the first aspect of the invention updates the estimated value of the frictional coefficient of a road surface by the frictional coefficient estimated value updater updates the estimated value of the frictional coefficient of a road surface on the basis of the increasing/decreasing manipulated variable. Thus, a new estimated value of the frictional coefficient is determined.

Here, the first estimated value and the second estimated value mentioned above carry a meaning as the estimated values of the same to-be-compared external force. Therefore, if the first estimated value and the second estimated value have polarities that are opposite from each other, then at least one of the first estimated value and the second estimated value is likely to exhibit low reliability as the estimated value of the to-be-compared external force. This means that the difference between the first estimated value and the second estimated value is highly unlikely to properly reflect an error of the determined estimated value of the frictional coefficient.

According to the first aspect of the invention, therefore, the frictional coefficient increasing/decreasing manipulated variable determiner determines by the updating cancellation condition determiner whether a predetermined updating cancellation condition, which includes at least a condition that the first estimated value and the second estimated value have polarities that are opposite from each other, applies.

The frictional coefficient increasing/decreasing manipulated variable determiner determines the increasing/decreasing manipulated variable on the basis of at least the difference between the first estimated value and the second estimated value such that the difference therebetween is converged to zero, provided that the determination result of at least the updating cancellation condition determiner is negative. If the determination result is affirmative, then the frictional coefficient increasing/decreasing manipulated variable determiner determines either zero or a manipulated variable of a predetermined value for incrementing the estimated value of the frictional coefficient as the increasing/decreasing manipulated variable.

Thus, according to the first aspect of the invention, if the first estimated value and the second estimated value have opposite polarities and the difference therebetween is highly unlikely to properly reflect an error of a determined estimated value of the frictional coefficient, then the increasing/decreasing manipulated variable will not be determined on the basis of the difference. To be more specific, the increasing/decreasing manipulated variable will be determined to zero or the manipulated variable of the predetermined value for increasing the estimated value of the frictional coefficient without depending upon the difference.

As a result, in the case where the first estimated value and the second estimated value have polarities opposite to each other, it is possible to prevent the estimated value of the frictional coefficient from being updated on the basis of an improper increasing/decreasing manipulated variable. This allows the frictional coefficient to be estimated while restraining the estimated value of the frictional coefficient of a road surface on which the vehicle is traveling from developing unstable changes or restraining the accuracy of the estimated value from deteriorating.

According to the first aspect of the invention, preferably, in the case where the determination result given by the updating cancellation condition determiner has changed from "affirmative" over to "negative," the frictional coefficient increasing/decreasing manipulated variable determiner determines the increasing/decreasing manipulated variable on the basis of at least the difference, provided that a status wherein the determination result remains negative lasts for predetermined time or more after the changeover, and determines, as the increasing/decreasing manipulated variable, either zero or a manipulated variable of a predetermined value for incrementing the estimated value of the frictional coefficient until a status in which the determination result is negative lasts for the predetermined time (a second aspect of the invention).

More specifically, when the determination result given by the updating cancellation condition determiner has changed from affirmative to negative, the changeover may have been temporarily caused by a change in an error component included in the first estimated value or the second estimated value. In such a case, the difference between the first estimated value and the second estimated value is highly likely to be still least dependent upon the error of the determined estimated value of the frictional coefficient.

According to the second aspect of the invention, therefore, determining the increasing/decreasing manipulated variable on the basis of the difference is not carried out until the status wherein at least the determination result of the updating cancellation condition determiner is negative lasts for the predetermined time. To be more specific, in this status, the increasing/decreasing manipulated variable is determined to be zero or the aforesaid predetermined value, as with the case where the determination result is affirmative.

This arrangement makes it possible to securely prevent the estimated value of the frictional coefficient of a road surface on which a vehicle is traveling from developing unstable changes and to securely prevent the accuracy of the estimated value from deteriorating immediately after the status in which the determination result of the updating cancellation condition determiner is affirmative is switched to the status in which the determination result is negative.

In the first aspect and the second aspect of the invention described above, the updating cancellation condition preferably further includes a condition that at least one of the first estimated value and the second estimated value lies within a predetermined range that has been preset as a range in the vicinity of zero (a third aspect of the invention).

More specifically, in the situation wherein the magnitude of the actual value of the to-be-compared external force is zero or close thereto, the first estimated value or the second estimated value tends to include relatively many error components (i.e., the situation wherein the S/N ratio of the first estimated value or the second estimated value tends to decrease). In such a case, the difference between the first estimated value and the second estimated value is highly likely to be still least dependent upon the error of the determined estimated value of the frictional coefficient.

According to the third aspect of the invention, therefore, the updating cancellation condition applies not only in the case where the first estimated value and the second estimated value have polarities that are opposite to each other but also in the case where at least one of the first estimated value and the second estimated value falls within the aforesaid predetermined range in the vicinity of zero.

This arrangement makes it possible to securely prevent the estimated value of the frictional coefficient of a road surface on which a vehicle is traveling from developing unstable changes and also to securely prevent the accuracy of the estimated value from deteriorating in the situation wherein the magnitude of the actual value of the to-be-compared external force is zero or close thereto (i.e., the S/N ratio of the first estimated value or the second estimated value tends to lower).

In the road surface frictional coefficient estimating apparatus according to the present invention, in the case where the updating cancellation condition includes a plurality of conditions, if the determination result of the updating cancellation condition determiner is affirmative, then it means that at least one of the plurality of conditions applies. This will apply to other aspects of the invention, which will be discussed hereinafter, in addition to the third aspect of the invention.

Preferably, the first to the third aspects of the invention include a μ sensitivity calculator which determines the value of a μ sensitivity which indicates the ratio of an incremental amount of the to-be-compared external force relative to an incremental amount of the frictional coefficient of a road surface, or the value of a μ sensitivity obtained by dividing the ratio by the value of the frictional coefficient of the road surface, wherein the updating cancellation condition further includes a condition that the value of the μ sensitivity has a polarity that is opposite from that of at least one of the first estimated value and the second estimated value (a fourth aspect of the invention).

Here, according to the study by the inventor of the present application, if an appropriate type of external force component is selected as the to-be-compared external force, then the actual value of the to-be-compared external force tends to carry the same polarity as that of the value of the μ sensitivity. Therefore, if at least one of the first estimated value and the second estimated value has a polarity opposite from that of the value of the μ sensitivity, then the first estimated value or the second estimated value includes relatively many error components. Consequently, the dependency of the difference between the first estimated value and the second estimated value is highly likely to be low relative to an error of a determined estimated value of the frictional coefficient.

According to the fourth aspect, therefore, the updating cancellation condition is applied not only in the case where the first estimated value and the second estimated value have polarities that are opposite to each other but also in the case where the value of the μ sensitivity has a polarity opposite from that of at least one of the first estimated value and the second estimated value. This arrangement makes it possible to securely prevent the estimated value of the frictional coefficient of a road surface on which a vehicle is traveling from developing unstable changes and also securely prevent the accuracy of the estimated value from deteriorating.

In the fourth aspect of the invention, an appropriate example of the to-be-compared external force may be a moment about a yaw axis at a predetermined point (e.g., a neutral steer point, which will be described later) of a vehicle or the resultant force of the road surface reaction forces (a driving/braking force and a lateral force, or lateral forces) acting on a front wheel of the vehicle.

In the aforesaid fourth aspect of the invention, the updating cancellation condition preferably further includes a condition that the value of the μ sensitivity is a value within a predetermined range that has been preset as a range in the vicinity of zero (a fifth aspect of the invention).

More specifically, the value of the μ sensitivity being close to zero means that the sensitivity of change in the value of the to-be-compared external force relative to a change in the frictional coefficient of a road surface is low, that is, it is difficult for a change in the frictional coefficient to be reflected on the value of the to-be-compared external force. In such a situation, an error of the determined estimated value of the frictional coefficient is hardly reflected on the difference between the first estimated value and the second estimated value.

According to the fifth aspect of the invention, therefore, the updating cancellation condition is applied also in the case where the value of the μ sensitivity lies within a predetermined range in the vicinity of zero. This arrangement makes it possible to securely prevent the estimated value of the frictional coefficient of a road surface on which a vehicle is traveling from developing unstable changes and also securely prevent the accuracy of the estimated value from deteriorating in the situation wherein a change in the frictional coefficient is hardly reflected on the value of a to-be-compared external force.

Further, in the fourth or the fifth aspect of the invention in which the value of the μ sensitivity is used in the processing carried out by the updating cancellation condition determiner, when determining the increasing/decreasing manipulated variable on the basis of the aforesaid difference, the frictional coefficient increasing/decreasing manipulated variable determiner preferably determines the increasing/decreasing manipulated variable on the basis of the difference and the value of the μ sensitivity (a sixth aspect of the invention).

More specifically, as the value of the μ sensitivity becomes closer to zero, the actual to-be-compared external force becomes less susceptible to the influence of a change in the frictional coefficient of an actual road surface. Hence, it is considered desirable to decrease the magnitude of a gain value (feedback gain), which indicates the ratio of a change in the increasing/decreasing manipulated variable relative to a change in the difference between the first estimated value and the second estimated value, as the magnitude of the μ sensitivity decreases in the case where the increasing/decreasing manipulated variable is determined on the basis of the difference.

According to the sixth aspect of the invention, therefore, the increasing/decreasing manipulated variable is determined on the basis of the difference and the value of the μ sensitivity. This arrangement makes it possible to determine the increasing/decreasing manipulated variable such that the magnitude of the gain value decreases as the magnitude of the μ sensitivity decreases. Consequently, it is possible to prevent the estimated value of the frictional coefficient from being unduly changed in the situation wherein the magnitude of the μ sensitivity decreases.

In the sixth aspect of the invention, more specifically, in the case of determining the increasing/decreasing manipulated variable on the basis of the difference, the frictional coefficient increasing/decreasing manipulated variable determiner preferably determines the increasing/decreasing manipulated variable on the basis of the product of the difference and the μ sensitivity, namely, the product of the value of the difference and the value of the μ sensitivity or the product of the difference and the μ sensitivity, namely, the product of the difference and a μ-sensitivity-dependent value, which is obtained by passing the value of the μ sensitivity through one or both of a third filter for regulating frequency components and a saturation characteristic element (a seventh aspect of the invention).

As the third filter, filters having a high-cut characteristic (low-pass characteristic), a low-cut characteristic (high-pass characteristic) or a band-pass characteristic may be used. Further, the saturation characteristic element is an element that has a characteristic in which the ratio of a change in an output of the saturation characteristic element relative to a change in the value of the μ sensitivity decreases as the magnitude of the value (absolute value) of the μ sensitivity increases. In this case, the ratio of the change in the output of the saturation characteristic element relative to the change in the value of the μ sensitivity may change continuously or discontinuously with a changing magnitude of the value of the μ sensitivity.

According to the seventh aspect of the invention, the product of the difference and the μ sensitivity approaches zero as the magnitude of the value of the μ sensitivity approaches zero. Hence, the increasing/decreasing manipulated variable can be determined such that the magnitude of the gain value decreases as the value of the μ sensitivity approaches zero by determining the increasing/decreasing manipulated variable on the basis of the product of the difference and the μ sensitivity.

Further, in the seventh aspect of the invention, more specifically, the frictional coefficient increasing/decreasing manipulated variable determiner preferably determines the increasing/decreasing manipulated variable on the basis of the product of the difference and the μ sensitivity such that the increasing/decreasing manipulated variable is proportional to the product of the difference and the μ sensitivity (an eighth aspect of the invention).

According to the eighth aspect of the invention, the increasing/decreasing manipulated variable will be proportional to the product of the difference and the μ sensitivity. Hence, the increasing/decreasing manipulated variable will be determined to approach zero as the value of the μ sensitivity approaches zero.

Further, in the first to the eighth aspects of the invention, the to-be-compared external force is ideally a moment about a yaw axis at a neutral steer point (hereinafter referred to as "NSP" in some cases) of a vehicle (hereinafter referred to as "the NSP yaw moment" in some cases) (a ninth aspect of the invention).

According to a finding of the inventor of the present application, the NSP yaw moment is dependent upon the frictional coefficient of a road surface while at the same time almost immune to the influence of the state amount of the side slip motion of the center of gravity of the vehicle or the bank angle of the road surface. For this reason, when the NSP yaw moment is defined as the to-be-compared external force, the difference between the first estimated value and the second estimated value will be more dependent upon an error of the determined estimated value of the frictional coefficient. Therefore, the increasing/decreasing manipulated variable that makes it possible to properly eliminate the error of the estimated value of the frictional coefficient can be determined by determining the increasing/decreasing manipulated variable on the basis of at least the difference such that the difference is converged to zero. This makes it possible to enhance the accuracy and stability of the estimated value of the frictional coefficient.

If the NSP yaw moment is used as the to-be-compared external force, as with the ninth aspect of the invention, an acceleration sensor that generates an output based on lateral acceleration of the vehicle is desirably provided and an observed value of a motional state amount of the vehicle used for determining the second estimated value of the NSP yaw moment desirably includes the observed value of the acceleration indicated by an output of the acceleration sensor (an output based on the lateral acceleration of the vehicle). This arrangement generally causes the acceleration sensor to sense also gravitational acceleration. Thus, if a road surface has a bank angle (non-zero bank angle), then the observed value of the acceleration indicated by an output of the acceleration sensor will include a component attributable to an influence of the bank angle. With this arrangement, the second estimated value of the NSP yaw moment can be properly determined, including the component attributable to the influence of the bank angle, without the need for the value of the bank angle.

Supplementally, if the NSP yaw moment is used as the to-be-compared external force, then the first estimator of a to-be-compared external force uses, for example, the observed value of a state amount related to a rotational motion about the yaw axis of the vehicle (e.g., the observed value of a yaw rate or the observed value of the temporal change rate of the yaw rate) and the value of the lateral acceleration of the vehicle indicated by an output of the acceleration sensor as the observed values of the motional state amount, thereby determining the NSP yaw moment from these observed values. If, for example, the lateral acceleration of the center-of-gravity point of the vehicle is observed (detected) by the acceleration sensor and the yaw rate of the vehicle is observed (detected) by a yaw rate sensor, then the moment combining the moment obtained by multiplying the observed value of the acceleration by the mass of the vehicle and the distance between the center-of-gravity point of the vehicle to the NSP and the moment obtained by multiplying the temporal change rate of the observed value of the yaw rate (a differential value) by the inertial moment about the yaw axis at the center-of-gravity point of the vehicle will be the second estimated value of the NSP yaw moment.

The NSP yaw moment is generated on the basis of a lateral force of a road surface reaction force acting on each wheel (a translational force component in the lateral direction of the wheel) and a driving/braking force (a translational force component in the longitudinal direction of the wheel), and is highly dependent particularly upon the lateral force. Accordingly, the second estimator of the to-be-compared external force determines the first estimated value of the NSP yaw moment, for example, as described below.

Based on the aforesaid friction characteristic model, the determined estimated value of the frictional coefficient, and the observed value of an amount to be observed, the second estimator of the to-be-compared external force estimates the lateral force of a road surface reaction force acting on each wheel of the vehicle or both the lateral force and the driving/braking force. Then, the estimated value of the lateral force or the estimated values of the lateral force and the driving/braking force are used to determine the first estimated value of the NSP yaw moment.

More specifically, the friction characteristic model used to estimate the lateral force of each wheel may be, for example, a model that indicates a relationship among the slip rate of each wheel of the vehicle or the driving/braking force of a road surface reaction force acting on the wheel, the lateral force of the road surface reaction force, a side slip angle of the wheel, and the frictional coefficient of a road surface. In this case, the amounts to be observed necessary for identifying the slip rate of each wheel or the driving/braking force and the side slip angle may be selected as the predetermined types of amounts to be observed.

Further, to estimate the lateral force of each wheel and the driving/braking force, for example, a first model that indicates a relationship among the slip rate of each wheel of the vehicle, the driving/braking force of the road surface reaction force acting on the wheel, the side slip angle of the wheel, and the frictional coefficient of a road surface and a second model that indicates a relationship among the slip rate of each wheel of the vehicle or the driving/braking force of the road surface reaction force acting on the wheel, the lateral force of the road surface reaction force, the side slip angle of the wheel, and the frictional coefficient of the road surface may be used as the friction characteristic models. In this case, the amounts to be observed necessary for identifying the slip rate of each wheel and the side slip angle may be selected as the predetermined types of amounts to be observed.

As the technique for estimating the slip rate of each wheel (or the driving/braking force) and the side slip angle, a publicly known technique may be used.

In the fourth to the eighth aspects of the invention provided with the µ sensitivity calculator, in the case where the NSP yaw moment is used as the to-be-compared external force, the µ sensitivity calculator preferably determines the value of the µ sensitivity by linearly coupling the observed value of a steering angle of a steering control wheel among the wheels of the vehicle and the observed value of the yaw rate of the vehicle (a tenth aspect of the invention).

More specifically, according to the study by the inventor of the present application, in a state wherein the vehicle is traveling straight or in a state similar thereto, that is, if the actual yaw rate and side slip angle of the vehicle are both zero or close to zero, then the magnitude of the µ sensitivity tends to decrease. Further, the µ sensitivity can be approximately estimated by linearly coupling the observed value of the steering angle of a steering control wheel of the wheels of the vehicle and the observed value of the yaw rate of the vehicle. In this case, the µ sensitivity determined by the linear coupling will be zero or close thereto without being influenced by a bank angle or the like of a road surface in a situation wherein the vehicle is traveling straight or nearly straight.

Thus, according to the tenth aspect of the invention, the magnitude of the value of the µ sensitivity calculated by the µ sensitivity calculator can be reduced in the situation wherein the vehicle is traveling straight or nearly straight. This consequently makes it possible to determine the increasing/decreasing manipulated variable such that the magnitude of the gain value is small in the aforesaid situation. Thus, it is possible to restrain the estimated value of the frictional coefficient from being unduly changed in the aforesaid situation.

In the tenth aspect of the invention, further preferably, the µ sensitivity calculator sets at least one of a weighting factor applied to the observed value of the steering angle and a weighting factor applied to the observed value of the yaw rate in the linear coupling according to the observed value of a vehicle speed such that the mutual ratio of both weighting factors changes according to the vehicle speed of the vehicle, and uses the set weighting factor to carry out the calculation of the linear coupling (an eleventh aspect of the invention).

With this arrangement, the reliability of the value of the µ sensitivity calculated by the µ sensitivity calculator can be enhanced, thus making it possible to ideally determine the increasing/decreasing manipulated variable on which the value of the µ sensitivity has been reflected.

The µ sensitivity calculator in the eleventh aspect of the invention is capable of properly determining a reliable µ sensitivity value for determining the increasing/decreasing manipulated variable by the calculation of the linear coupling represented by, for example, an expression 5-7, which will be discussed hereinafter.

In this case, the linear coupling represented by expression 5-7 will be, in other words, configured to be the linear coupling in which, for example, the value of the sensitivity is determined such that the value of the µ sensitivity is proportional to the value of the NSP yaw moment identified using a linear two-wheeled vehicle model from the observed value of the steering angle of a steering control wheel among the wheels of the vehicle, the observed value of the yaw rate of the vehicle, and the observed value of the vehicle speed of the vehicle in the case where the frictional coefficient of a road surface takes a constant value, the linear two-wheeled vehicle being adapted to approximately represent the side slip motion and the rotational motion about the yaw axis of an actual vehicle as a behavior of a model vehicle having a front wheel as a steering control wheel and a rear wheel as a non-steering control wheel.

In the ninth to the eleventh aspects of the invention in which the NSP yaw moment is used as the to-be-compared external force, more specifically, the first estimator of the to-be-compared external force is constructed, for example, as described below. The first estimator of the to-be-compared external force includes a vehicle motion/road surface reaction force estimator which estimates at least the lateral force of the road surface reaction force acting on each wheel while estimating at least the side slip motional state amount of the motional state amount of the vehicle generated by the resultant force of the road surface reaction forces acting on each wheel of the vehicle, and determines the first estimated value of the moment about the yaw axis at the neutral steer point by using the estimated value of the lateral force that has been determined by the vehicle motion/road surface reaction force estimator, and the vehicle motion/road surface reaction force estimator includes a device which determines the estimated value of a side slip angle as the slip of each wheel of the vehicle by using the observed value of the amount to be observed and the estimated value of the side slip motional state amount of the vehicle that has already been determined, a device which supplies at least the estimated value of the side slip angle of each wheel and the estimated value of the frictional coefficient of the road surface that has been already determined to the friction characteristic model so as to determine the estimated value of the lateral force acting on each wheel by the friction characteristic model, and a device which determines a new estimated value of the side slip motional state amount of the vehicle by using a dynamic relationship between the resultant force of road surface reaction forces including at least the lateral force acting on each wheel and the side slip motional state amount of the vehicle and the estimated value of the lateral force acting on each wheel (a twelfth aspect of the invention).

In the twelfth aspect of the invention, the vehicle motion/road surface reaction force estimator uses the observed value of the amount to be observed and the estimated value of the side slip motional state amount of the vehicle that has already been determined, thereby determining the estimated value of the side slip angle indicative of the slip of each wheel of the vehicle.

In this case, the side slip motional state amount of the vehicle is, for example, the side slip angle of the center-of-gravity point of the vehicle or a side slip velocity thereof. The estimated value of the side slip motional state amount of the vehicle that has already been determined (hereinafter referred to as the "determined estimated value" in some cases) is preferably the latest value among the determined estimated values. However, the value may be older than the latest value if the value lies in a sufficiently short period of time wherein the side slip motional state amount is maintained substantially constant.

As the observed value of the amount to be observed, the observed value of the amount to be observed that is necessary for estimating the side slip angle of each wheel (e.g., the yaw rate of the vehicle, the steering angle of a steering control wheel, and a vehicle speed) may be used in combination with the determined estimated value of the side slip motional state amount of the vehicle. For example, the estimated value of the moving speed of a ground contact portion of each wheel can be determined from the observed value of a vehicle speed, the determined estimated value of a side slip motional state amount of the vehicle, and the observed value of the yaw rate of the vehicle. Furthermore, the estimated value of the side slip angle of each of the wheels, including the steering control wheels, can be determined from the estimated value of the moving speed and the observed value of the steering angle of the steering control wheel.

Then, the vehicle motion/road surface reaction force estimator inputs the estimated value of the side slip angle of each wheel and the determined estimated value of the frictional coefficient into the friction characteristic model thereby to determine the estimated value of a lateral force acting on each wheel by using the friction characteristic model.

Here, the side slip motion of the vehicle is generated primarily due to the resultant force of the lateral forces acting on the wheels. According to the twelfth aspect of the invention, therefore, the vehicle motion/road surface reaction force estimator determines the new estimated value of the side slip motional state amount of the vehicle by using a dynamic relationship between the resultant force of road surface reaction forces including at least the lateral force acting on each wheel and the side slip motional state amount of the vehicle (e.g., a relationship represented by a dynamic equation related to the lateral translational motion of the center-of-gravity point of the vehicle) and the estimated value of the lateral force acting on each wheel.

Thus, according to the twelfth aspect of the invention, the lateral force acting on each wheel can be estimated while estimating the side slip angle and a side slip motional state amount of the vehicle necessary to estimate the lateral force. In this case, as described above, the NSP yaw moment is hardly affected by the influence of the side slip motional state amount of the center of gravity of the vehicle. Hence, the estimation of the side slip motional state amount of the vehicle and the estimation of the frictional coefficient of a road surface can be concurrently performed while restraining an error of the estimated value of the side slip motional state amount from affecting the accuracy of the estimated value of the frictional coefficient of a road surface.

Alternatively, in the ninth to the eleventh aspects of the invention, the first estimator of the to-be-compared external force may be constructed, for example, as described below. The first estimator of the to-be-compared external force includes a vehicle motion/road surface reaction force estimator which estimates the driving/braking force and the lateral force of a road surface reaction force acting on each wheel while estimating at least the side slip motional state amount of the motional state amounts of the vehicle generated by the resultant force of the road surface reaction forces acting on each wheel of the vehicle, and determines a first estimated value of a moment about the yaw axis at the neutral steer point by using the estimated value of the lateral force determined by the vehicle motion/road surface reaction force estimator, and the vehicle motion/road surface reaction force estimator includes a device which determines the estimated values of a slip rate and a side slip angle as the slip of each wheel of the vehicle by using the observed value of the amount to be observed and the estimated value of the side slip motional state amount of the vehicle that has already been determined, a device which supplies at least the estimated values of the slip rate and the side slip angle of each wheel and the estimated value of the frictional coefficient of the road surface that has been already determined to the friction characteristic model so as to determine the estimated values of the driving/braking force and the lateral force acting on each wheel by the friction characteristic model, and a device which determines a new estimated value of the side slip motional state amount of the vehicle by using a dynamic relationship between the resultant force of road surface reaction forces including at least the driving/braking force and the lateral force acting on each wheel and the side slip motional state amount of the vehicle and the estimated value of the lateral force acting on each wheel (a thirteenth aspect of the invention).

In the thirteenth aspect of the invention, the vehicle motion/road surface reaction force estimator uses the observed value of the amount to be observed and the estimated value of the side slip motional state amount of the vehicle that has already been determined, thereby determining the estimated values of the slip rate and the side slip angle indicative of the slip of each wheel of the vehicle.

In this case, the side slip motional state amount of the vehicle is, for example, the side slip angle of the center-of-gravity point of the vehicle or a side slip velocity thereof. The estimated value of the side slip motional state amount of the vehicle that has already been determined (the determined estimated value) is preferably the latest value among the determined estimated values, as with the twelfth aspect of the invention. However, the value may be older than the latest value if the value lies in a sufficiently short period of time wherein the side slip motional state amount is maintained substantially constant.

As the aforesaid observed value of the amount to be observed, the observed value of the amount to be observed that is necessary for estimating the slip rate and the side slip angle of each wheel (e.g., the yaw rate of the vehicle, the steering angle of a steering control wheel, and a vehicle speed) may be used in combination with the determined estimated value of the side slip motional state amount of the vehicle. For example, the estimated value of the moving speed of a ground contact portion of each wheel can be determined from the observed value of a vehicle speed, the determined estimated value of a side slip motional state amount of the vehicle, and the observed value of the yaw rate of the vehicle. Furthermore, the estimated value of the side slip angle of each wheel, including the steering control wheels, can be determined from the estimated value of the moving speed and the observed value of the steering angle of the steering control wheel. In addition, the estimated value of the slip rate of each of the wheels, including the steering control wheels, can be determined from the estimated value of the moving speed of the ground contact portion of each wheel, the observed value of the vehicle speed, and the observed value of the steering angle of a steering control wheel.

Then, the vehicle motion/road surface reaction force estimator inputs the estimated values of the side slip angle and the slip rate of each wheel and the determined estimated value of the frictional coefficient into the friction characteristic model thereby to determine the estimated value of a lateral force and the driving/braking force acting on each wheel by using the friction characteristic model. Further, the vehicle motion/road surface reaction force estimator determines the new estimated value of the side slip motional state amount of the vehicle by using a dynamic relationship between the resultant force of road surface reaction forces including at least the driving/braking force and the lateral force acting on each wheel and the side slip motional state amount of the vehicle (e.g., a relationship represented by a dynamic equation related to the lateral translational motion of the center-of-gravity point of the vehicle) and the estimated values of the driving/braking force and the lateral force acting on each wheel.

Thus, according to the thirteenth aspect of the invention, the driving/braking force and the lateral force acting on each wheel can be estimated while estimating the slip rate and the side slip angle of each wheel and a side slip motional state amount of the vehicle necessary to estimate the driving/braking force and the lateral force. In this case, as with the twelfth aspect of the invention, the estimation of the side slip motional state amount of the vehicle and the estimation of the frictional coefficient of a road surface can be concurrently performed while restraining an error of the estimated value of the side slip motional state amount from affecting the accuracy of the estimated value of the frictional coefficient of a road surface.

In place of the first estimated value and the second estimated value of the to-be-compared external force or the value of the μ sensitivity, the road surface frictional coefficient estimating apparatus in accordance with the present invention may use the values obtained by passing these estimated values and the μ sensitivity value through a frequency component regulating filter.

More specifically, the present invention using such a filter is configured as described below.

The road surface frictional coefficient estimating apparatus in accordance with the present invention is a road surface frictional coefficient estimating apparatus which estimates a frictional coefficient of a road surface, on which a vehicle is traveling, while updating the frictional coefficient, including:

a first estimator of a to-be-compared external force which defines a predetermined type of external force component acting on a vehicle due to a resultant force of road surface reaction forces acting on each wheel of the vehicle from a road surface as the external force to be compared and which determines a first estimated value of the to-be-compared external force by using a friction characteristic model indicating a relationship between a slip between a wheel of the vehicle and the road surface and a road surface reaction force, an estimated value of a frictional coefficient already determined (the determined estimated value), and an observed value of a predetermined type of amount to be observed, which is related to a behavior of the vehicle;

a second estimator of a to-be-compared external force which determines a value of an external force component that balances out an inertial force from an observed value of a motional state amount of the vehicle that defines the inertial force corresponding to the to-be-compared external force of the inertial force produced by a motion of the vehicle, and obtains the determined value of the external force component as a second estimated value of the to-be-compared external force;

a frictional coefficient increasing/decreasing manipulated variable determiner which determines an increasing/decreasing manipulated variable of an estimated value of the frictional coefficient of the road surface on the basis of at least the first estimated value and the second estimated value; and a frictional coefficient estimated value updater which determines a new estimated value of a frictional coefficient by updating the estimated value of the frictional coefficient of a road surface on the basis of the increasing/decreasing manipulated variable, wherein the frictional coefficient increasing/decreasing manipulated variable determiner has an updating cancellation condition determiner which determines whether or not a predetermined updating cancellation condition applies, the condition including at least a condition that a first estimated filtering value obtained by passing the first estimated value through a first filter for regulating frequency components and a second estimated filtering value obtained by passing the second estimated value through a second filter for regulating frequency components carry polarities that are opposite from each other, determines the increasing/decreasing manipulated variable on the basis of at least a difference between the first estimated filtering value and the second estimated filtering value such that the difference is converged to zero, provided that a determination result of at least the updating cancellation condition determiner is negative, and determines either zero or a manipulated variable of a predetermined value for increasing the estimated value of the frictional coefficient as the increasing/decreasing manipulated variable in the case where the determination result is affirmative (a fourteenth aspect of the invention).

As the first filter and the second filter, filters having a high-cut characteristic (low-pass characteristic), a low-cut characteristic (high-pass characteristic) or a band-pass characteristic may be used. The characteristics of the first and the second filters desirably have a similar tendency.

The fourteenth aspect of the invention is associated with the first aspect of the invention described above, and carries out the processing by the frictional coefficient increasing/decreasing manipulated variable determiner by using the first estimated filtering value and the second estimated filtering value in place of the first estimated value and the second estimated value. The processing by the first estimator of a to-be-compared external force, the second estimator of a to-be-compared external force, and the frictional coefficient estimated value updater is the same as that in the first aspect of the invention.

Here, as described in relation to the first aspect of the invention, the first estimated value and the second estimated value should basically carry the same polarity, so that the first estimated filtering value and the second estimated filtering value should also carry the same polarity. According to the fourteenth aspect of the invention, therefore, the frictional coefficient increasing/decreasing manipulated variable determiner uses the first estimated filtering value and the second estimated filtering value instead of the first estimated value and the second estimated value in carrying out the same processing as that in the first aspect, namely, the determination processing by the updating cancellation condition determiner and the processing for determining the increasing/decreasing manipulated variable based on the determination result.

Thus, according to the fourteenth aspect of the invention, as with the first aspect of the invention, in the case where the first estimated filtering value and the second estimated filtering value carry polarities opposite to each other, that is, in the case where the difference is highly likely not to properly reflect the error of a determined estimated value of a frictional coefficient, it is possible to prevent the estimated value of the frictional coefficient from being updated on the basis of an improper increasing/decreasing manipulated variable. Consequently, the frictional coefficient can be estimated while restraining the estimated value of the frictional coefficient of a road surface on which a vehicle is traveling from developing unstable changes and restraining the accuracy of the estimated value from deteriorating.

In addition, the fourteenth aspect of the invention is capable of restraining unwanted components, such as noise components or drift components, contained in the first estimated value and the second estimated value from affecting the estimated value of a frictional coefficient by using the first estimated filtering value and the second estimated filtering value. As a result, the accuracy and the stability of the estimated value of the frictional coefficient can be further enhanced.

In the fourteenth aspect of the invention, preferably, in the case where the determination result given by the updating cancellation condition determiner has changed from "affirmative" over to "negative," the frictional coefficient increasing/decreasing manipulated variable determiner determines the increasing/decreasing manipulated variable on the basis of at least the difference, provided that a status wherein the determination result remains negative lasts for predetermined time or more after the changeover, and determines, as the increasing/decreasing manipulated variable, either zero or a manipulated variable of a predetermined value for incrementing the estimated value of the frictional coefficient until a status in which the determination result is negative lasts for the predetermined time (a fifteenth aspect of the invention).

According to the fifteenth aspect of the invention, as with the second aspect of the invention described above, it is possible to securely prevent the estimated value of the frictional coefficient of a road surface on which a vehicle is traveling from developing unstable changes and to securely prevent the accuracy of the estimated value from deteriorating immediately after the status in which the determination result of the updating cancellation condition determiner is affirmative is switched to the status in which the determination result is negative.

Further, in the fourteenth or the fifteenth aspect of the invention described above, the updating cancellation condition preferably further includes a condition that at least one of the first estimated filtering value and the second estimated filtering value lies within a predetermined range that has been preset as a range in the vicinity of zero (a sixteenth aspect of the invention).

According to the sixteenth aspect of the invention, as with the aforesaid third aspect of the invention, it is possible to securely prevent the estimated value of the frictional coefficient of a road surface on which a vehicle is traveling from developing unstable changes and also to securely prevent the accuracy of the estimated value from deteriorating in the situation wherein the magnitude of the actual value of the to-be-compared external force is zero or close thereto (i.e., the situation wherein the S/N ratio of the first estimated filtering value or the second estimated filtering value tends to lower).

Preferably, the fourteenth aspect to the sixteenth aspects of the invention described above include a μ sensitivity calculator which determines the value of a μ sensitivity, which indicates the ratio of an incremental amount of the to-be-compared external force relative to an incremental amount of the frictional coefficient of a road surface, or the value of a μ sensitivity obtained by dividing the ratio by the value of the frictional coefficient of the road surface, wherein the updating cancellation condition further includes a condition that a μ sensitivity filtering value obtained by passing the value of the μ sensitivity through a third filter for regulating frequency components has a polarity that is opposite from that of at least one of the first estimated filtering value and the second estimated filtering value (a seventeenth aspect of the invention).

As the third filter, a filter having a high-cut characteristic (low-pass characteristic), a low-cut characteristic (high-pass characteristic) or a band-pass characteristic may be used. In this case, the characteristic of the third filter desirably has a similar tendency to those of the first filter and the second filter.

According to the seventeenth aspect of the invention, the determination processing by the updating cancellation condition determiner is carried out by taking the polarity of the μ sensitivity filtering value into account in addition to the polarities of the first estimated filtering value and the second estimated filtering value. This arrangement makes it possible to securely prevent the estimated value of the frictional coefficient of a road surface on which a vehicle is traveling from developing unstable changes and also to securely prevent the accuracy of the estimated value from deteriorating, as with the fourth aspect of the invention. Further, using the μ sensitivity filtering value makes it possible to restrain the influences of unwanted components included in the value of the μ sensitivity, thereby enhancing the stability of a determination result given by the updating cancellation condition determiner.

In the seventeenth aspect of the invention, as with the aforesaid fourth aspect of the invention, an appropriate example of the to-be-compared external force may be a moment about a yaw axis at a predetermined point (e.g., a neutral steer point, which will be described later) of a vehicle or the resultant force of the road surface reaction forces (a driving/braking force and a lateral force, or a lateral force) acting on a front wheel of the vehicle.

In the seventeenth aspect of the invention, the updating cancellation condition preferably further includes a condition that the μ sensitivity filtering value is a value within a predetermined range that has been preset as a range in the vicinity of zero (an eighteenth aspect of the invention).

As with the fifth aspect of the invention, the eighteenth aspect of the invention makes it possible to securely prevent the estimated value of the frictional coefficient of a road surface on which a vehicle is traveling from developing unstable changes and also securely prevent the accuracy of the estimated value from deteriorating in the state wherein a change in the frictional coefficient is hardly reflected on the value of a to-be-compared external force.

Further, in the seventeenth aspect or the eighteenth aspect of the invention described above, when determining the increasing/decreasing manipulated variable on the basis of the aforesaid difference, the frictional coefficient increasing/decreasing manipulated variable determiner preferably determines the increasing/decreasing manipulated variable on the basis of the difference and the µ sensitivity filtering value (a nineteenth aspect of the invention).

According to the nineteenth aspect of the invention, as with the aforesaid sixth aspect of the invention, the increasing/decreasing manipulated variable can be determined while reducing the magnitude of the gain value (feedback gain), which indicates the ratio of a change in the increasing/decreasing manipulated variable relative to a change in the aforesaid difference as the magnitude of the µ sensitivity filtering value decreases. This makes it possible to prevent the estimated value of the frictional coefficient from being unduly changed in the state wherein the magnitude of the µ sensitivity filtering value is smaller. The influence of unwanted components included in the value of the µ sensitivity can be restrained by using the µ sensitivity filtering value. This makes it possible to enhance the stability of the increasing/decreasing manipulated variable to be determined and consequently enhance the stability of the estimated value of the frictional coefficient.

In the nineteenth aspect of the invention, more specifically, in the case of determining the increasing/decreasing manipulated variable on the basis of the difference, the frictional coefficient increasing/decreasing manipulated variable determiner preferably determines the increasing/decreasing manipulated variable on the basis of the product of the difference and the µ sensitivity, namely, the product of the value of the difference and the value of the µ sensitivity filtering value or the product of the difference and the µ sensitivity, namely, the product of the difference and a µ-sensitivity-dependent value, which is obtained by passing the µ sensitivity filtering value through a saturation characteristic element (a twentieth aspect of the invention).

As with the saturation characteristic element in the seventh aspect of the invention, the saturation characteristic element in the twentieth aspect of the invention is an element that has a characteristic in which the ratio of a change in an output of the saturation characteristic element relative to a change in the µ sensitivity filtering value decreases as the magnitude of the value (absolute value) of the µ sensitivity filtering value increases. In this case, the ratio of the change in the output of the saturation characteristic element relative to the change in the µ sensitivity filtering value may change continuously or discontinuously with a changing magnitude of the µ sensitivity filtering value. Further, the µ-sensitivity-dependent value in the twentieth aspect of the invention may alternatively be obtained by passing the µ sensitivity value through the saturation characteristic element and then through the aforesaid third filter.

According to the twentieth aspect of the invention, the product of the difference and the µ sensitivity approaches zero as the magnitude of the µ sensitivity filtering value approaches zero. Hence, the increasing/decreasing manipulated variable can be determined such that the magnitude of the gain value decreases as the µ sensitivity filtering value approaches zero by determining the increasing/decreasing manipulated variable on the basis of the product of the difference and the µ sensitivity, as with the seventh aspect of the invention described above.

Further, in the twentieth aspect of the invention, more specifically, the frictional coefficient frictional coefficient increasing/decreasing manipulated variable determiner preferably determines the increasing/decreasing manipulated variable on the basis of the product of the difference and the µ sensitivity such that the increasing/decreasing manipulated variable is proportional to the product of the difference and the µ sensitivity (a twenty-first aspect of the invention).

According to the twenty-first aspect of the invention, the increasing/decreasing manipulated variable will be proportional to the product of the difference and the µ sensitivity. Hence, the increasing/decreasing manipulated variable will be determined to approach zero as the µ sensitivity filtering value approaches zero.

Further, in the fourteenth to the twenty-first aspects of the invention, the to-be-compared external force is ideally a moment about a yaw axis (an NSP yaw moment) at a neutral steer point (NSP) of a vehicle (a twenty-second aspect of the invention).

According to the twenty-second aspect of the invention, as with the aforesaid ninth aspect of the invention, the difference between the first estimated filtering value and the second estimated filtering value will be more dependent upon an error of the determined estimated value of the frictional coefficient. Therefore, the increasing/decreasing manipulated variable that makes it possible to properly eliminate the error of the estimated value of the frictional coefficient can be determined by determining the increasing/decreasing manipulated variable on the basis of at least the difference such that the difference is converged to zero. This makes it possible to enhance the accuracy and stability of the estimated value of the frictional coefficient.

In the seventeenth to the twenty-first aspects of the invention provided with the µ sensitivity calculator, in the case where the NSP yaw moment is used as the to-be-compared external force, the µ sensitivity calculator preferably determines the value of the µ sensitivity by linearly coupling the observed value of a steering angle of a steering control wheel among the wheels of the vehicle and the observed value of the yaw rate of the vehicle (a twenty-third aspect of the invention).

Thus, according to the twenty-third aspect of the invention, as with the tenth aspect of the invention described above, the magnitude of the value of the µ sensitivity calculated by the µ sensitivity calculator can be reduced in the situation wherein the vehicle is traveling straight or nearly straight. This consequently makes it possible to determine the increasing/decreasing manipulated variable such that the magnitude of the gain value is small in the aforesaid situation. Thus, it is possible to restrain the estimated value of the frictional coefficient from being unduly changed in the aforesaid situation.

In the twenty-third aspect of the invention, further preferably, the µ sensitivity calculator sets at least one of a weighting factor applied to the observed value of the steering angle and a weighting factor applied to the observed value of the yaw rate in the linear coupling according to the observed value of a vehicle speed such that the mutual ratio of both weighting factors changes according to the vehicle speed of the vehicle, and uses the set weighting factor to carry out the calculation of the linear coupling (a twenty-fourth aspect of the invention).

With this arrangement, as with the aforesaid eleventh aspect of the invention, the reliability of the value of the µ sensitivity calculated by the µ sensitivity calculator can be enhanced, thus making it possible to ideally determine the increasing/decreasing manipulated variable on which the value of the µ sensitivity has been reflected.

As with the aforesaid eleventh aspect of the invention, the µ sensitivity calculator in the twenty-fourth aspect of the invention is capable of properly determining a reliable µ sensitivity value for determining the increasing/decreasing manipulated variable by the calculation of the linear coupling represented by, for example, an expression 5-7, which will be discussed hereinafter.

Further, in the twenty-second to the twenty-fourth aspects of the invention described above, the first estimator of the to-be-compared external force is constructed, for example, as described below. The first estimator of the to-be-compared external force includes a vehicle motion/road surface reaction force estimator which estimates at least the lateral force of the road surface reaction force acting on each wheel while estimating at least the side slip motional state amount of the motional state amount of the vehicle generated by the resultant force of the road surface reaction forces acting on each wheel of the vehicle, and determines the first estimated value of a moment about the yaw axis at the neutral steer point by using the estimated value of the lateral force that has been determined by the vehicle motion/road surface reaction force estimator, and the vehicle motion/road surface reaction force estimator includes a device which determines the estimated value of a side slip angle as the slip of each wheel of the vehicle by using the observed value of the amount to be observed and the estimated value of the side slip motional state amount of the vehicle that has already been determined, a device which supplies at least the estimated value of the side slip angle of each wheel and the estimated value of the frictional coefficient of the road surface that has been already determined to the friction characteristic model so as to determine the estimated value of the lateral force acting on each wheel by the friction characteristic model, and a device which determines a new estimated value of the side slip motional state amount of the vehicle by using a dynamic relationship between the resultant force of road surface reaction forces including at least the lateral force acting on each wheel and the side slip motional state amount of the vehicle and the estimated value of the lateral force acting on each wheel (a twenty-fifth aspect of the invention).

Alternatively, the first estimator of the to-be-compared external force includes a vehicle motion/road surface reaction force estimator which estimates the driving/braking force and the lateral force of the road surface reaction force acting on each wheel while estimating at least the side slip motional state amount of the motional state amount of the vehicle generated by the resultant force of the road surface reaction forces acting on each wheel of the vehicle, and determines the first estimated value of a moment about the yaw axis at the neutral steer point by using the estimated value of the lateral force that has been determined by the vehicle motion/road surface reaction force estimator, and the vehicle motion/road surface reaction force estimator includes a device which determines the estimated values of a slip rate and a side slip angle as the slip of each wheel of the vehicle by using the observed value of the amount to be observed and the estimated value of the side slip motional state amount of the vehicle that has already been determined, a device which supplies at least the estimated values of the slip rate and the side slip angle of each wheel and the estimated value of the frictional coefficient of the road surface that has already been determined to the friction characteristic model so as to determine the estimated values of the driving/braking force and the lateral force acting on each wheel by the friction characteristic model, and a device which determines a new estimated value of the side slip motional state amount of the vehicle by using a dynamic relationship between the resultant force of road surface reaction forces including at least the driving/braking force and the lateral force acting on each wheel and the side slip motional state amount of the vehicle and the estimated value of the lateral force acting on each wheel (a twenty-sixth aspect of the invention).

These twenty-fifth and the twenty-sixth aspects of the invention include the first estimator of a to-be-compared external force having the same construction as that of the twelfth and the thirteenth aspects of the invention, respectively. Hence, as with the twelfth and the thirteenth aspects of the invention, according to the twenty-fifth and the twenty-sixth aspects of the invention, the estimation of the side slip motional state amount of the vehicle and the estimation of the frictional coefficient of a road surface can be concurrently performed while restraining an error of the estimated value of the side slip motional state amount of the vehicle from affecting the accuracy of the estimated value of the frictional coefficient of a road surface.

Further, in the case where the present invention includes the aforesaid µ sensitivity calculator, the following mode may be adopted.

A road surface frictional coefficient estimating apparatus in accordance with the present invention is a road surface frictional coefficient estimating apparatus which estimates a frictional coefficient of a road surface on which a vehicle is traveling while updating the frictional coefficient, including:

a first estimator of a to-be-compared external force which defines a predetermined type of external force component acting on a vehicle due to the resultant force of road surface reaction forces acting on each wheel of the vehicle from a road surface as a to-be-compared external force and determines a first estimated value of the to-be-compared external force by using a friction characteristic model indicating a relationship between a slip between a wheel of the vehicle and the road surface and a road surface reaction force, an estimated value of a frictional coefficient already determined, and an observed value of a predetermined type of amount to be observed, which is related to a behavior of the vehicle;

a second estimator of a to-be-compared external force which determines the value of an external force component balancing out an inertial force from an observed value of a motional state amount of the vehicle that defines the inertial force corresponding to the to-be-compared external force of the inertial force generated by a motion of the vehicle and obtains the determined value of the external force component as a second estimated value of the to-be-compared external force;

a µ sensitivity calculator which determines the value of a µ sensitivity which indicates the ratio of an incremental amount of the to-be-compared external force relative to an incremental amount of the frictional coefficient of a road surface, or the value obtained by dividing the ratio by the value of the frictional coefficient of the road surface;

frictional coefficient increasing/decreasing manipulated variable determining means which determines an increasing/decreasing manipulated variable of an estimated value of the frictional coefficient of the road surface on the basis of at least a difference between the first estimated value and the second estimated value or a difference between a first estimation filtering value obtained by passing the first estimated value through a first filter for regulating frequency components and a second estimation filtering value obtained by passing the second estimated value through a second filter for regulating frequency components, and a µ sensitivity value or a µ-sensitivity-dependent value obtained by passing the µ sensitivity value through one or both of a third filter for regulating frequency components and a saturation characteristic element such that the difference is converged to zero; and a frictional coefficient estimated value updater which determines a new estimated value of a frictional coefficient by updating the estimated value of the frictional coefficient of a road surface on the basis of the increasing/decreasing manipulated variable, wherein the frictional coefficient increasing/decreasing manipulated variable determiner determines the increasing/decreasing manipulated variable such that the magnitude of the increasing/decreasing manipulated variable decreases as the magnitude of the µ sensitivity value or the µ-sensitivity-dependent value decreases (a twenty-seventh aspect of the invention).

The first to the third filters in the twenty-seventh aspect of the invention may have the same characteristics as those described in relation to the fourteenth and the seventeenth aspects of the invention. The saturation characteristic element has the same function as that described in the seventh or the twentieth aspect of the invention.

As an example of the to-be-compared external force in the twenty-seventh aspect of the invention, the NSP yaw moment described in relation to the ninth aspect of the invention may be used.

According to the twenty-seventh aspect of the invention, the first estimator of the to-be-compared external force and the second estimator of the to-be-compared external force are the same as those in the first or the fourteenth aspect of the invention. Hence, the first estimator of the to-be-compared external force determines the first estimated value of a to-be-compared external force. Further, the second estimator of the to-be-compared external force determines the second estimated value of the to-be-compared external force without using an estimated value of a frictional coefficient.

According to the twenty-seventh aspect of the invention, the frictional coefficient increasing/decreasing manipulated variable determiner determines the increasing/decreasing manipulated variable of the estimated value of the frictional coefficient of the road surface such that the difference between the first estimated value and the second estimated value or the difference between the first estimation filtering estimated value and the second estimation filtering estimated value is converged to zero on the basis of at least the difference and the µ sensitivity value or the µ-sensitivity-dependent value.

At this time, the increasing/decreasing manipulated variable is determined such that the magnitude of the increasing/decreasing manipulated variable decreases as the magnitude of the µ sensitivity value or the µ-sensitivity-dependent value decreases.

Further, the twenty-seventh aspect of the invention determines a new estimated value of a frictional coefficient by updating the estimated value of the frictional coefficient of a road surface on the basis of the increasing/decreasing manipulated variable by the frictional coefficient estimated value updater.

Here, according to the twenty-seventh aspect of the invention, the increasing/decreasing manipulated variable is determined such that the magnitude of the increasing/decreasing manipulated variable decreases as the magnitude of the µ sensitivity value or the µ sensitivity dependent value decreases. Therefore, the updating amount of the estimated value of a frictional coefficient based on the increasing/decreasing manipulated variable decreases as the magnitude of the µ sensitivity value or the µ-sensitivity-dependent value decreases. This restrains the estimated value of the frictional coefficient from being restrained.

In other words, the magnitude of a gain value (feedback gain), which indicates the ratio of a change in the increasing/decreasing manipulated variable relative to a change in the aforesaid difference, is restrained to be smaller as the magnitude of the µ sensitivity value or the µ-sensitivity-dependent value decreases.

Accordingly, as with the sixth or the nineteenth aspect of the invention, it is possible to prevent the estimated value of the frictional coefficient of a road surface from being unduly changed in the state wherein the magnitude of a µ sensitivity value or a µ-sensitivity-dependent value is smaller (i.e., in the state wherein the dependency of the to-be-compared amount upon the frictional coefficient of a road surface is low). Consequently, the frictional coefficient can be estimated while preventing the estimated value of the frictional coefficient of a road surface on which a vehicle is traveling from developing unstable changes or the accuracy of the estimated value from being deteriorated.

In the twenty-seventh aspect of the invention, as with the seventh or the twentieth aspect of the invention, the frictional coefficient increasing/decreasing manipulated variable determiner preferably determines the increasing/decreasing manipulated variable on the basis of the product of the difference and the µ-sensitivity-dependent value, which is the product of the difference and the µ sensitivity value or the µ-sensitivity-dependent value (a twenty-eighth aspect of the invention). This arrangement makes it possible to provide the same advantages as those of the seventh aspect or the twentieth aspect of the invention.

Further, in the twenty-eighth aspect of the invention, as with the eighth or the twenty-first aspect of the invention, the frictional coefficient increasing/decreasing manipulated variable determiner preferably determines the increasing/decreasing manipulated variable on the basis of the product of the difference and the µ sensitivity such that the increasing/decreasing manipulated variable is proportional to the product of the difference and the µ sensitivity (a twenty-ninth aspect of the invention). This arrangement makes it possible to provide the same advantages as those of the eighth or the twenty-first aspect of the invention.

Further, in the twenty-eighth and the twenty-ninth aspects of the invention, in the case where the frictional coefficient increasing/decreasing manipulated variable determiner is a device which determines the increasing/decreasing manipulated variable on the basis of the difference between the first estimation filtering value and the second estimation filtering value and the µ-sensitivity-dependent value obtained by passing the µ sensitivity value through at least the third filter, filters having a low-cut characteristic may be adopted as the first filter, the second filter and the third filter (a thirtieth aspect of the invention). Alternatively, filters having a high-cut characteristic may be adopted as the first filter, the second filter and the third filter (a thirty-first aspect of the invention).

The low-cut characteristic more specifically means a frequency characteristic that cuts off frequency components of a predetermined frequency or less. The high-cut characteristic more specifically means a frequency characteristic that cuts off frequency components of a predetermined frequency or more.

According to the thirtieth aspect of the invention, the increasing/decreasing manipulated variable can be determined, removing low frequency or DC error components steadily contained in the first estimated value, the second estimated value and the µ sensitivity attributable mainly to offsets or drifts of outputs of sensors. This arrangement allows the accuracy and stability of the estimated value of a frictional coefficient to be enhanced. The same applies to the case where filters having a low-cut characteristic are adopted as the first to the third filters in the nineteenth to the twenty-first aspects of the invention.

According to the thirty-first aspect of the invention, the increasing/decreasing manipulated variable can be determined, removing high-frequency error components contained in the first estimated value, the second estimated value and the μ sensitivity attributable primarily to high-frequency noise components contained in outputs of sensors. This makes it possible to enhance the accuracy and the stability of the estimated value of a frictional coefficient. The same applies to the case where filters having a high-cut characteristic are adopted as the first to the third filters in the nineteenth to the twenty-first aspects of the invention.

Supplementally, the first to the third filters may use filters having both frequency characteristics, namely, the low-cut characteristic and the high-cut characteristic (e.g., filters having the band-pass characteristic).

In the thirty-first aspect of the invention wherein the first to the third filters have a high-cut characteristic, the frictional coefficient increasing/decreasing manipulated variable determiner preferably determines the increasing/decreasing manipulated variable by passing the preliminary value of the increasing/decreasing manipulated variable through a phase compensation filter having a function for advancing the phase of the preliminary value while determining the preliminary value on the basis of the difference and the μ-sensitivity-dependent value (a thirty-second aspect of the invention). The same applies to the case where filters having a high-cut characteristic are adopted as the first to the third filters in the nineteenth to the twenty-first aspects of the invention.

More specifically, in the case where the first to the third filters have a high-cut characteristic, a to-be-compared external force and a μ sensitivity tend to incur phase delays in the difference between the first estimation filtering value and the second estimation filtering value or in the μ-sensitivity-dependent value in a relatively high-frequency area. For this reason, if the difference and the μ-sensitivity-dependent value are used as they are to determine the increasing/decreasing manipulated variable, then the estimated value of a frictional coefficient may develop a vibration or the like, causing the estimated value to be unstable. Therefore, according to the thirty-second aspect of the invention, the phase delay of the preliminary value is eliminated by passing the preliminary value through the phase compensation filter while determining the preliminary value of the increasing/decreasing manipulated variable on the basis of the difference and the μ-sensitivity-dependent value. This makes it possible to prevent the estimated value of the frictional coefficient of a road surface from vibrating and effectively enhance the stability of the estimated value.

In the thirtieth to the thirty-second aspects of the invention, the frictional coefficient increasing/decreasing manipulated variable determiner preferably determines the increasing/decreasing manipulated variable on the assumption that the value of the difference is zero in the case where the difference lies within a predetermined range as a range in the vicinity of zero (a thirty-third aspect of the invention).

More specifically, if the difference between the first estimation filtering value and the second estimation filtering value takes a value in the vicinity of zero, then the difference tends to include many components attributable to error components of the first estimated value and the second estimated value. In other words, the S/N ratio of the difference tends to become low. Hence, according to the thirty-third aspect of the invention, the increasing/decreasing manipulated variable is determined on the assumption that the value of the difference is zero if the difference lies within a predetermined range as a range in the vicinity of zero. This makes it possible to prevent the estimated value of a frictional coefficient from being improperly updated, thus preventing the estimated value from becoming unstable in a situation wherein the S/N ratio of the difference is low.

Further, in the thirtieth to the thirty-second aspects of the invention, the frictional coefficient increasing/decreasing manipulated variable determiner preferably determines the increasing/decreasing manipulated variable on the assumption that a μ-sensitivity-dependent value is zero in the case where the μ-sensitivity-dependent value falls within a predetermined range as a range in the vicinity of zero (a thirty-fourth aspect of the invention).

More specifically, in the case where the μ-sensitivity-dependent value is in the vicinity of zero, the S/N ratio of the μ-sensitivity-dependent value is apt to be low. According to the thirty-fourth aspect of the invention, the increasing/decreasing manipulated variable is determined on the assumption that the value of the μ-sensitivity-dependent value is zero in the case where the μ-sensitivity-dependent value falls within a predetermined range as a range in the vicinity of zero. This arrangement makes it possible to prevent the estimated value of a frictional coefficient from being improperly updated, thus preventing the estimated value from becoming unstable in a situation wherein the S/N ratio of the difference is low.

BRIEF DESCRIPTION OF THE DRAWINGS

FIGS. 2(a) and 2(b) are diagrams visually illustrating representative reference characters used in the description of the embodiment;

FIG. 3 is a block diagram illustrating major functions of a controller in a first embodiment;

FIG. 4 is a flowchart illustrating the processing by the controller in the first embodiment;

FIG. 9 is a flowchart illustrating the processing by a bank angle estimator illustrated in FIG. 3;

FIG. 10 is a flowchart illustrating the processing by a slope angle estimator illustrated in FIG. 3;

DESCRIPTION OF THE PREFERRED EMBODIMENTS

The following will describe embodiments of the present invention. First, referring to FIG. 1, a schematic construction of a vehicle in each of the embodiments in the present specification will be described.

Figure 1:
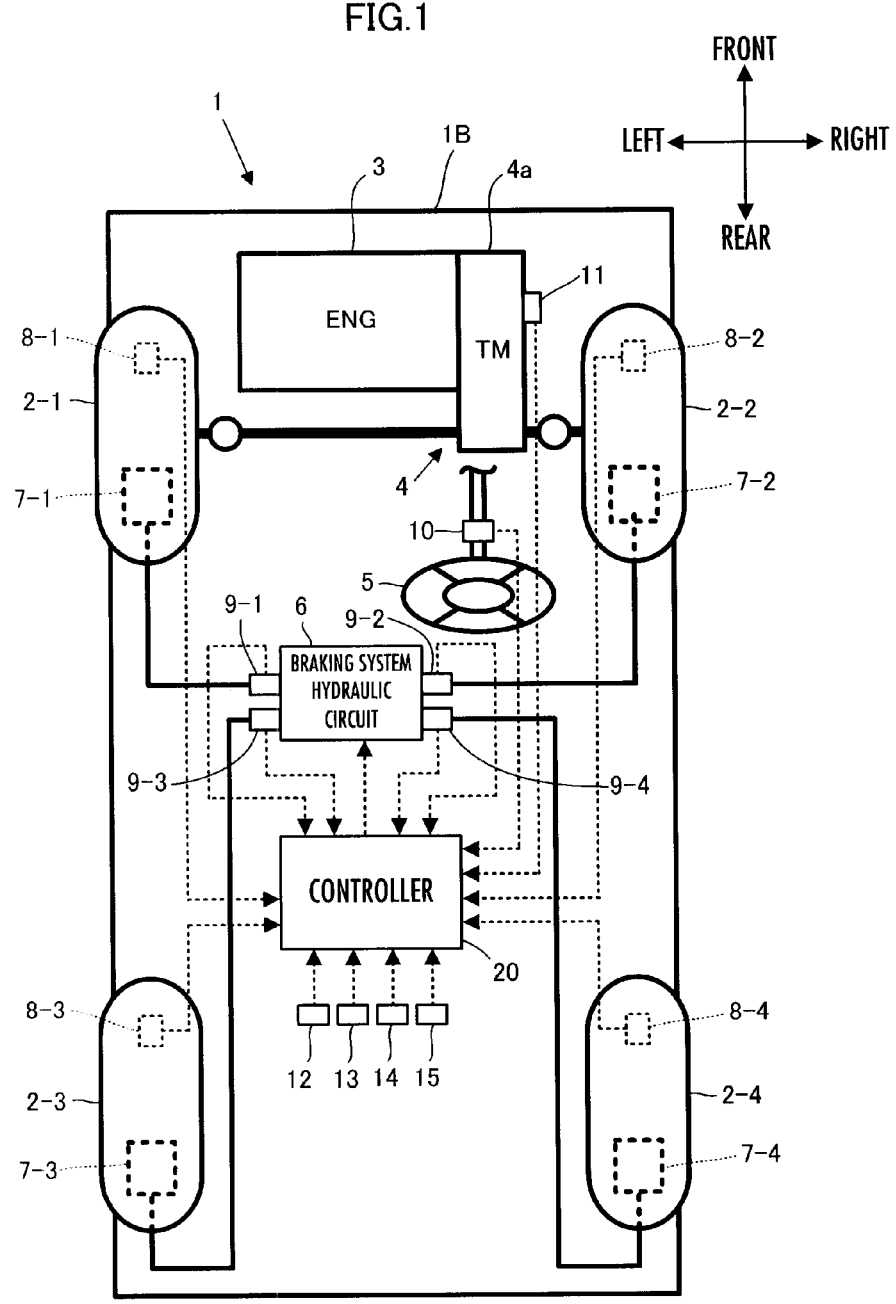
FIG. 1 is a diagram illustrating a schematic construction of a vehicle in an embodiment.

As illustrated in FIG. 1, a vehicle 1 has a plurality of wheels 2-$i$ ($i$=1, 2, . . . ), a vehicle body 1B being supported on the wheels 2-$i$ ($i$=1, 2, . . . ) through suspension devices, which are not shown.

More specifically, the vehicle 1 according to each of the embodiments has a total of four wheels 2-$i$ ($i$=1, 2, 3, 4), namely, a pair of right and left front wheels 2-1, 2-2 and a pair of right and left rear wheels 2-3, 2-4. In this case, the front wheels 2-1 and 2-2 among the wheels 2-$i$ ($i$=1, 2, 3, 4) are driving wheels functioning as steering control wheels, while the rear wheels 2-3 and 2-4 are driven wheels and non-steering control wheels.

In the following description, the front left wheel 2-1 of the vehicle 1 will be referred to as the first wheel 2-1, the front right wheel 2-2 will be referred to as the second wheel 2-2, the rear left wheel 2-3 will be referred to as the third wheel 2-3, and the rear right wheel 2-4 will be referred to as the fourth wheel 2-4 in some cases.

Further, any one wheel among the wheels 2-$i$ ($i$=1, 2, 3, 4) will be represented simply as "the wheel 2-$i$" or "an i-th wheel 2-$i$," omitting the description indicated by ($i$=1, 2, 3, 4).

A subscript "$i$" will be added to the reference numeral of an element related to each i-th wheel 2-$i$ among elements (parts, physical quantities, and the like) other than the wheels 2-$i$ ($i$=1, 2, 3, 4). In this case, for an element corresponding to one particular wheel among the wheels 2-$i$ ($i$=1, 2, 3, 4), the value of i (1 or 2 or 3 or 4) corresponding to a particular wheel will be added in place of the subscript "i."

The vehicle 1 has a drive system for rotatively driving the driving wheels. The drive system has an engine 3 serving as a motive power generating source mounted on the vehicle body 1B in each of the embodiments. The drive system transmits the motive power (output torque) of the engine 3 to the front wheels 2-1 and 2-2 serving as the driving wheels through a motive power transmission mechanism 4, which includes a transmission 4a, thereby rotatively driving the front wheels 2-1 and 2-2. In this case, the motive power of the engine 3 is controlled on the basis of the manipulated variable of the depression on an accelerator (gas) pedal (not shown) of the vehicle 1.

The vehicle 1 is further provided with a steering system for steering the steering control wheels. In each of the embodiments, the steering system has a steering wheel 5 disposed at the front in a driver's seat of the vehicle body 1B. The steering system steers the front wheels 2-1 and 2-2 acting as the steering control wheels by a steering mechanism, not shown, according to the rotational operation of the steering wheel 5 in an interlocked manner. The steering mechanism is constructed of, for example, a mechanical steering mechanism, such as a rack and pinion or the like or a steering mechanism with an actuator, which has a steering actuator, such as an electric motor (a so-called power steering device).

The vehicle 1 further includes a braking system for braking the travel of the vehicle 1. The braking system in each of the embodiments has a frictional braking mechanism 7-$i$ ($i$=1, 2, 3, 4), such as a disc brake, for each wheel 2-$i$. Each of these braking mechanisms 7-$i$ ($i$=1, 2, 3, 4) is connected to a braking system hydraulic circuit 6, and a hydraulic pressure (braking pressure) supplied from the braking system hydraulic circuit 6 generates a braking force for braking the rotation of a corresponding wheel 2-$i$.

In this case, the braking system hydraulic circuit 6 basically applies a braking pressure based on a depression manipulated variable (treading force) of the brake pedal to each braking mechanism 7-$i$ in synchronization with the operation of depressing the brake pedal (not shown) of the vehicle 1. Further, in the vehicle 1, the braking system hydraulic circuit 6 is capable of adjusting the braking pressure, i.e., the braking force on each wheel 2-$i$) applied to each braking mechanism 7-$i$ in response to a control command received from a controller 20, which will be hereinafter described.

The vehicle 1 further includes a variety of sensors for detecting amounts to be observed, which will be discussed later, and the controller 20, which mainly controls the behaviors of the vehicle 1 in addition to the drive system, the steering system, and the braking system.

In each of the embodiments, the vehicle 1 is provided with sensors, such as wheel rotational angular velocity sensors 8-$i$ ($i$=1, 2, 3, 4) which generate outputs based on the rotational angular velocity of each wheel 2-$i$, braking pressure sensors 9-$i$ ($i$=1, 2, 3, 4) which generate outputs based on the braking pressures supplied to the braking mechanism 7-$i$ of each wheel 2-$i$, a steering control angle sensor 10 which generates an output based on the steering angle (rotational angle) of the steering wheel 5, a transmission sensor 11 which generates an output based on the operating state (a transmission gear ratio or the like) of the transmission 3, an accelerator pedal sensor 12 which generates an output based on the depression manipulated variable of the accelerator (gas) pedal (not shown) of the vehicle 1, a yaw rate sensor 13 which generates an output based on a yaw rate, which is an angular velocity about the yaw axis of the vehicle 1 (about the vertical axis of the vehicle body 1B), a longitudinal acceleration sensor 14 which generates an output based on the acceleration in the direction of the roll axis (the longitudinal direction of the vehicle body 1B) of the vehicle 1, and a lateral acceleration sensor 15 which generates an output based on the acceleration in the direction of the pitch axis of the vehicle 1 (the lateral direction (horizontal direction) of the vehicle body 1B).

The controller 20 is an electronic circuit unit which includes a CPU, a RAM, a ROM and the like, and receives outputs (detection data) of the aforesaid sensors. The controller 20 then carries out predetermined arithmetic processing based on a program, which has been installed beforehand, while using the received detection data and set data which has been stored and retained in advance, thereby controlling the behaviors of the vehicle 1.

In this case, the controller 20 has a function for controlling a behavior of the vehicle 1, such as a rotational motion about the yaw axis (turning motion) or a side slip motion, to a desired behavior by, for example, controlling the braking force of each wheel 2-*i* supplied by each braking mechanism 7-*i* through the braking system hydraulic circuit 6. The controller 20 also has a function for sequentially estimating a frictional coefficient or the like of a road surface on which the vehicle 1 is traveling in order to carry out the processing for controlling the behavior of the vehicle 1. The estimated frictional coefficient is used to estimate, for example, a state amount of a side slip motion (a side slip angle, a side slip velocity or the like) of the vehicle 1, or used to determine a desired behavior of the vehicle 1.

The above has described the schematic construction of the vehicle 1 in each embodiment to be described in the present specification.

The vehicle to which the present invention applies is not limited to the vehicle 1 having the construction described above. For example, the motive power generating source of the drive system of the vehicle 1 may be an electric motor. Alternatively, both an engine and an electric motor may be installed in the vehicle 1 as motive power generating sources.

The driving wheels of the vehicle 1 may alternatively be the rear wheels 2-3 and 2-4, or both the front wheels 2-1, 2-2 and the rear wheels 2-3, 2-4.

Further, the drive system may be constructed so as to be capable of individually adjusting the driving force to be supplied to each driving wheel from a motive power generating source.

The steering system of the vehicle 1 may be constructed to steer the rear wheels 2-3 and 2-4 by actuators as necessary in addition to steering the front wheels 2-1 and 2-2 in synchronization with the rotational operation of the steering wheel 5.

The number of wheels does not have to be four.

Referring now to FIGS. 2(*a*) and 2(*b*), major reference characters (variables) and terms used in each embodiment will be described below.

In FIGS. 2(*a*) and 2(*b*), variables preceded by "↑", such as ↑V1 and ↑F1, denote vector amounts. A vector quantity is expressed in the form of a column vector (a transposed vector of a row vector) when the components the vector quantity are indicated using an appropriate coordinate system.

In the description of each embodiment, "×" is used as the arithmetic symbol of the multiplication of vector quantities (an exterior product), while "*" is used as the arithmetic symbol of multiplication other than exterior products, such as the multiplication of scalar quantities or the multiplication of a scalar quantity and a vector quantity. To indicate the transposition of a row vector, a superscript "T" will be attached at top right of a component of the row vector.

In a vehicle body coordinate system, the longitudinal direction of the vehicle body 1B is an X-axis direction, while the lateral direction (the horizontal direction) of the vehicle body 1B is a Y-axis direction. In this case, the front direction of the vehicle body 1B is defined as the positive direction of the X-axis, while the left direction of the vehicle body 1B is defined as the positive direction of the Y-axis.

The X-axis direction of the vehicle coordinate system may be referred to simply as the longitudinal direction or the direction of the roll axis of the vehicle 1 in some cases. Similarly, the Y-axis direction of the vehicle coordinate system may be referred to simply as the lateral direction or the direction of the pitch axis of the vehicle 1 in some cases. Further, the direction of the yaw axis of the vehicle 1 (the vertical direction of the vehicle body 1B) is orthogonal to an XY plane of the vehicle body coordinate system (orthogonal to the X-axis and the Y-axis).

An i-th wheel coordinate system is a coordinate system in which a direction parallel to the rotational surface of an i-th wheel 2-*i* (a plane orthogonal to the rotational axis of the i-th wheel 2-*i*), which is the longitudinal direction of the i-th wheel 2-*i*, is defined as the direction of the x-axis and the direction parallel to the rotational axis of an i-th wheel 2-*i*, which is the horizontal direction (lateral direction) of the i-th wheel 2-*i*, is defined as the direction of the y-axis when the vehicle 1 is observed from above in the direction of the yaw axis.

In this case, the front direction of the i-th wheel 2-*i* is defined as the positive direction of the x-axis and the left direction of the i-th wheel 2-*i* is defined as the positive direction of the y-axis. An xy plane of the i-th wheel coordinate system is parallel to an XY plane of the vehicle body coordinate system and orthogonal to the direction of the yaw axis of the vehicle 1.

Supplementally, the term "orthogonal" and "parallel" in the present specification do not mean only orthogonal and parallel in strict senses, but the terms may mean approximately orthogonal or parallel.

A reference character "δi" denotes the steering angle (hereinafter referred to simply as the wheel steering angle) of the i-th wheel 2-*i*. More specifically, each wheel steering angle δi is an angle formed by the rotational surface of the i-th wheel 2-*i* relative to the x-axis direction of the vehicle body coordinate system when the vehicle 1 is observed from above in the yaw-axis direction. In the vehicle 1 according to the embodiment, the rear wheels 2-3 and 2-4 are non-steering wheels, so that δ3=δ4=0 always applies.

A reference character "↑Vg" denotes the moving velocity vector of the center-of-gravity point of the vehicle 1 relative to a road surface (hereinafter referred to as "the vehicle center of gravity velocity vector") observed by being projected onto the XY plane of the vehicle coordinate system. The vehicle center of gravity velocity vector ↑Vg is a vector composed of a component in the x-axis direction and a component in the y-axis direction of the vehicle body coordinate system. In this case, the component in the X-axis direction of the vehicle center-of-gravity velocity vector ↑Vg will be denoted by Vgx and will be referred to as the longitudinal velocity of the vehicle center of gravity Vgx, and the component in the Y-axis direction will be denoted by Vgy and will be referred to as the side slip velocity of the vehicle center of gravity Vgy.

In other words, the longitudinal velocity of the vehicle center of gravity Vgx means the traveling speed (vehicle speed) of the vehicle 1. Although not shown in FIGS. 2(*a*) and 2(*b*), a temporal change rate (differential value) of the longitudinal velocity of the vehicle center of gravity Vgx will be referred to as the longitudinal velocity change rate of the vehicle center of gravity Vgdot_x and a temporal change rate (differential value) of the side slip velocity of the vehicle center of gravity Vgy will be referred to as side slip velocity change rate of the vehicle center of gravity Vgdot_y.

A reference character "βg" denotes a side slip angle of the center-of-gravity point of the vehicle 1 (hereinafter referred to as the vehicle center-of-gravity side slip angle). More specifically, the vehicle center-of-gravity side slip angle βg is the angle formed by the vehicle center-of-gravity velocity vector ↑Vg with respect to the X-axis direction of the vehicle body coordinate system. Thus, βg=tan$^{-1}$(Vgy/Vgx) holds.

A reference character "↑Vi" denotes the moving speed vector of a ground contact portion of the i-th wheel 2-*i* relative to a road surface (hereinafter referred to simply as the advancing speed vector of the i-th wheel 2-*i* or simply as the wheel advancing speed vector). Each wheel advancing speed vector ↑Vi is a vector composed of a component in the X-axis direction and a component in the Y-axis direction of the vehicle body coordinate system. In this case, although not shown in FIGS. 2(a) and 2(b), the component in the X-axis direction of each wheel advancing speed vector ↑Vi will be denoted by Vx_i and the component in the Y-axis direction thereof will be denoted by Vy_i.

A reference character "↑Vsub_i" denotes a moving speed vector of the ground contact portion of the i-th wheel 2-i relative to the road surface (hereinafter referred to as the wheel advancing speed vector on the wheel coordinate system), as observed by being projected onto the xy plane of the i-th wheel coordinate system. The wheel advancing speed vector on each wheel coordinate system ↑Vsub_i is a vector composed of a component in the x-axis direction and a component in the y-axis direction of the i-th wheel coordinate system. In this case, although not shown in FIGS. 2(a) and 2(b), the component in the x-axis direction of the wheel advancing speed vector on each wheel coordinate system ↑Vsub_i will be denoted by Vsubx_i, while the component in the y-axis direction of the wheel advancing speed vector on each wheel coordinate system ↑Vsub_i will be denoted by Vsuby_i.

The wheel advancing speed vector on each wheel coordinate system ↑Vsub_i of each wheel 2-i and the wheel advancing speed vector ↑Vi are vector quantities sharing the same spatial orientation and magnitude except that the coordinate systems for representing the vector quantities are different.

A reference character "βi" denotes a side slip angle (hereinafter referred to simply as the wheel side slip angle in some cases) of the i-th wheel 2-i. More specifically, each wheel side slip angle βi is the angle formed by the wheel advancing speed vector on the wheel coordinate system ↑Vsub_i of the i-th wheel 2-i with respect to the x-axis direction of the i-th wheel coordinate system. Thus, $\beta i = \tan^{-1}(Vsuby\_i/Vsubx\_i)$ holds.

A reference character "β0i" denotes an angle formed by the wheel advancing speed vector ↑Vi of the i-th wheel 2-i with respect to the X-axis direction of the vehicle body coordinate system (=βi+δi: hereinafter referred to as the wheel position side slip angle).

In the embodiment, the rear wheels 2-3 and 2-4 are non-steering wheels, so that β03=β3 and β04=β4 hold. Hence, β03 and β04 are not shown.

A reference character "γ" denotes an angular velocity about the yaw axis of the vehicle 1, that is, the yaw rate.

A reference character "df" denotes the distance between the front wheels 2-1 and 2-2 in the lateral direction of the vehicle 1 (the Y-axis direction of the vehicle body coordinate system), that is, the tread between the front wheels 2-1 and 2-2. A reference character "dr" denotes the interval between the rear wheels 2-3 and 2-4 in the lateral direction of the vehicle 1 (the Y-axis direction of the vehicle body coordinate system), that is, the tread between the rear wheels 2-3 and 2-4. Hereinafter, "df" will stand for the front wheel tread and "dr" will stand for the rear wheel tread.

A reference character "Lf" denotes the distance between the axle (rotating shaft) of the front wheels 2-1 and 2-2 and the center-of-gravity point of the vehicle 1, i.e., the distance in the longitudinal direction of the vehicle 1, when δ1=δ2=0. A reference character "Lr" denotes the distance between the axle (rotating shaft) of the rear wheels 2-3 and 2-4 and the center-of-gravity point of the vehicle 1, i.e., the distance in the longitudinal direction of the vehicle 1. Hereinafter, Lf will stand for the distance between the axle of the front wheels and the center of gravity, while Lr will stand for the distance between the axle of the rear wheels and the center of gravity.

A reference character "↑Pi" denotes a position vector of the i-th wheel 2-i (hereinafter referred to simply as the wheel position vector in some cases) as observed from the center-of-gravity point of the vehicle 1 when the vehicle 1 is observed from above in the yaw-axis direction. Each wheel position vector ↑Pi is a vector composed of a component in the X-axis direction and a component in the Y-axis direction of the vehicle body coordinate system. In this case, although not shown in FIGS. 2(a) and 2(b), the component in the X-axis direction of each wheel position vector ↑Pi will be denoted by Px_i, while the component in the Y-axis direction thereof will be denoted by Py_i.

In the case where the center-of-gravity point of the vehicle 1 in the Y-axis direction of the vehicle body coordinate system lies on the central line of the vehicle width of the vehicle 1, $\uparrow P1=(Lf, df/2)^T$, $\uparrow P2=(Lf, -df/2)^T$, $\uparrow P3=(-Lr, df/2)^T$, and $\uparrow P4=(-Lr, -dr/2)^T$ hold.

A reference character "↑Fi" denotes a road surface reaction force of the i-th wheel 2-i (a translational force vector acting from a road surface onto the i-th wheel 2-i), as observed by being projected onto the XY plane of the vehicle body coordinate system. Hereinafter, ↑Fi denotes a wheel two-dimensional road surface reaction force or a two-dimensional road surface reaction force. The wheel two-dimensional road surface reaction force ↑Fi denotes a vector composed of a component in the X-axis direction and a component in the Y-axis direction of a vehicle body coordinate system.

Here, spatially (three-dimensionally), the road surface reaction force acting on each wheel 2-i from a road surface is a resultant force vector of the driving/braking force, which is a translational force component in the x-axis direction of the i-th wheel coordinate system, a lateral force, which is a translational force component in the y-axis direction thereof, and a ground contact load, which is a translational force component in the yaw-axis direction. Therefore, the wheel two-dimensional road surface reaction force ↑Fi is a vector obtained by representing the resultant vector of the driving/braking force and the lateral force of the i-th wheel 2-i (corresponding to the frictional force acting on the i-th wheel 2-i from a road surface) by means of the vehicle body coordinate system. In this case, although not shown in FIGS. 2(a) and 2(b), the component in the X-axis direction of the wheel two-dimensional road surface reaction force ↑Fi is denoted by Fx_i and the component in the Y-axis direction thereof is denoted by Fy_i.

In the following description, the spatial road surface reaction force as the resultant vector of the driving/braking force, the lateral force, and the ground contact load of each wheel 2-i will be referred to as the wheel three-dimensional road surface reaction force or the three-dimensional road surface reaction force. Further, the ground contact load, which is a component in the yaw-axis direction of the three-dimensional road surface reaction force of each wheel 2-i, will be denoted by Fz_i.

A reference character "↑Fsub_i" denotes the road surface reaction force of the i-th wheel 2-i as observed by being projected onto the xy plane of the i-th wheel coordinate system (hereinafter referred to as the wheel two-dimensional road surface reaction force on the wheel coordinate system). Each wheel two-dimensional road surface reaction force on the wheel coordinate system ↑Fsub_i is a vector composed of a component in the x-axis direction of the i-th wheel coordinate system and a component in the y-axis direction thereof.

In this case, although not shown in FIGS. 2(a) and 2(b), the component in the x-axis direction of each wheel two-dimensional road surface reaction force ↑Fi on the wheel coordinate system is denoted by Fsubx_i and the component in the y-axis direction thereof is denoted by Fsuby_i. The component in the x-axis direction Fsubx_i is, in other words, the driving/ braking force of the i-th wheel 2-*i*. The component in the y-axis direction Fsuby_i is, in other words, the lateral force of the i-th wheel 2-*i*. The wheel two-dimensional road surface reaction force ↑Fsub_i on the wheel coordinate system of the i-th wheel 2-*i* and the wheel two-dimensional road surface reaction force ↑Fi of the i-th wheel 2-*i* are vector quantities sharing the same spatial orientation and magnitude except that the coordinate systems for representing the vector quantities are different.

A reference character "↑Fg_total" denotes a spatial translational force vector acting on the center-of-gravity point of the vehicle 1 (hereinafter referred to as the total road surface reaction force resultant translational force vector) due to the resultant force of the road surface reaction forces acting on the wheels 2-*i* (i=1, 2, 3, 4), i.e., the resultant force of the wheel three-dimensional road surface reaction forces (i=1, 2, 3, 4).

In this case, although not shown in FIGS. 2(*a*) and 2(*b*), the component in the X-axis direction of the vehicle body coordinate system of the total road surface reaction force resultant translational force vector ↑Fg_total is denoted by Fgx_total, the component in the Y-axis direction thereof the vehicle body coordinate system is denoted by Fgy_total, and the component in the yaw-axis direction is denoted by Fgz_total. The reference character Fgx_total may be referred to as the total road surface reaction force resultant longitudinal force and the reference character Fgy_total may be referred to as the total road surface reaction force resultant lateral force in some cases.

A reference character "Mgz_total" denotes a moment acting about the yaw axis at the center-of-gravity point of the vehicle 1 due to the resultant force of the road surface reaction forces acting on the wheels 2-*i* (i=1, 2, 3, 4), i.e., the resultant force of the wheel three-dimensional road surface reaction forces (i=1, 2, 3, 4). The moment Mgz_total will be hereinafter referred to as the total road surface reaction force resultant yaw moment.

The component in the yaw-axis direction Fgz_total of the resultant force of the wheel three-dimensional road surface reaction forces (i=1, 2, 3, 4) does not contribute to the total road surface reaction force resultant yaw moment Mgz_total. Hence, the total road surface reaction force resultant yaw moment Mgz_total virtually means the moment acting about the yaw axis at the center-of-gravity point of the vehicle 1 due to the resultant force of the wheel two-dimensional road surface reaction forces ↑Fi (i=1, 2, 3, 4), i.e., the resultant force of the driving/braking forces and the lateral forces of all wheels 2-*i* (i=1, 2, 3, 4).

Supplementally, in each of the embodiments described in the present specification, the resultant force of the road surface reaction forces acting on the wheels 2-*i* (i=1, 2, 3, 4) is regarded as the entire external force acting on the vehicle 1. More specifically, the external forces acting on the vehicle 1 include air resistance and the like in addition to the road surface reaction force acting on each wheel 2-*i* from a road surface. In each of the embodiments, however, external forces other than road surface reaction forces are considered sufficiently small to be ignored, as compared with the resultant force of road surface reaction forces acting on the wheels 2-*i* (i=1, 2, 3, 4). Thus, ↑Fg_total and Mgz_total mean a translational force vector and a moment, respectively, acting on the center-of-gravity point of the vehicle 1 due to the whole external force acting on the vehicle 1.

A reference character "NSP" denotes the neutral steer point of the vehicle 1. The NSP means the load application point (the working point) of the resultant force of the lateral forces Fsuby_i (i=1, 2, 3, 4) acting on all the wheels 2-*i* (i=1, 2, 3, 4) when a vehicle center of gravity side slip angle βg (≠0) occurs while the vehicle 1 is traveling in a situation wherein δ1=δ2=0 holds.

More specifically, the NSP means an intersecting point of the straight line which passes the center-of-gravity point of the vehicle 1 and extends in the X-axis direction of the vehicle body coordinate system (the longitudinal direction of the vehicle 1) and the line of action of the resultant force of the lateral forces Fsuby_i (i=1, 2, 3, 4) acting on all wheels 2-*i* (i=1, 2, 3, 4) when the vehicle 1 is observed from above in the yaw-axis direction.

A reference character "Lnsp" denotes the distance between the center-of-gravity point of the vehicle 1 in the X-axis direction of the vehicle body coordinate system (the longitudinal direction of the vehicle 1) and the NSP (hereinafter referred to as the distance between the vehicle center of gravity and the NSP).

If the NSP lies on a rear side beyond the center-of-gravity point of the vehicle 1, then a value of the distance Lnsp between the vehicle center of gravity and the NSP will be a positive value. If the NSP lies on a front side beyond the center-of-gravity point of the vehicle 1, then a value of the distance Lnsp between the vehicle center of gravity and the NSP will be a negative value.

A reference character "Mnsp" denotes a moment acting about the yaw axis at the NSP (hereinafter referred to as the NSP yaw moment) due to the resultant force of the road surface reaction forces acting on the wheels 2-*i* (i=1, 2, 3, 4), that is, the resultant force of the wheel three-dimensional road surface reaction forces (i=1, 2, 3, 4) or the resultant force of the wheel two-dimensional road surface reaction forces ↑Fi (i=1, 2, 3, 4).

In other words, the NSP yaw moment Mnsp is a moment of the sum of the total support force reaction force resultant yaw moment Mgz_total and the moment generated about the yaw axis at the NSP by the total road surface reaction force resultant translational force vector ↑Fg_total (=Lnsp*Fgy_total).

Supplementally, in each of the embodiments, regarding the state amounts related to a rotational motion about the yaw axis, such as an angle about the yaw axis, an angular velocity, and angular acceleration (δi, βi, and γ), and the moments about the yaw axis (Mgz_total, Mnsp and the like), a counterclockwise direction is defined as a positive direction when the vehicle 1 is observed from above in the yaw-axis direction.

Although not shown in FIGS. 2(*a*) and 2(*b*), variables given below will be used in the following description in addition to the aforesaid variables (reference characters).

A reference character "θh" denotes the steering angle of the steering wheel 5 (a rotational angle, which will be referred to as the steering control angle).

A reference character "γdot" denotes the angular acceleration about the yaw axis of the vehicle 1 (hereinafter referred to as the yaw angular acceleration).

A reference character "ωw_i" denotes the rotational angular velocity of the i-th wheel 2-*i* (hereinafter referred to simply as the wheel rotational angular velocity in some case). A reference character "Rw_i" denotes the effective radius of the i-th wheel 2-*i* (hereinafter referred to simply as the wheel effective radius). A reference character "Vw_i" denotes the wheel velocity of the i-th wheel 2-*i* defined as the product of ωw_i and Rw_i (=ωw_i*Rw_i), i.e., the velocity of the ground contact portion of the i-th wheel 2-*i* in the circumferential direction, as observed from the center of the rotation of the i-th wheel 2-*i*.

Each wheel velocity Vw_i coincides with the component in the x-axis direction Vsubx_i of the wheel advancing speed vector on the wheel coordinate system ↑Vsub_i in a state wherein no slip of the i-th wheel 2-i exists.

A reference character "κi" denotes the slip rate of the i-th wheel 2-i (a longitudinal slip rate: hereinafter referred to simply as the wheel slip rate in some cases). A reference character "Tq_i" denotes a torque of the sum of a driving torque supplied from the drive system of the vehicle 1 to the i-th wheel 2-i and a braking torque supplied from the braking system of the vehicle 1 (hereinafter referred to simply as the wheel torque in some cases). A reference character "Iw_i" denotes the inertial moment of the i-th wheel 2-i (hereinafter referred to simply as the wheel inertial moment in some cases).

A reference character "m" denotes the mass of the entire vehicle 1 (hereinafter referred to as the vehicle mass), and a reference character "Iz" denotes the inertial moment about the yaw axis of the entire vehicle 1 (hereinafter referred to as the vehicle yaw inertial moment).

A reference character "Accx" denotes the acceleration (Vgdot_x−Vgy*γ) obtained by adding the component in the X-axis direction of the vehicle body coordinate system of the acceleration (=−Vgy*γ) produced at the center-of-gravity point of the vehicle 1 due to a centrifugal force from a turning motion of the vehicle 1 to the vehicle center of gravity longitudinal velocity change rate Vgdot_x (=Vgdot_x−Vgy*γ).

A reference character "Accy" denotes the acceleration (Vgdot_y+Vgx*γ) obtained by adding the component in the Y-axis direction of the vehicle body coordinate system of the acceleration (=Vgx*γ) produced at the center-of-gravity point of the vehicle 1 due to a centrifugal force from a turning motion of the vehicle 1 to the vehicle center of gravity side slip velocity change rate Vgdot_y (=Vgdot_y+Vgx*γ).

In other words, the Accx and the Accy denote the component in the X-axis direction and the component in the Y-axis direction, respectively, of the acceleration of a motion of the center-of-gravity point of the vehicle 1 observed in the vehicle body coordinate system (a second order differential value of the position of the center-of-gravity point in the vehicle body coordinate system). Hereinafter, the Accx will be referred to as the longitudinal vehicle center of gravity acceleration and the Accy will be referred to as the lateral vehicle center of gravity acceleration.

A reference character "μ" denotes the frictional coefficient of a road surface (the coefficient of friction relative to each wheel 2-i: hereinafter referred to as the road surface frictional coefficient in some cases).

The road surface frictional coefficient μ in each of the embodiments is a relative frictional coefficient which uses, as the reference thereof, the coefficient of friction between a road surface in a certain reference state, such as a standard dry road surface (hereinafter referred to as the reference road surface) and each wheel 2-i. The road surface frictional coefficient μ is to be considered the same at a ground contact location of any one of the wheels 2-i (i=1, 2, 3, 4).

A reference character "θbank" denotes the bank angle of a road surface (hereinafter referred to as the road surface bank angle in some cases). A reference character "θslope" denotes a slope angle of a road surface (hereinafter referred to as the road surface slope angle in some cases). The road surface bank angle θbank is the inclination angle of a road surface relative to a horizontal plane, as observed in the direction of the roll axis of the vehicle 1. The road surface slope angle θslope is the inclination angle of a road surface relative to a horizontal plane, as observed in the direction of the pitch axis of the vehicle 1.

The road surface bank angle θbank is generally referred to as a cant angle of a road surface in an automotive engineering field. In the present specification, however, the term "bank angle" will be used. In each of the embodiments described in the present specification, a road surface bank angle θbank in the case where the vehicle 1 on a road surface is in a right-down sloping posture is defined as a positive angle. Further, a road surface slope angle θslope in the case where the vehicle 1 on a road surface is in a front-down sloping posture is defined as a positive angle.

A reference character "Rot(δi)" denotes a coordinate conversion matrix for converting a vector quantity expressed in terms of the i-th wheel coordinate system (a vector quantity formed of a component in the x-axis direction and a component in the y-axis direction of the i-th wheel coordinate system) into a vector quantity expressed in terms of the vehicle body coordinate system (a vector quantity formed of a component in the X-axis direction and a component in the Y-axis direction of the vehicle body coordinate system). A coordinate conversion matrix R(δi) is a matrix (secondary square matrix) which is dependant on the steering angle δi of the i-th wheel 2-i and which has row vectors $(\cos(\delta i), \sin(\delta i))^T$ and $(-\sin(\delta i), \cos(\delta i))^T$ as a component of a first column and a component of a second column, respectively.

In this case, if a certain vector quantity ↑A is denoted by $(ax, ay)^T$ on the i-th wheel coordinate system and denoted by $(Ax, Ay)^T$ on the vehicle body coordinate system, then the relationship between $(Ax, Ay)^T$ and $(ax, ay)^T$ is expressed by $(Ax, Ay)^T = Rot(\delta i)*(ax, ay)^T$. Accordingly, the relationship between the wheel advancing speed vector ↑Vi of each of the wheels 2-i and the wheel advancing speed vector on the wheel coordinate system ↑Vsub_i is given by ↑Vi=Rot(δi)*↑Vsub_i.

Similarly, the relationship between the wheel two-dimensional road surface reaction force ↑Fi of each of the wheels 2-i and the wheel two-dimensional road surface reaction force ↑Fsub_i on the wheel coordinate system is given by ↑Fi=Rot(δi)*↑Fsub_i. The coordinate conversion matrix for converting a vector quantity expressed on the vehicle body coordinate system into a vector quantity expressed on the i-th wheel coordinate system, i.e., an inversed matrix of Rot(δi), will be Rot(−δi).

In the following description, the term "actual" will, in some cases, prefix a name or a designation, such as a state amount or a vector quantity, like "an actual yaw rate" to represent the state amount or the vector quantity of an actual value (true value). In this case, a variable (reference character) denoting the state amount or the vector quantity will be suffixed by "_act" (e.g., "γ_act").

Further, to express an observed value (a detected value or an estimated value) of a state amount or a vector quantity, the name (designation) of the state amount or the vector quantity will be suffixed by "detected value" or "estimated value" (e.g., "yaw rate detected value" or "yaw rate estimated value"). In this case, as a general rule, the term "estimated value" will be used for other observed values generated on the basis of observed values calculated by a vehicle model calculator 24, which will be described later, or on the basis of the calculated observed values.

Further, the term "detected value" will be used for an observed value which is obtained on the basis of an output of a certain sensor without using the observed value calculated by the vehicle model calculator 24. For a detected value, a variable (reference character) will be suffixed by "_sens" (e.g., "γ_sens"). For an estimated value, a variable (reference character) will be suffixed by "_estm" (e.g., "γ_estm").

Further, to express a temporal change rate of a state amount (a differential value based on time), "dot" will be added in a variable (reference character) of a state amount (e.g., "γdot").

Based on the description given above, the embodiments of the present invention will be described in detail.

First Embodiment

First, the processing by the controller 20 in a first embodiment will be described in detail. In the present embodiment, as illustrated by the block diagram of FIG. 3, the controller 20 has, as major functional means, an amount-to-be-observed detector 22, a vehicle model calculator 24, a μ estimator 26, a bank angle estimator 28, and a slope angle estimator 30.

The amount-to-be-observed detector 22 uses outputs from the aforesaid various sensors of the vehicle 1 (detection data) to carry out the processing for detecting predetermined types of amounts to be observed related to a behavior of the vehicle 1, and generates detected values of the amounts to be observed.

In the present embodiment, the amounts to be observed by the amount-to-be observed detector 22 include actual steering angles δ1_act and δ2_act of steering control wheels (front wheels) 2-1 and 2-2, an actual wheel speed Vw_i_act (i=1, 2, 3, 4), an actual yaw rate γ_act and an actual yaw angular acceleration γdot_act of the vehicle 1, an actual vehicle center of gravity longitudinal acceleration Accx_act and an actual vehicle center of gravity lateral acceleration Accy_act, and an actual wheel torque Tq_i_act (i=1, 2, 3, 4).

To generate the detected values of the amounts to be observed, the amount-to-be-observed detector 22 has a wheel steering angle detector 22a which generates wheel steering angle detected values δ1_sens and δ2_sens of the front wheels 2-1 and 2-2, respectively, a wheel speed detector 22b which generates the wheel speed detected value Vw_i_sens (i=1, 2, 3, 4), a yaw rate detector 22c which generates a yaw rate detected value γ_sens, a yaw angular acceleration detector 22d which generates a yaw angle acceleration detected value γdot_sens, a longitudinal acceleration detector 22e which generates the vehicle center of gravity longitudinal acceleration detected value Accx_sens, a lateral acceleration detector 22f which generates the vehicle center of gravity lateral acceleration detected value Accy_sens, and a wheel torque detector 22g which generates a wheel torque detected value Tq_i_sens (i=1, 2, 3, 4).

The vehicle model calculator 24 estimates a road surface reaction force acting on each wheel 2-i by using a dynamic model, which includes a friction characteristic model which expresses a relationship between the slip between each wheel 2-i and a road surface and a road surface reaction force acting on the wheel 2-i from the road surface and a vehicle motion model which expresses a relationship between an external force acting on the vehicle 1 and a motion of the vehicle 1 (hereinafter referred to simply as the vehicle model in some cases). The vehicle model calculator 24 also carries out the processing for estimating the state amount of a motion of the vehicle 1 dynamically caused by the road surface reaction force acting as the external force on the vehicle 1.

To carry out the processing, the vehicle model calculator 24 receives the detected values of the predetermined types of amounts to be observed (in the present embodiment, δ1_sens, δ2_sens, Vw_i_sens, γ_sens, Accx_sens, Accy_sens, and Tq_i_sens) and also a latest road surface frictional coefficient estimated value μ_estm which has already been determined by the μ estimator 26. Then, the vehicle model calculator 24 uses these received values and the aforesaid vehicle model to estimate the road surface reaction force of each wheel 2-i or the state amounts of the motion of the vehicle 1.

The estimated values determined by the vehicle model calculator 24 are roughly classified into a road surface reaction force estimated value, which is an estimated value related to a road surface reaction force, the translational motions in the longitudinal direction (the direction of the roll axis) and a lateral direction (the direction in the pitch axis) of the vehicle 1, and a vehicle motional state amount estimated value, which is the estimated value of a state amount related to a rotational motion about the yaw axis.

In this case, the road surface reaction force estimated value includes the driving/braking force Fsubx_i of each wheel 2-i, the lateral force Fusby_i, and a ground contact load Fz_i, and also includes a total road surface reaction force combined translational force vector estimated value ↑Fg_total_estm (Fgx_total_estm and Fgy_total_estm), and the total road surface reaction force resultant yaw moment estimated value Mgz_total_estm.

Further, the vehicle motional state amount estimated value includes the yaw rate estimated value γ_estm, the vehicle center of gravity velocity vector estimated value ↑Vg_estm (Vgx_estm and Vgy_estm), the vehicle center of gravity longitudinal acceleration estimated value Accx_estm, and the vehicle center of gravity lateral acceleration estimated value Accy_estm.

The μ estimator 26 carries out the processing for estimating the frictional coefficient μ of a road surface on which the vehicle 1 is traveling (the road surface frictional coefficient μ).

To implement the processing, the μ estimator 26 receives δ1_sens, δ2_sens, γ_sens, γdot_sens, and Accy_sens among the detected values of the amounts to be observed which have been generated by the amount-to-be-observed detector 22, the total road surface reaction force resultant translational force vector estimated value ↑Vg_total_estm (more specifically, the total road surface reaction force resultant lateral force estimated value Fgy_total_estm of ↑Vg_total_estm) and the total road surface reaction force resultant yaw moment estimated value Mgz_total_estm calculated by the vehicle model calculator 24, and the vehicle center of gravity longitudinal velocity estimated value Vgx_estm, which is the component in the X-axis direction (the component in the longitudinal direction of the vehicle 1) of the vehicle center of gravity velocity vector estimated value ↑Vg_estm of the vehicle motional state amount estimated value calculated by the vehicle model calculator 24. Then, the μ estimator 26 uses these input values to calculate the road surface frictional coefficient estimated value μ_estm, which is the estimated value of the road surface frictional coefficient μ.

The bank angle estimator 28 carries out the processing for estimating the road surface bank angle θbank (the bank angle θbank of a road surface on which the vehicle 1 is traveling).

To carry out the processing, the bank angle estimator 28 receives the vehicle center of gravity lateral acceleration detected value Accy_sens of the detected values of the amounts to be observed that have been generated by the amount-to-be-observed detector 22 and the vehicle center of gravity lateral acceleration estimated value Accy_estm of the vehicle motional state amount estimated values calculated by the vehicle model calculator 24. Then, the bank angle estimator 28 uses the input values to calculate the road surface bank angle estimated value θbank_estm, which is the estimated value of the bank angle θbank of the road surface.

The slope angle estimator 30 carries out the processing for estimating the road surface slope angle θslope (the slope angle θslope of a road surface on which the vehicle 1 is traveling).

To carry out the processing, the slope angle estimator 30 receives the vehicle center of gravity longitudinal acceleration detected value Accx_sens of the detected values of the amounts to be observed that have been generated by the amount-to-be-observed detector 22 and the vehicle center of gravity acceleration estimated value Accx_estm of the vehicle motional state amount estimated values calculated by the vehicle model calculator 24. Then, the slope angle estimator 30 uses the input values to calculate the road surface slope angle estimated value θslope_estm, which is the estimated value of the road surface slope angle θslope.

The controller 20 sequentially implements the processing illustrated by the flowchart of FIG. 4 at a predetermined arithmetic processing cycle by the amount-to-be-observed detector 22, the vehicle model calculator 24, the μ estimator 26, the bank angle estimator 28, and the slope angle estimator 30.

In the following description, in order to distinguish the value (a detected value, an estimated value, or the like) obtained in the current (present) arithmetic processing cycle of the controller 20 from a value obtained in the previous (last) arithmetic processing cycle, the former will be referred to as "the current value" and the latter as "the previous value" in some cases. Further, the reference character of the previous value will be suffixed by a subscript "_p" (e.g., "γ_estm_p"). In this case, "the previous value" means the latest value among the values already obtained in past arithmetic processing cycles of the controller 20. Any value will mean a current value unless otherwise specified as a current value or a previous value.

Referring to FIG. 4, the controller 20 first carries out the processing by the amount-to-be-observed detector 22 in S100. The amount-to-be-observed detector 22 generates the detected values δ1_sens, δ2_sens, Vw_i_sens (i=1, 2, 3, 4), γ_sens, γdot_sens, Accx_sens, Accy_sens, and Tq_i_sens of the amounts to be observed on the basis of the outputs of various sensors, including the wheel rotational angular velocity sensor 8-$i$ (i=1, 2, 3, 4), a brake pressure sensor 9-$i$ (i=1, 2, 3, 4), the steering control angle sensor 10, the transmission sensor 11, the accelerator (gas) pedal sensor 12, the yaw rate sensor 13, the longitudinal acceleration sensor 14, and the lateral acceleration sensor 15.

More specifically, the wheel steering angle detected values δ1_sens and δ2_sens are generated by the wheel steering angle detector 22*a* on the basis of outputs of the steering control angle sensor 10. Here, in the present embodiment, the actual steering angle δ1_act of the first wheel 2-1 and the actual steering angle δ2_act of the second wheel 2-2 are the same, so that the δ1_sens is regarded as equal to δ2_sens. Accordingly, hereinafter, the steering angles δ1 and δ2 of the front wheels 2-1 and 2-2 will be generically referred to as a front steering angle δf, and the wheel steering angle detected values δ1_sens and δ2_sens will be generically referred to as a front wheel steering angle detected value δf_sens.

Then, the wheel steering angle detector 22*a* determines the front wheel steering angle detected value δf_sens (=δ1_sens=δ2_sens) as the steering angle detected value common to the front wheels 2-1 and 2-2 on the basis of a steering control angle detected value θh_sens, which is the value of a steering control angle (converted value) indicated by an output value of the steering control angle sensor 10, according to a preset relationship (in the form of a model, a map or the like) between the steering control angle θh and the front wheel steering angle δf.

For example, in the case where the steering mechanism of the vehicle 1 is constructed such that the actual steering angles δ1_act and δ2_act of the front wheels 2-1 and 2-2 are substantially proportional to the actual steering control angle θh_act, the δf_sens is calculated by multiplying the θh_sens by a preset proportional constant, which is the so-called overall steering ratio.

In the case where the steering mechanism of the steering system has a steering actuator, as with a power steering, the operation state of the steering actuator or a state amount defining the operation state may be detected in addition to the steering control angle detected value θh_sens or in place of the steering control angle detected value θh_sens and the detected value may be used to determine the front wheel steering angle detected value δf_sens.

Alternatively, a more accurate steering system model or the like may be used to separately determine the steering angle detected values δ1_sens and δ2_sens of the front wheels 2-1 and 2-2, respectively. Then, the average value of the individual steering angle detected values δ1_sens and δ2_sens of the front wheels 2-1 and 2-2 (=(δ1_sens+δ2_sens)/2) may be determined as the front wheel state amount detected value of δf_sens that represents the actual steering angles δ1_act and δ2_act of the front wheels 2-1 and 2-2.

The wheel speed detected values Vw_i_sens (i=1, 2, 3, 4) are generated by the wheel speed detector 22*b* on the basis of the outputs of the wheel rotational angular velocity sensors 8-$i$ respectively corresponding thereto.

To be more specific, the wheel speed detector 22*b* determines the wheel speed detected value Vw_i_sens by multiplying the wheel rotational angular velocity detected value ωw_i_sens, which is the value of angular acceleration (converted value) indicated by an output value of the wheel rotational angular velocity sensor 8-$i$, by the value of a preset effective radius Rw_i of the i-th wheel 2-$i$ for each wheel 2-$i$.

The yaw rate detected value γ_sens and the yaw angular acceleration detected value γdot_sens are generated by the yaw rate detector 22*c* and the yaw angular acceleration detector 22*d*, respectively, on the basis of the outputs of the yaw rate sensor 13.

More specifically, the yaw rate detector 22*c* generates the value (converted value) of the angular velocity, which is indicated by an output value of the yaw rate sensor 13, as the yaw rate detected value γ_sens.

The yaw angular acceleration detector 22*d* differentiates the yaw rate detected value γ_sens, i.e., determines a temporal change rate to generate the yaw angular acceleration detected value γdot_sens, or generates the value (converted value) of the angular acceleration, which is indicated by the value obtained by differentiating an output value of the yaw rate sensor 13, as the yaw angular acceleration detected value γdot_sens.

Alternatively, the yaw angular acceleration detected value γdot_sens can be generated on the basis of an output of a different sensor from the yaw rate sensor 13. For instance, two acceleration sensors may be installed in the vehicle body 1B such that the sensors are spaced away from each other with an interval Lacc provided therebetween in the direction orthogonal to the direction of the yaw axis of the vehicle 1 (e.g., in the direction of the roll axis or the pitch axis of the vehicle 1).

In this case, these two acceleration sensors are disposed such that the two acceleration sensors sense the acceleration in a direction orthogonal to the direction of the interval between the two acceleration sensors and to the direction of the yaw axis. This arrangement allows the yaw angular acceleration detected value γdot_sens to be generated by dividing the difference between the acceleration detected values indicated by the output values of the two acceleration sensors by the interval Lacc.

The vehicle center of gravity longitudinal acceleration detected value Accx_sens is generated by the longitudinal acceleration detector 22e on the basis of an output of the longitudinal acceleration sensor 14. Further, the vehicle center of gravity lateral acceleration detected value Accy_sens is generated by the lateral acceleration detector 22f on the basis of an output of the lateral acceleration sensor 15.

Here, in the present embodiment, the position of the center-of-gravity point of the vehicle 1 is identified beforehand, and the longitudinal acceleration sensor 14 and the lateral acceleration sensor 15 are fixed to the vehicle body 1B such that the sensors are positioned at the center-of-gravity point. The longitudinal acceleration sensor 14 and the lateral acceleration sensor 15 may be an acceleration sensor combining the two sensors into one, i.e., a two-axis acceleration sensor.

The longitudinal acceleration detector 22e generates the value (converted value) of the acceleration indicated by an output value of the longitudinal acceleration sensor 14 as the vehicle center of gravity longitudinal acceleration detected value Accx_sens. The lateral acceleration detector 22f generates the value (converted value) of the acceleration indicated by an output value of the lateral acceleration sensor 15 as the vehicle center of gravity lateral acceleration detected value Accy_sens.

Even if the longitudinal acceleration sensor 14 or the lateral acceleration sensor 15 is disposed at a position deviating from the center-of-gravity point of the vehicle 1, the vehicle center of gravity longitudinal acceleration detected value Accx_sens or the vehicle center of gravity lateral acceleration detected value Accy_sens can be generated by correcting the acceleration detected value indicated by an output value of the sensor 14 or 15 according to the yaw angular acceleration detected value γdot_sens (or the differential value of the yaw rate detected value γ_sens).

For example, if the longitudinal acceleration sensor 14 is disposed at a position which is away to the left side from the center-of-gravity point of the vehicle 1 by an interval denoted by Ly, then the vehicle center of gravity longitudinal acceleration detected value Accx_sens can be generated by adding the value, which is obtained by multiplying the yaw angular acceleration detected value γdot_sens (or the differential value of the yaw rate detected value γ_sens) by Ly, to the acceleration detected value indicated by an output value of the longitudinal acceleration sensor 14 (the detected value of the acceleration at the position of the sensor 14).

Similarly, if the lateral acceleration sensor 15 is disposed at a position which is away to the front side from the center-of-gravity point of the vehicle 1 by an interval denoted by Lx, then the vehicle center of gravity lateral acceleration detected value Accy_sens can be generated by subtracting the value obtained by multiplying the yaw angular acceleration detected value γdot_sens (or the differential value of the yaw rate detected value γ_sens) by Lx from the acceleration detected value indicated by an output value of the lateral acceleration sensor 15 (the detected value of the acceleration at the position of the sensor 15).

Supplementally, the acceleration detected or sensed by the longitudinal acceleration sensor 14 carries a meaning as the component in the longitudinal direction of the vehicle body 1B (the component in the X-axis direction of the vehicle body coordinate system) of an acceleration vector generated at the center-of-gravity point of the vehicle 1 by the entire external force (resultant force) acting on the vehicle 1 (the acceleration vector obtained by dividing the translational force vector acting on the center-of-gravity point of the vehicle 1 due to the entire external force by a vehicle 1 mass m).

In this case, if the actual road surface slope angle θslope_act is zero, then the acceleration sensed by the longitudinal acceleration sensor 14 will be the actual vehicle center of gravity longitudinal acceleration Accx_act itself as the proper object to be detected. Meanwhile, if the actual road surface slope angle θslope_act is not zero, then the longitudinal direction (the X-axis direction) of the vehicle body 1B, which is the sensing direction of the longitudinal acceleration sensor 14, will be inclined by θslope_act relative to a horizontal plane.

Hence, the longitudinal acceleration sensor 14 senses not only the actual vehicle center of gravity longitudinal acceleration Accx_act but also an acceleration component in a direction parallel to the longitudinal direction of the vehicle body 1B (=−g*sin(θslope_act); g: Gravitational acceleration constant) of the gravitational acceleration.

Thus, the vehicle center of gravity longitudinal acceleration detected value Accx_sens as the acceleration indicated by an output of the longitudinal acceleration sensor 14 will be actually the detected value of the acceleration obtained by superimposing an acceleration component in a direction parallel to the longitudinal direction of the vehicle body 1B of the gravitational acceleration onto the actual vehicle center of gravity longitudinal acceleration Accx_act (=Accx_act−g*sin(θslope_act)). This includes the case where θslope_act is zero.

Similarly, the acceleration detected or sensed by the lateral acceleration sensor 15 carries a meaning as the component in the lateral direction of the vehicle body 1B (the component in the Y-axis direction of the vehicle body coordinate system) of an acceleration vector generated at the center-of-gravity point of the vehicle 1 by the entire external force (resultant force) acting on the vehicle 1. In this case, if the actual road surface bank angle θbank_act is zero, then the acceleration sensed by the lateral acceleration sensor 15 will be the actual vehicle center of gravity lateral acceleration Accy_act itself as the proper object to be detected.

Meanwhile, if the actual road surface bank angle θbank_act is not zero, then the lateral direction (the Y-axis direction) of the vehicle body 1B, which is the sensing direction of the lateral acceleration sensor 15, will be inclined by θbank_act relative to a horizontal plane. Hence, the lateral acceleration sensor 15 senses not only the actual vehicle center of gravity lateral acceleration Accy_act but also an acceleration component in a direction parallel to the lateral direction of the vehicle body 1B (=g*sin(θbank_act)).

Thus, the vehicle center of gravity lateral acceleration detected value Accy_sens as the acceleration indicated by an output of the lateral acceleration sensor 15 will be actually the detected value of the acceleration obtained by superimposing an acceleration component in a direction parallel to the lateral direction of the vehicle body 1B of the gravitational acceleration onto the actual vehicle center of gravity lateral acceleration Accy_act (=Accy_act+g*sin(θbank_act)). This includes the case where θbank_act is zero.

In the following description, the acceleration defined as the sum of the vehicle center of gravity longitudinal acceleration Accx and the acceleration component in the direction parallel to the longitudinal direction of the vehicle body 1B (=−g*sin(θslope)) of the gravitational acceleration (=Accx−g*sin(θslope)), that is, the acceleration sensed by the longitudinal acceleration sensor 14, will be referred to as the sensed-by-sensor longitudinal acceleration Accx_sensor.

Similarly, the acceleration defined as the sum of the vehicle center of gravity lateral acceleration Accy and the acceleration component in the direction parallel to the lateral direction of the vehicle body 1B (=g*sin(θbank)) of the gravitational acceleration (=Accx+g*sin(θbank)), that is, the acceleration sensed by the lateral acceleration sensor 15, will be referred to as the sensed-by-sensor lateral acceleration Accy_sensor.

The sensed-by-sensor longitudinal acceleration Accx_sensor agrees with the vehicle center of gravity longitudinal acceleration Accx when θslope is zero. The sensed-by-sensor lateral acceleration Accy_sensor agrees with the vehicle center of gravity lateral acceleration Accy when θbank is zero. In a precise sense, therefore, the vehicle center of gravity longitudinal acceleration detected value Accx_sens generated by the longitudinal acceleration detector 22e and the vehicle center of gravity lateral acceleration detected value Accy_sens generated by the lateral acceleration detector 22f mean the detected value of the sensed-by-sensor longitudinal acceleration Accx_sensor and the detected value the sensed-by-sensor lateral acceleration Accy_sensor, respectively.

The wheel torque detected value Tq_i_sens (i=1, 2, 3, 4) is generated by the wheel torque detector 22g on the basis of an output of the brake pressure sensor 9-i and outputs of the accelerator (gas) pedal sensor 12 and the transmission sensor 11 corresponding thereto.

To be specific, the wheel torque detector 22g recognizes an output torque (required torque) of the engine 3 from the detected value of the amount of depression on the accelerator (gas) pedal indicated by an output value of the accelerator (gas) pedal sensor 12 and also recognizes the deceleration ratio between the engine 3 and each wheel 2-i from the detected value of the transmission gear ratio of the transmission 4a indicated by an output value of the transmission sensor 11.

Then, the wheel torque detector 22g determines the driving torque to be transmitted to each wheel 2-i from the engine 3 (the driving torque to be imparted to each wheel 2-i by the drive system of the vehicle 1) on the basis of the recognized output torque of the engine 3 and the aforesaid deceleration ratio.

Further, the wheel torque detector 22g determines the braking torque to be imparted to each wheel 2-i from each braking mechanism 7-i (the braking torque to be imparted to each wheel 2-i by the braking system of the vehicle 1) on the basis of the brake pressure detected value indicated by an output value of the brake pressure sensor 9-i.

Then, the wheel torque detector 22g calculates the value of a torque of the total sum of the determined driving torque and braking torque (a resultant torque) as the wheel torque detected value Tq_i_sens for each wheel 2-i.

The above has described the details of the processing in S100, i.e., the processing by the amount-to-be-observed detector 22.

In the processing by the amount-to-be-observed detector 22, an output of a sensor may be passed through a filter, such as a high-cut filter, for removing a high-frequency noise component and then input to the detectors 22a to 22g.

Alternatively, the detected value of an amount to be observed which has been obtained by using an output of a sensor as it is may be taken as a provisional detected value, and the provisional detected value may be passed through a filter, such as a high-cut filter, to generate a formal detected value of the amount to be observed.

Regarding the vehicle center of gravity lateral acceleration detected value Accy, in particular, if a device for detecting or estimating the roll angle of the vehicle body 1B (a relative inclination angle about the roll axis of the vehicle body 1B with respect to a road surface) is provided, then the vehicle center of gravity lateral acceleration detected value Accy is preferably obtained as described below. The device for detecting or estimating the roll angle of the vehicle body 1B is, for example, a device which detects the stroke of a suspension by a sensor and calculates the roll angle of the vehicle body 1B from the detected value thereof.

An influence portion of an output of the lateral acceleration sensor 15 attributable to a roll motion of the vehicle body 1B (an influence portion of the gravitational acceleration contained in an output of the acceleration sensor 15 caused by the tilting of the lateral acceleration sensor 15 by a roll angle of the vehicle body 1B) is estimated by using an observed value of the roll angle. Then, preferably, the estimated influence portion is subtracted from the acceleration detected value indicated by an output value of the lateral acceleration sensor 15 so as to obtain the vehicle center of gravity lateral acceleration detected value Accy.

After carrying out the processing by the amount-to-be-observed detector 22 as described above, the controller 20 carries out the processing from S102 to S116 by the vehicle model calculator 24.

Figure 5:
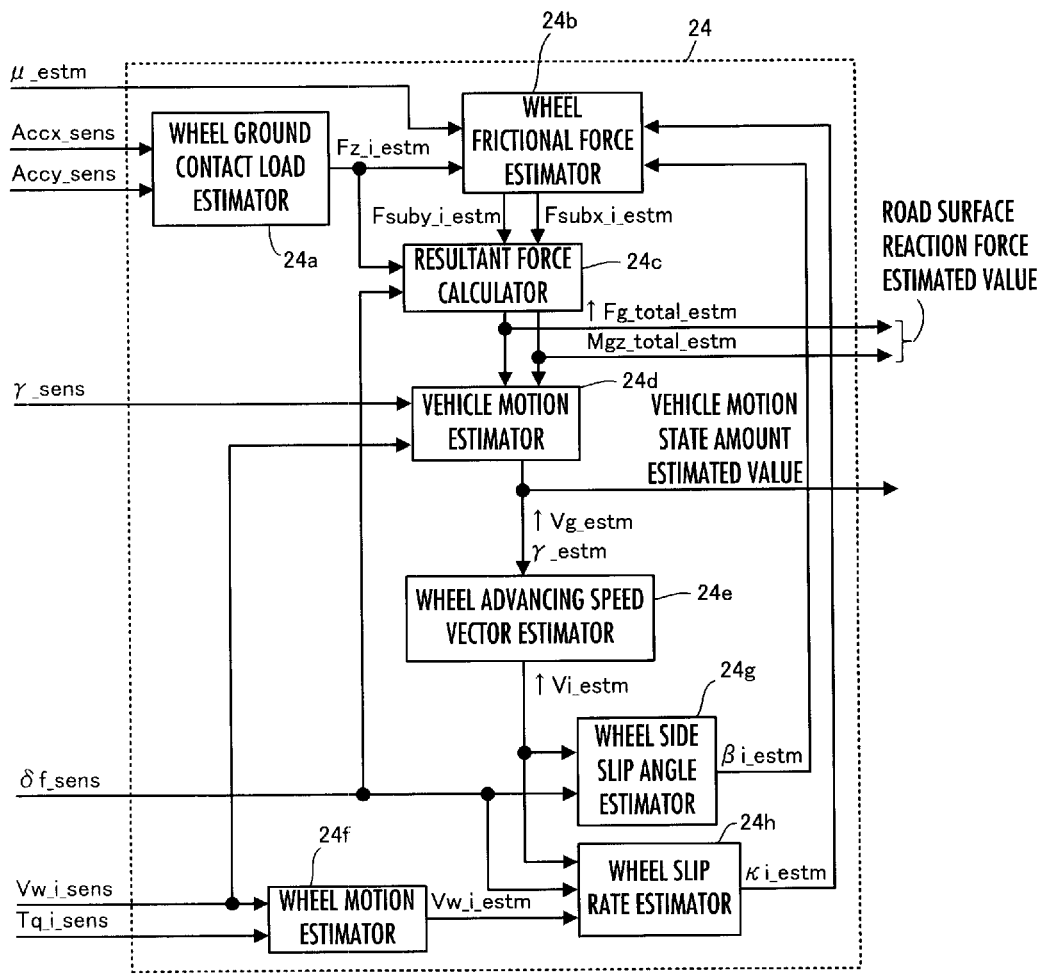
FIG. 5 is a block diagram illustrating functions of a vehicle model calculator illustrated in FIG. 3.

The following will explain the processing in detail with reference to FIG. 4 and FIG. 5.

As illustrated in FIG. 5, the vehicle model calculator 24 has, as the functions thereof, a wheel ground contact load estimator 24a which determines a ground contact load estimated value Fz_i_estm of each wheel 2-i, a wheel frictional force estimator 24b which determines a driving/braking force estimated value Fsubx_i_estm, which is the estimated value of a component in the x-axis direction of the wheel two-dimensional road surface reaction force ↑Fsub_i on the wheel coordinate system of each wheel 2-i and a lateral force estimated value Fsuby_i_estm, which is the estimated value of a component in the y-axis direction thereof, a resultant force calculator 24c which determines the total road surface reaction force resultant translational force vector ↑Fg_total_estm and the total road surface reaction force resultant yaw moment Mgz_total_estm, a vehicle motion estimator 24d which determines a vehicle motional state amount estimated value, a wheel advancing speed vector estimator 24e which determines the wheel advancing speed vector estimated value ↑Vi_estm of each wheel 2-i, a wheel motion estimator 24f which determines the wheel speed estimated value Vw_i_estm of each wheel 2-i, a wheel side slip angle estimator 24g which determines a wheel side slip angle estimated value βi estm, and a wheel slip rate estimator 24h which determines the wheel slip rate estimated value κi_estm of each wheel 2-i.

In the processing from S102 to S116, first, in S102, the wheel ground contact load estimator 24a calculates the ground contact load estimated value Fz_i_estm of each wheel 2-i.

In this case, according to the present embodiment, the wheel ground contact load estimator 24a uses the vehicle center of gravity longitudinal acceleration detected value Accx_sens and the vehicle center of gravity lateral acceleration detected value Accy_sens of the detected value of an amount to be observed, which has been obtained in S100, to calculate the ground contact load estimated value Fz_i_estm (i=1, 2, 3, 4) according to an expression 1-1 given below.

$$Fz\_i\_estm = Fz0\_i + Wx\_i * Accx\_sens + Wy\_j * Accy\_sens \qquad \text{Expression 1-1}$$

Here, in expression 1-1, Fz0_i denotes a value of the ground contact load Fz_i of the i-th wheel 2-i in a state wherein the vehicle 1 is parked (stationary) on a horizontal road surface (hereinafter referred to as the ground contact load reference value), Wx_i denotes a weighting factor which defines a change in the ground contact load Fz_i of the i-th wheel 2-i dependent upon the vehicle center of gravity longitudinal acceleration Accx (a change from Fz0_i), and Wy_i denotes a weighting factor which defines a change in the ground contact load Fz_i of the i-th wheel 2-i dependent upon the vehicle center of gravity lateral acceleration Accy (a change from Fz0_i). The values of these Fz0_i, Wx_i, and Wy_i are predetermined values that have been set beforehand.

Thus, according to expression 1-1, a change in the ground contact load Fz_i (an increased or decreased amount from the ground contact load reference value Fz0_i) of each wheel 2-i attributable to the acceleration of the center-of-gravity point of the vehicle 1 (the acceleration in a direction orthogonal to the yaw-axis direction) is determined by linearly coupling the vehicle center of gravity longitudinal acceleration detected value Accx_sens and the vehicle center of gravity lateral acceleration detected value Accy_sens. Then, the determined change is added to the ground contact load reference value Fz0_i to obtain the ground contact load estimated value Fz_i_estm.

Alternatively, the relationship between the vehicle center of gravity longitudinal acceleration Accx and the vehicle center of gravity lateral acceleration Accy and the ground contact load Fz_i may be formed into a map beforehand, and the ground contact load estimated value Fz_i_estm of each wheel 2-i may be determined according to the map.

The Fz_i_estm may be determined by reflecting the dynamic characteristic of a suspension device (not shown) of the vehicle 1.

For example, the dynamic characteristic of the suspension device of the vehicle 1 is modeled in association with a rotational motion about the roll axis of the vehicle body 1B (a roll motion) or a rotational motion about the pitch axis thereof (a pitch motion) in advance. Then, motional state amounts related to the roll motion or the pitch motion, e.g., the inclination angle of the vehicle body 1B about the roll axis or the observed value of the changing velocity thereof, and the inclination angle of the vehicle body 1B about the pitch axis or the observed value of the changing velocity thereof, and the aforesaid model indicating the dynamic characteristic of the suspension device are used to estimate the translational force in the vertical direction, i.e., the yaw-axis direction, acting on each wheel 2-i from the suspension device.

Then, for each wheel 2-i, the estimated translational force and the gravity acting on the wheel 2-i are added to determine the ground contact load estimated value Fz_i_estm. This makes it possible to further enhance the accuracy of the ground contact load estimated value Fz_i_estm (i=1, 2, 3, 4).

If the change in the ground contact load Fz_i of each wheel 2-i is regarded sufficiently small, then the processing in S102 may be omitted and the ground contact load estimated value Fz_i_estm may be set to a predetermined value that has been set beforehand (e.g., the ground contact load reference value Fz0_i).

In the case where the ground contact load estimated value Fz_i_estm (i=1, 2, 3, 4) is determined without using the vehicle center of gravity longitudinal acceleration detected value Accx_sens and the vehicle center of gravity lateral acceleration detected value Accy_sens, there is no need to input Accx_sens and Accy_sens to the vehicle model calculator 24.

Subsequently, in S104, the wheel advancing speed vector estimator 24e calculates the wheel advancing speed vector $\uparrow$Vi_estm of each wheel 2-i.

In this case, the wheel advancing speed vector estimator 24e calculates each wheel advancing speed vector estimated value $\uparrow$Vi_estm $(=(Vx\_i\_estm, Vy\_i\_estm)^T)$ according to expression 1-2 given below on the basis of the vehicle center of gravity velocity vector estimated value $\uparrow$Vg_estm_p $(=(Vgx\_estm\_p, Vgy\_estm\_p)^T)$ and the yaw rate estimated value γ_estm_p of the vehicle motional state amount estimated value (the previous value) calculated by the processing in S114 (the processing by the vehicle motion estimator 24d), which will be discussed later, in a previous arithmetic processing cycle, and each wheel position vector $\uparrow$Pi $(=(Px\_i, Py\_i)^T)$ which has been set beforehand.

$$\uparrow Vi\_estm = \uparrow Vg\_estm\_p + (-Py\_i * \gamma\_estm\_p, Px\_i * \gamma\_estm\_p)^T \quad \text{Expression 1-2}$$

Here, the second term of the right side of expression 1-2 means a relative speed of the i-th wheel 2-i with respect to the center-of-gravity point of the vehicle 1 (a relative speed in the direction orthogonal to the yaw-axis direction) produced by a rotational motion about the yaw axis of the vehicle 1, i.e., a rotational motion in which the value of the yaw rate becomes γ_estm_p.

In place of the yaw rate estimated value (previous value) γ_estm_p of expression 1-2, a yaw rate detected value γ_sens (a previous value or a current value) may be used.

Subsequently, in S106, the wheel slip rate estimator 24h calculates the wheel slip rate estimated value κi_estm of each wheel 2-i.

In this case, the wheel slip rate estimator 24h calculates each wheel slip rate estimated value κi_estm on the basis of the front wheel steering angle detected value (the current value) δf_sens (=δ1_sens=δ2_sens) of the detected values of the amounts to be observed that have been obtained in S100, the wheel speed estimated value (the previous value) Vw_i_estm_p (i=1, 2, 3, 4) calculated by the processing in S116 (the arithmetic processing by the wheel motion estimator 24f), which will be discussed later, in the previous arithmetic processing cycle, and the wheel advancing speed vector estimated value (the current value) $\uparrow$Vi_estm (i=1, 2, 3, 4) calculated in S114.

To be more specific, the wheel slip rate estimator 24h first calculates the wheel advancing speed vector estimated value on the wheel coordinate system $\uparrow$Vsub_i_estm by coordinate-converting the wheel advancing speed vector estimated value $\uparrow$Vi_estm according to expression 1-3 given below for each wheel 2-i.

$$\uparrow V\text{sub}\_i\_estm = Rot(-\delta i\_sens) * \uparrow Vi\_estm \quad \text{Expression 1-3}$$

In this case, in expression 1-3, the front wheel steering angle detected value δf_sens is used as the values of δ1_sens and δ2_sens for the front wheels 2-1 and 2-2. Further, in the present embodiment, the rear wheels 2-3 and 2-4 are non-steering wheels, so that the values of δ3_sens and δ4_sens in expression 1-3 are zero. Hence, the arithmetic processing of expression 1-3 may be omitted for the rear wheels 2-3 and 2-4, because $\uparrow$Vsub_3_estm=$\uparrow$V3_estm and $\uparrow$Vsub_4_estm=$\uparrow$V4_estm hold.

If the estimated value of a component in the y-axis direction Vsuby_i_estm of the wheel advancing speed vector estimated value on each wheel coordinate system $\uparrow$Vsub_i_estm is not used for the arithmetic processing (e.g., the processing in S108), which will be discussed later, then the estimated value of only the component in the x-axis direction Vsubx_i_estm of the wheel advancing speed vector estimated value on each wheel coordinate system $\uparrow$Vsub_i_estm may be calculated.

Then, the wheel slip rate estimator 24h calculates the wheel slip rate estimated value κi_estm according to expression 1-4 given below for each wheel 2-i on the basis of estimated value of only the component in the x-axis direction Vsubx_i_estm of the wheel advancing speed vector estimated value on each wheel coordinate system $\uparrow$Vsub_i_estm calculated as described above and the wheel speed estimated value (the previous value) Vw_i_estm_p.

$$\kappa i\_estm = (V\text{subx}\_i\_estm - Vw\_i\_estm\_p)/\max(V\text{subx}\_i\_estm, Vw\_i\_estm\_p) \quad \text{Expression 1-4}$$

In this case, when the vehicle 1 is accelerated by imparting the driving force from the drive system of the vehicle 1 to the front wheels 2-1 and 2-2, which are the driving wheels, Vsubx_i_estm≤Vw_i_estm_p holds, so that κi_estm≤0 holds. When the vehicle 1 is decelerated by imparting a braking force from the braking system of the vehicle 1 to each wheel 2-$i$, Vsubx_i_estm≥Vw_i_estm_p holds, so that κi_estm≤0 holds.

In place of the wheel speed estimated value (a previous value) Vw_i_estm_p, the wheel speed detected value Vw_i_sens (a previous value or a current value) may be used. In this case, the wheel motion estimator 24$f$, which will be described in detail later, is unnecessary.

Subsequently, in S108, the wheel side slip angle estimator 24$g$ calculates the wheel side slip angle estimated value βi_estm of each wheel 2-$i$.

In this case, the wheel side slip angle estimator 24$g$ calculates each wheel side slip angle estimated value βi_estm on the basis of the front wheel steering angle detected value βf_sens (=δ1_sens=δ2_sens) of the detected values of the amounts to be observed, which have been obtained in S100, and the wheel advancing speed vector estimated value ↑Vi_estm (i=1, 2, 3, 4) calculated in S104.

To be specific, the wheel side slip angle estimator 24$g$ first calculates the wheel position side slip angle estimated value β0$i$_estm for each wheel 2-$i$ according to expression 1-5 given below on the basis of the estimated value of a component in the X-axis direction Vx_i_estm of the wheel advancing speed vector estimated value ↑Vi_estm and the estimated value of a component in the Y-axis direction Vy_i_estm.

$$\beta 0i\_estm = \tan^{-1}(Vy\_i\_estm/Vx\_i\_estm) \quad \text{Expression 1-5}$$

Then, wheel side slip angle estimator 24$g$ calculates the wheel side slip angle estimated value βi_estm for each wheel 2-$i$ according to expression 1-6 given below on the basis of the wheel position side slip angle estimated value β0$i$_estm calculated as described above and the steering angle detected value δi_sens.

$$\beta i\_estm = \beta 0i\_estm - \delta i\_sens \quad \text{Expression 1-6}$$

In this case, in expression 1-6, the front wheel steering angle detected value δf_sens is used as the values of δ1_sens and δ2_sens for the front wheels 2-1 and 2-2. Further, in the present embodiment, the rear wheels 2-3 and 2-4 are non-steering wheels, so that the values of δ3_sens and δ4_sens in expression 1-6 are zero. Hence, β3_estm=β03_estm holds and β4_estm=β04_estm holds.

The wheel side slip angle estimated value βi_estm may be calculated according to expression 1-7 given below on the basis of the estimated value of a component in the x-axis direction Vsubx_i_estm and the estimated value of a component in the y-axis direction Vsuby_i_estm of the wheel advancing speed vector estimated value on the wheel coordinate system ↑Vsub_i_estm calculated according to the aforesaid expression 1-3.

$$\beta i\_estm = \tan^{-1}(Vsuby\_i\_estm/Vsubx\_i\_estm) \quad \text{Expression 1-7}$$

Subsequently, in S110, the wheel frictional force estimator 24$b$ calculates the estimated value of the wheel two-dimensional road surface reaction force on the wheel coordinate system ↑Fsub_i (=(Fsubx_i_estm, Fsuby_i_estm)$^T$) of each wheel 2-$i$.

Here, the wheel frictional force estimator 24$b$ has a friction characteristic model which expresses the relationship between the slip between each wheel 2-$i$ and a road surface and the road surface reaction force acting on the wheel 2-$i$ from the road surface. The friction characteristic model in the present embodiment represents the driving/braking force Fsubx_i and Fsuby_i of the wheel two-dimensional road surface reaction force on the wheel coordinate system ↑Fsub_i as the frictional force acting on each wheel 2-$i$ from a road surface and the lateral force Fsuby_i as the functions using the wheel slip rate κi and the wheel side slip angle βi, which indicate the slip state of the i-th wheel 2-$i$, the ground contact load Fz_i, and the road surface frictional coefficient μ as input parameters, as indicated by expressions 1-8 and 1-9 given below.

$$Fsubx\_i = \text{func}\_fx\_i(\kappa i, \beta i, Fz\_i, \mu) \quad \text{Expression 1-8}$$

$$Fsuby\_i = \text{func}\_fy\_i(\kappa i, \beta i, Fz\_i, \mu) \quad \text{Expression 1-9}$$

In this case, the function func_fx_i (κi, βi, Fz_i, μ) of the right side of expression 1-8, i.e., a function func_fx_i which defines the relationship between Fsubx_i and κi, βi, Fz_i, μ is represented by expression 1-8a given below in an example of the present embodiment.

$$\text{func}\_fx\_i(\kappa i, \beta i, Fz\_i, \mu) = \mu * Cslp\_i(\kappa i) * Cattx\_i(\beta i) * Fz\_i \quad \text{Expression 1-8a}$$

Cslp_i(κi) in this expression 1-8a denotes a coefficient that defines the characteristic of changes in the driving/braking force Fsubx_i caused by a change in the wheel slip rate κi, and Cattx_i(βi) denotes a coefficient that defines the characteristic of changes in the driving/braking force Fsubx_i caused by changes in the wheel side slip angle βi (i.e., changes in the lateral force Fsuby_i).

Figure 6A:
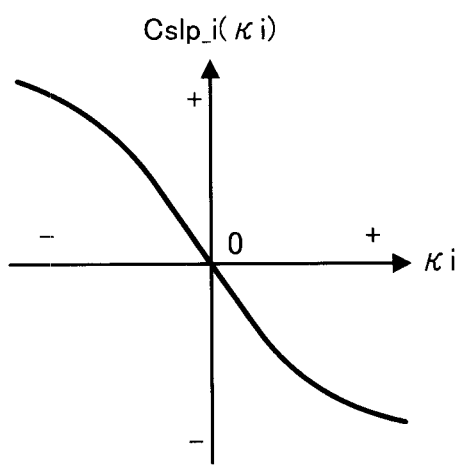
FIGS. 6(a) and 6(b) are graphs for explaining the processing by a wheel slip rate estimator illustrated in FIG. 5.
Figure 6B:
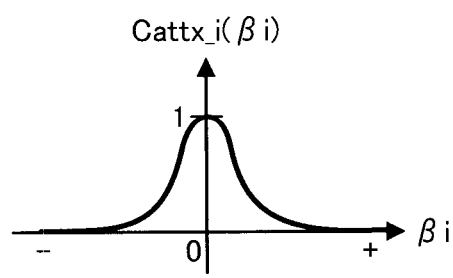

The relationship between Cslp_i(κi) and κi is set as illustrated by, for example, the graph of FIG. 6($a$). In other words, the relationship is set such that the coefficient Cslp_i(κi) becomes a monotonically decreasing function relative to the wheel slip rate κi.

More specifically, the relationship between Cslp_i(κi) and κi is set such that the value of the function func_fx_i (=driving/braking force Fsubx_i) increases in a negative direction (the direction in which the braking force increases) as the magnitude of the wheel slip rate κi increases in a situation wherein κi>0 holds (a situation wherein the vehicle 1 is decelerating), while the value of the function func_fx_i (=driving/braking force Fsubx_i) increases in a positive direction (the direction in which the driving force increases) as the magnitude of the wheel slip rate κi increases in a situation wherein κi<0 holds (a situation wherein the vehicle 1 is accelerating).

According to the relationship illustrated in FIG. 6($a$), the coefficient Cslp_i(κi) has a saturation characteristic relative to the wheel slip rate κi. This means that the magnitude of the rate of changes in Cslp_i(κi) in response to changes in κi, i.e., the value obtained by differentiating Cslp_i(κi) by κi, decreases as the absolute value of κi increases.

Further, the relationship between the coefficient Cattx_i (βi) and the wheel side slip angle βi is set as illustrated by, for example, the graph of FIG. 6($b$). More specifically, the relationship is set such that the value of the coefficient Cattx_i(βi) changes toward 0 from 1 as the absolute value of the wheel side slip angle βi increases from zero.

In other words, the relationship between Cattx_i(βi) and βi is set such that the magnitude of the value of the function func_fx_i (=driving/braking force Fsubx_i) decreases as the absolute value of the wheel side slip angle βi increases. This is because, in general, the magnitude of the lateral force Fsuby_i increases and consequently the magnitude of the driving/braking force Fsubx_i decreases as the absolute value of the wheel side slip angle βi increases.

Accordingly, the friction characteristic model represented by expressions 1-8 and 1-8a indicates that the driving/braking force Fsubx_i of the i-th wheel 2-$i$ is proportional to the road surface frictional coefficient μ and the ground contact load Fz_i, the Fsubx_i is a monotonically decreasing function relative to the wheel slip rate κi, and also displays the relationship in which the magnitude of Fsubx_i decreases as the absolute value of the wheel side slip angle βi increases.

Supplementally, the friction characteristic model represented by expressions 1-8 and 1-8a as described above corresponds to a first model of the friction characteristic models in the present invention.

Further, the function func_fy_i (κi, βi, Fz_i, μ) of the right side of expression 1-9, i.e., the function func_fy_i defining the relationship between Fsuby_i and κi, βi, Fz_i, μ is represented by expression 1-9a given below in an example of the present embodiment.

$$\mathrm{func\_fy\_}i(\kappa i, \beta i, Fz\_i, \mu) = \mu * Cbeta\_i(\beta i) * Catty\_i(\kappa i) * Fz\_i \quad \text{Expression 1-9a}$$

Cbeta_i(βi) in this expression 1-9a denotes a coefficient which defines the characteristic of changes in the lateral force Fsuby=i caused by changes in the wheel side slip angle βi, and Catty_i(βi) denotes a coefficient that defines the characteristic of changes in the lateral force Fsuby_i caused by changes in the wheel slip rate κi (i.e., changes in the driving/braking force Fsubx_i).

Figure 7A:
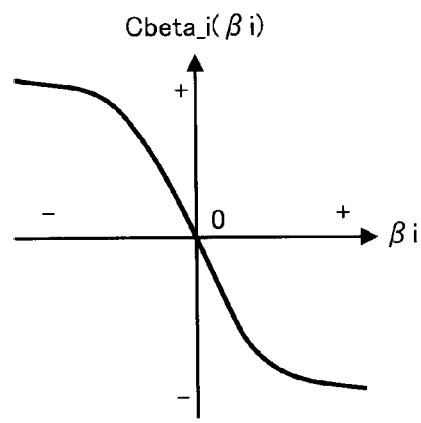
FIGS. 7(a) and 7(b) are graphs for explaining the processing by a wheel side slip angle estimator illustrated in FIG. 5.
Figure 7B:
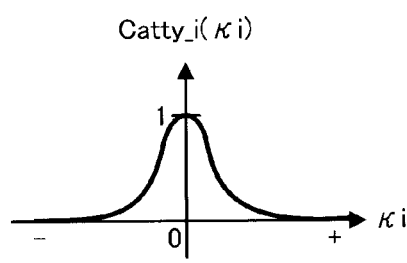

The relationship between Cbeta_i(βi) and βi is set, for example, as illustrated by the graph of FIG. 7($a$). More specifically, the relationship is set such that the coefficient Cbeta_i(βi) becomes a monotonically decreasing function relative to the wheel side slip angle βi.

To be more specific, the relationship between Cbeta_i(βi) and βi is set such that the value of the function func_fy_i (=lateral force Fsuby_i) increases in the negative direction (the right direction of the i-th wheel 2-$i$) as the magnitude of the wheel side slip angle βi increases in a situation wherein βi>0 holds (a situation wherein Vsuby_i holds), while the value of the function func_fy_i (=lateral force Fsuby_i) increases in the positive direction (the left direction of the i-th wheel 2-$i$) in a situation wherein βi<0 holds (a situation wherein Vsuby_i<0 holds).

According to the relationship illustrated in FIG. 7($a$), the coefficient Cbeta_i(βi) has a saturation characteristic relative to the wheel side slip angle βi. This means that the magnitude of the rate of changes in Cbeta_i(βi) in response to changes in βi (the value obtained by differentiating Cbeta_i(βi) by βi) decreases as the absolute value of βi increases.

Further, the relationship between the coefficient Catty_i(κi) and the wheel side slip rate κi is set as illustrated by, for example, the graph of FIG. 7($b$). More specifically, the relationship is set such that the value of the coefficient Catty_i(κi) changes toward 0 from 1 as the absolute value of the wheel side slip angle κi increases from zero.

In other words, the relationship between Catty_i(κi) and κi is set such that the magnitude of the lateral force Fsuby_i as the value of the function func_fy_i decreases as the absolute value of the wheel slip rate κi increases. This is because, in general, the magnitude of t the driving/braking force Fsubx_i increases and consequently the magnitude of the lateral force Fsuby_i decreases as the absolute value of the wheel slip rate κi increases.

Accordingly, the friction characteristic model represented by expressions 1-9 and 1-9a exhibits that the lateral force Fsuby_i of the i-th wheel 2-$i$ is proportional to the road surface frictional coefficient μ and the ground contact load Fz_i, and the Fsuby_i is a monotonically decreasing function relative to the wheel side slip angle βi, and also displays the relationship in which the magnitude of Fsuby_i decreases as the absolute value of the wheel slip rate κi increases.

Supplementally, the friction characteristic model represented by expressions 1-9 and 1-9a as described above corresponds to a second model of the friction characteristic models in the present invention.

In S110, the wheel frictional force estimator 24$b$ determines the wheel two-dimensional road surface reaction force estimated value on the wheel coordinate system ↑Fsub_i of each wheel 2-$i$ by using the friction characteristic model set as described above.

To be more specific, for each wheel 2-$i$, the wheel frictional force estimator 24$b$ computes the right side of expression 1-8a and the right side of expression 1-9a by using the wheel slip rate estimated value κi_estm calculated in S106, the wheel side slip angle estimated value βi_estm calculated in S108, the ground contact load estimated value Fz_i_estm calculated in S102, and the road surface frictional coefficient estimated value μ_estm_p calculated by the processing in S122 (the arithmetic processing by the μ estimator 26), which will be discussed later, in the previous arithmetic processing cycle as the values of the input parameters of the function func_fx_i (κi, βi, Fz_i, μ) and func_fy_i (κi, βi, Fz_i, μ), respectively.

Then, the wheel frictional force estimator 24$b$ sets the value of the function func_fx_i determined by the computation of expression 1-8a as the driving/braking force estimated value Fsubx_i_estm, which is the estimated value of the component in the x-axis direction of the estimated value of the wheel two-dimensional road surface reaction force on the wheel coordinate system ↑Fsub_i.

The wheel frictional force estimator 24$b$ also sets the value of the function func_fy_i determined by the computation of expression 1-9a as the lateral force estimated value Fsuby_i_estm, which is the estimated value of the component in the y-axis direction of the estimated value of the wheel two-dimensional road surface reaction force on the wheel coordinate system ↑Fsub_i.

In this case, the value of the coefficient Cslp_i(κi) required to compute the right side of expression 1-8a is determined from the wheel slip rate estimated value κi_estm according to a map indicating the relationship illustrated in FIG. 6($a$). The value of the coefficient Catty_i(βi) required to compute the right side of expression 1-8a is determined from the wheel side slip angle estimated value βi_estm according to a map indicating the relationship illustrated in FIG. 6($b$). The value of Cbeta_i(βi) required to compute the right side of expression 1-9a is determined from the wheel side slip rate estimated value βi_estm according to a map indicating the relationship illustrated in FIG. 7($a$). The value of Cattx_i(κi) required to compute the right side of expression 1-9a is determined from the wheel slip rate estimated value κi_estm according to a map indicating the relationship illustrated in FIG. 7($b$).

Thus, the driving/braking force estimated value Fsubx_i_estm and the lateral force estimated value Fsuby_i_estm as the estimated values of the road surface reaction force (frictional force) dependant upon the road surface frictional coefficient μ out of the road surface reaction force acting on each wheel 2-$i$ are calculated by using a latest value of the road surface frictional coefficient estimated value μ_estm (the previous value μ_estm_p) and the friction characteristic model.

Supplementally, in the present embodiment, the function func_fx_i has been set such that the driving/braking force Fsubx_i of each wheel 2-$i$ is proportional to the road surface frictional coefficient μ. Alternatively, however, the function func_fx_i may be set according to, for example, expression 1-8b given below.

$$\text{func\_fx\_i}(\kappa i, \beta i, Fz\_i, \mu) = Cslp2\_i(\mu, \kappa i) * Cattx\_i(\beta i) * Fz\_i \qquad \text{Expression 1-8b}$$

In expression 1-8b, $Cslp2\_i(\mu, \kappa i)$ denotes a coefficient which defines the characteristic of changes in the driving/braking force Fsubx_i caused by changes in the road surface frictional coefficient μ and the wheel slip rate κ1, and which is obtained by further generalizing $\mu*Cslp\_i(\kappa i)$ in expression 1-8a described above.

Figure 8:
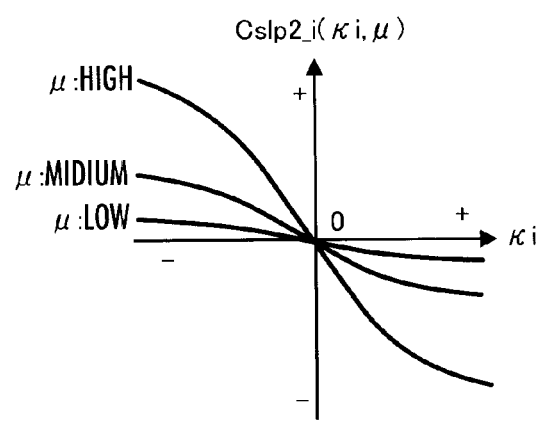
FIG. 8 is a graph for explaining the processing in another mode by the wheel slip rate estimator illustrated in FIG. 5.

In this case, the relationship between the coefficient $Cslp2\_i(\mu, \kappa i)$ and the road surface frictional coefficient μ and the wheel slip rate κi is set as indicated by the graph of FIG. 8 by, for example, a map. The relationship is set such that the coefficient $Cslp2\_i(\mu, \kappa i)$ becomes a monotonically decreasing function relative to the wheel slip rate Ki and the absolute value thereof becomes a monotonically increasing function relative to the road surface frictional coefficient μ.

FIG. 8 representatively provides a graph of $Cslp2\_i(\mu, \kappa i)$ corresponding to the values of three different road surface frictional coefficients μ.

Further, according to the relationship illustrated in FIG. 8, the coefficient $Cslp2\_i(\mu, \kappa i)$ has a saturation characteristic relative to the wheel slip rate κi. This means that the magnitude of the rate of changes (the value obtained by partially differentiating $Cslp\_i(\mu, \kappa i)$ by κi) in the coefficient $Cslp\_i(\mu, \kappa i)$ in response to an increase in κi decreases as the absolute value of κi increases.

In the case where the function func_fx_i is set as described above, a non-linear relationship can be set between the driving/braking force Fsubx_i of each wheel 2-*i* and the road surface frictional coefficient μ.

For the function func_fy_i related to the lateral force Fsuby_i of each wheel 2-*i*, a coefficient $Cbeta2\_i(\mu, \beta i)$ that defines the characteristic of changes in the lateral force Fsuby_i caused by changes in the road surface frictional coefficient μ and the wheel side slip angle βi may be used in place of $\mu*Cbeta\_i(\beta i)$ in expression 1-9a, as with the case of the function func_fx_i related to the driving force Fsubx_i.

The function func_fy_i related to the lateral force Fsuby_i of each wheel 2-*i* may be configured to take the driving/braking force Fsubx_i as an input parameter in place of the wheel slip rate κi. In this case, as the value of Fsubx_i, the driving/braking force estimated value Fsubx_i_estm determined as described above using the function func_fx_i of the aforesaid expression 1-8a or 1-8b may be used.

Alternatively, for example, the driving/braking force detected value Fsubx_i_sens determined as follows may be used as the value of Fsubx_i. More specifically, in the aforesaid S100, the driving/braking force detected value Fsubx_i_sens is determined according to expression 1-8c given below on the basis of the wheel torque detected value Tq_i_sens and the wheel speed detected value Vw_i_sens of each wheel 2-*i* generated by the amount-to-be-observed detector 22.

$$Fsubx\_i\_sens = Tq\_i\_sens/Rw\_i - Vwdot\_i\_sens * Iw\_i/Rw\_i^2 \qquad \text{Expression 1-8c}$$

Vwdot_i_sens of the right side of expression 1-8c denotes the temporal change rate (a differential value) of the wheel speed detected value Vw_i_sens. Predetermined values that have been set in advance are used as the values of the effective wheel radius Rw_i and the wheel inertial moment Iw_i in expression 1-8c.

The second term of the right side of expression 1-8c may be replaced by a term $\omega wdot\_i\_sens*Iw\_i/Rw\_i$ using ωwdot_i_sens, which is a differential value of the wheel rotational angular velocity detected value ωw_i_sens indicated by an output value of the wheel rotational angular velocity sensor 8-*i*.

Referring back to FIG. 4, subsequently in S112, the resultant force calculator 24c calculates the total road surface reaction force resultant translational force vector estimated value ↑Fg_total_estm and the total road surface reaction force resultant yaw moment estimated value Mgz_total_estm.

In this case, the resultant force calculator 24c calculates the total road surface reaction force resultant translational force vector estimated value ↑Fg_total_estm and the total road surface reaction force resultant yaw moment estimated value Mgz_total_estm on the basis of the ground contact load estimated value Fz_i_estm of each wheel 2-*i* calculated in S102, the driving/braking force estimated value Fsubx_i_estm and the lateral force estimated value Fsuby_i_estm of each wheel 2-*i* calculated in S110, and the front wheel steering angle detected value δf_sens (=δ1_sens=δ2_sens) of the detected values of the amounts to be observed that have been obtained in S100.

To be more specific, the resultant force calculator 24c first coordinate-converts the estimated value of the two-dimensional road surface reaction force vector on the wheel coordinate system ↑Fsub_i_estm (=(Fsubx_i_estm, Fsuby_i_estm)$^T$) onto the wheel coordinate system for each wheel 2-*i* according to expression 1-10 given below to calculate the two-dimensional road surface reaction force vector estimated value ↑Fi_estm=(Fx_i_estm, Fy_i_estm)$^T$.

$$\uparrow Fi\_estm = Rot(\delta i\_sens) = \uparrow Fsub\_i\_estm \qquad \text{Expression 1-10}$$

In this case, regarding the front wheels 2-1 and 2-2 in expression 1-10, the front wheel steering angle detected value δf_sens is used as the values for δ1_sens and δ2_sens. Further, in the present embodiment, since the rear wheels 2-3 and 2-4 are non-steering wheels, the values of δ3_sens and δ4_sens in expression 1-10 are zero. Hence, the arithmetic processing of expression 1-10 may be omitted for the rear wheels 2-3 and 2-4, because ↑F3_estm=↑Fsub_3_estm and ↑F4_estm=↑Fsub_4_estm hold.

Subsequently, the resultant force calculator 24c calculates the total road surface reaction force resultant translational force vector estimated value ↑Fg_total_estm (=(Fgx_total_estm, Fgy_total_estm, Fgz_total_estm)$^T$) according to expression 1-11 given below, and also calculates the total road surface reaction force resultant yaw moment estimated value Mgz_total_estm according to expression 1-12 given below.

$$\uparrow Fg\_total\_estm = (\Sigma Fx\_i\_estm, \Sigma Fy\_i\_estm, \Sigma Fz\_i\_estm)^T \qquad \text{Expression 1-11}$$

$$Mgz\_total\_estm = \Sigma(\uparrow Pi \times \uparrow Fi\_estm) \qquad \text{Expression 1-12}$$

The symbol Σ in expressions 1-11 and 1-12 means the total sum on all wheels 2-*i* (i=1, 2, 3, 4). "↑Pi×↑Fi_estm" in the right side of expression 1-12 denotes the exterior product of the wheel position vector ↑Pi of the i-th wheel 2-*i* and the two-dimensional road surface reaction force vector estimated value ↑Fi_estm, meaning the moment about the yaw axis generated at the center-of-gravity point of the vehicle 1 by the two-dimensional road surface reaction force vector estimated value ↑Fi_estm of the i-th wheel 2-*i*.

Supplementally, the calculation of the component in the yaw axis Fgz_total_estm of ↑Fg_total_estm may be omitted.

Subsequently, in S114, the vehicle motion estimator 24e calculates primarily the vehicle center of gravity longitudinal velocity estimated value Vgx_estm as the vehicle motional state amount estimated value, the vehicle center of gravity side slip velocity estimated value Vgy_estm, the yaw rate estimated value γ_estm, the vehicle center of gravity longitudinal acceleration estimated value Accx_estm, and the vehicle center of gravity lateral acceleration estimated value Accy_estm.

Here, the vehicle motion estimator 24e has a vehicle motion model displaying the relationship between the resultant force of road surface reaction forces as an external force acting on the vehicle 1 and motions of the vehicle 1. The vehicle motion model in the present embodiment is represented by expressions 1-13 to 1-15 given below.

$$Fgx\_total = m*(Vgdot\_x - Vgy*\gamma) \qquad \text{Expression 1-13}$$

$$Fgy\_total = m*(Vgdot\_y - Vgx*\gamma) \qquad \text{Expression 1-14}$$

$$Mgz\_total = Iz*\gamma dot \qquad \text{Expression 1-15}$$

Expressions 1-13 and 1-14 respectively denote the equations of the dynamics related to the translational motion of the center-of-gravity point of the vehicle 1 in the X-axis direction and the Y-axis direction of the vehicle body coordinate system. Similarly, expression 1-15 denotes the equation of the dynamics related to the rotational motion about the yaw axis of the vehicle 1.

The vehicle motion model in the present embodiment is based on the assumption that the road surface on which the vehicle 1 is traveling is a horizontal surface (both the road surface bank angle θbank and the road surface slope angle θslope are both zero).

In S114, the vehicle motion estimator 24d calculates the vehicle motional state amount estimated value by using the vehicle motion models represented by the above expressions 1-13 to 1-15 and the total road surface reaction force resultant translational force vector estimated value ↑Fg_total_estm and the total road surface reaction force resultant yaw moment estimated value Mgz_total_estm calculated in S112.

In this case, the previous values of some vehicle motional state amount estimated values will be also used for the calculation thereof. Further, some vehicle motional state amount estimated values will be calculated such that they will approach the detected values obtained in S100 (such that they will not deviate from the detected values).

To be more specific, the vehicle motion estimator 24d calculates the vehicle center of gravity longitudinal velocity change rate estimated value Vgdot_x_estm, the vehicle center of gravity side slip velocity change rate estimated value Vgdot_y_estm, and the yaw angular acceleration estimated value γdot_estm, respectively, according to the following expressions 1-13a to 1-15a derived from the aforesaid expressions 1-13 to 1-15.

The vehicle motion estimator 24d further calculates the vehicle center of gravity longitudinal acceleration estimated value Accx_estm and the vehicle center of gravity lateral acceleration estimated value Accy_estm by the following expressions 1-16a and 1-17a according to the definitions of the vehicle center of gravity longitudinal acceleration Accx and the vehicle center of gravity lateral acceleration Accy.

$$Vgdot\_x\_estm = Fgx\_total\_est/m + Vgy\_estm\_p*\gamma\_estm\_p \qquad \text{Expression 1-13a}$$

$$Vgdot\_y\_estm = Fgy\_total\_estm/m - Vgx\_estm\_p*\gamma\_estm\_p \qquad \text{Expression 1-14a}$$

$$\gamma dot\_estm = Mgz\_total\_estm/Iz \qquad \text{Expression 1-15a}$$

$$Accx\_estm = Vgdot\_x\_estm - Vgy\_estm\_p*\gamma\_estm\_p \qquad \text{Expression 1-16a}$$

$$Accy\_estm = Vgdot\_y\_estm + Vgx\_estm\_p*\gamma\_estm\_p \qquad \text{Expression 1-17a}$$

In this case, Fx_total_estm, Fy_total_estm, and Mgz_total_estm in expressions 1-13a to 1-15a respectively denote the values calculated in S112 (current values), and Vgy_estm_p, Vgx_estm_p, and γ_estm_p respectively denote the values determined in S114 (previous values) in a previous arithmetic processing cycle. Further, Vgdot_x_estm in expression 1-16a and Vgdot_y_estm are the values (current values) calculated by expressions 1-13a and 1-14a, respectively. Further, the value of the vehicle mass m in expressions 1-13a and 1-14a and the value of the vehicle yaw inertial moment Iz in expression 1-15a use predetermined values that have been set beforehand.

Supplementally, the yaw rate detected value γ_sens (a previous value or a current value) may be used in place of the yaw rate estimated value (a previous value) γ_estm_p of expression 1-13a and expression 1-14a. The vehicle center of gravity longitudinal acceleration estimated value Accx_estm and the vehicle center of gravity lateral acceleration estimated value Accy_estm may be determined by computing the first term of the right side of expression 1-13a and the first term of the right side of expression 1-14a, respectively. In other words, Accx_estm and Accy_estm may be calculated by expressions 1-16b and 1-17b given below.

$$Accx\_estm = Fgx\_total\_estm/m \qquad \text{Expression 1-16b}$$

$$Accy\_estm = Fgy\_total\_estm/m \qquad \text{Expression 1-17b}$$

Subsequently, the vehicle motion estimator 24d calculates the vehicle center of gravity longitudinal velocity provisional estimated value Vgx_predict as the preliminary value of the vehicle center of gravity longitudinal velocity estimated value, the vehicle center of gravity side slip velocity provisional estimated value Vgy_predict as the preliminary value of the vehicle center of gravity side slip velocity estimated value, and the yaw rate provisional estimated value γ_predict as the preliminary value of the yaw rate estimated value, respectively, according to expressions 1-18, 1-19, and 1-20 given below on the basis of the vehicle center of gravity longitudinal velocity change rate estimated value Vgdot_x_estm, the vehicle center of gravity side slip velocity change rate estimated value Vgdot_y_estm, the yaw angular acceleration estimated value γdot_estm, the previous value of the vehicle center of gravity longitudinal velocity estimated value Vgx_estm_p, the previous value of the vehicle center of gravity side slip velocity estimated value Vgy_estm_p, and the previous value of the yaw rate estimated value γ_estm_p, which have been determined as described above.

$$Vgx\_predict = Vgx\_estm\_p + Vgdot\_x\_estm*\Delta T \qquad \text{Expression 1-18}$$

$$Vgy\_predict = Vgy\_estm\_p + Vgdot\_y\_estm*\Delta T \qquad \text{Expression 1-19}$$

$$\gamma\_predict = \gamma\_estm\_p + \gamma dot\_estm*\Delta T \qquad \text{Expression 1-20}$$

The symbol $\Delta T$ in expressions 1-18 to 1-20 denotes the arithmetic processing cycle of the controller 20. The right sides of these expressions 1-18 to 1-20 correspond to the integral calculation of Vgdot_x_estm, the integral calculation of Vgdot_y_estm, and the integral calculation of γdot_estm.

Here, in the present embodiment, regarding the yaw rate γ of the motional state amount to be estimated, the vehicle motion estimator 24d determines the yaw rate estimated value γ_estm such that the yaw rate estimated value γ_estm is brought close to the yaw rate detected value γ_sens (such that the yaw rate estimated value γ does not deviate from γ_sens). Further, regarding the vehicle center of gravity longitudinal velocity Vgx, which means the vehicle speed of the vehicle 1, the vehicle motion estimator 24d determines the vehicle center of gravity longitudinal velocity estimated value Vgx_estm such that the vehicle center of gravity longitudinal velocity estimated value Vgx_estm is brought close to the vehicle center of gravity longitudinal velocity recognized from the wheel speed detected value Vw_i_sens (i=1, 2, 3, 4), that is, so as not to cause the vehicle center of gravity longitudinal velocity estimated value Vgx_estm to deviate from the recognized vehicle center of gravity longitudinal velocity.

Then, regarding the yaw rate γ, the vehicle motion estimator 24d calculates the yaw rate error γestm_err, which is the difference between the yaw rate detected value γ_sens obtained in S100 and the provisional yaw rate estimated value γ_predict calculated by expression 1-20 as described above, according to expression 1-21 given below.

Further, regarding the vehicle center of gravity longitudinal velocity Vgx, the vehicle motion estimator 24d calculates the vehicle speed error Vgx_estm_err, which is the difference between a selected wheel speed detected value Vw_i_sens_select, which is any one of the wheel speed detected values Vw_i_sens (i=1, 2, 3, 4) obtained in S100, and a vehicle longitudinal speed provisional estimated value Vgx_predict calculated by expression 1-18 as described above, according to expression 1-22 given below.

The aforesaid selected wheel speed detected value Vw_i_sens_select is a value selected from the wheel speed detected value Vw_i_sens (i=1, 2, 3, 4) as the one corresponding to an actual vehicle speed detected value (the detected value of the actual vehicle center of gravity longitudinal velocity Vgx_act) based on the wheel speed detected value Vw_i_sens (i=1, 2, 3, 4).

In this case, when the vehicle 1 is accelerated, a slowest wheel speed detected value among the wheel speed detected values Vw_i_sens (i=1, 2, 3, 4) is selected as the selected wheel speed detected value Vw_i_sens_select. When the vehicle 1 is decelerated, a fastest wheel speed detected value among the wheel speed detected values Vw_i_sens (i=1, 2, 3, 4) is selected as the selected wheel speed detected value Vw_i_sens_select.

$$\gamma estm\_err = \gamma\_sens - \gamma\_predict \quad \text{Expression 1-21}$$

$$Vgx\_estm\_err = Vw\_i\_sens\_select - Vgx\_predict \quad \text{Expression 1-22}$$

Subsequently, the vehicle motion estimator 24d determines the final values of the vehicle center of gravity longitudinal velocity estimated value Vgx_estm, the vehicle center of gravity side slip velocity estimated value Vgy_estm, and the yaw rate estimated value γ_estm, respectively, in the current arithmetic processing cycle according to expressions 1-23 to 1-25 given below.

$$Vgx\_estm = Vgx\_predict + Kvx * Vgx\_estm\_err \quad \text{Expression 1-23}$$

$$Vgy\_estm = Vgy\_predict \quad \text{Expression 1-24}$$

$$\gamma\_estm = \gamma\_predict + K\gamma * \gamma estm\_err \quad \text{Expression 1-25}$$

Kvx in expression 1-23 and Kγ in expression 1-25 respectively denote gain coefficients having predetermined values (<1) that are set beforehand.

In the present embodiment, as indicated by these expressions 1-23 to 1-25, the vehicle center of gravity longitudinal velocity estimated value Vgx_estm is determined by correcting the vehicle center of gravity longitudinal velocity provisional estimated value Vgx_predict, which has been calculated by the aforesaid expression 1-18 (an estimated value on a vehicle motion model), according to a feedback control law (the proportional law in this case) on the basis of the vehicle speed error Vgx_estm_err calculated by the aforesaid expression 1-22 so as to bring the vehicle speed error Vgx_estm_err close to zero.

Further, the vehicle center of gravity side slip velocity provisional estimated value Vgy_predict calculated by the aforesaid expression 1-19 (an estimated value on a vehicle motion model) is directly used as the vehicle center of gravity side slip velocity estimated value Vgy_estm.

The yaw rate provisional estimated value γ_predict calculated by the aforesaid expression 1-20 (an estimated value on a vehicle motion model) is corrected according to the feedback control law (the proportional law in this case) on the basis of the yaw rate error γ_estm_err, which has been calculated by the aforesaid expression 1-21, so as to bring the yaw rate error γ_estm_err close to zero.

Thus, according to the present embodiment, the vehicle center of gravity longitudinal velocity estimated value Vgx_estm as the vehicle speed of the vehicle 1 on the vehicle motion model is determined such that the estimated value Vgx_estm does not deviate from the selected wheel speed detected value Vw_i_sens_select as the detected value of the actual vehicle speed, i.e., such that Vgx_estm agrees or substantially agrees with Vw_i_sens_select. Similarly, the yaw rate estimated value γ_estm as the yaw rate of the vehicle 1 on the vehicle motion model is determined such that the estimated value γ_estm does not deviate from the yaw rate detected value γ_sens as the detected value of the actual yaw rate γ_act, i.e., such that γ_estm agrees or substantially agrees with γ_sens.

The above has explained the processing in S114 (the processing by the vehicle motion estimator 24d) in detail.

The vehicle motion estimator 24d in the present embodiment has determined the vehicle center of gravity longitudinal velocity estimated value Vgx_estm and the yaw rate estimated value γ_estm such that these values do not deviate from the selected wheel speed detected value Vw_i_sens_select (the detected value of the actual vehicle speed) and the yaw rate detected value γ_sens, respectively. Alternatively, however, either one or both of Vgx_estm and γ_estm may be arranged to always agree with one or both Vw_i_sens_select and γ_sens. In this case, the processing for calculating Vgx_estm or γ_estm is unnecessary.

The vehicle motion estimator 24d has determined Vgdot_x_estm, Vgx_estm, Vgdot_y_estm, Vgy_estm, γ_estm, Accx_estm, and Accy_estm as the estimated values of the vehicle motional state amounts. Alternatively, however, more estimated values of the vehicle motional state amounts may be determined in addition thereto, as necessary.

For example, in the case where the estimated values of the vehicle motional state amounts are used to control the vehicle center of gravity side slip angle βg, the vehicle center of gravity side slip angle estimated value βg_estm may be calculated. In this case, the vehicle center of gravity side slip angle estimated value βg_estm can be calculated according to expression given below 1-26 from the vehicle center of gravity longitudinal velocity estimated value Vgx_estm and the vehicle center of gravity side slip velocity estimated value Vgy_estm determined as described above.

$$\beta g\_estm = \tan^{-1}(Vgy\_estm/Vgx\_estm) \quad \text{Expression 1-26}$$

Further, in the present embodiment, Accx_estm and Accy_estm among the estimated values of the vehicle motional state amounts determined by the vehicle motion estimator 24d are used by the slope angle estimator 30 and the bank angle estimator 28, which will be respectively described in detail hereinafter, and are not used in the processing by the vehicle model calculator 24. Hence, Accx_estm and Accy_estm may be calculated by the slope angle estimator 30 and the bank angle estimator 28, respectively.

Subsequently, in S116 of FIG. 4, the wheel motion estimator 24f calculates the wheel speed estimated value Vw_i_estm of each wheel 2-i.

Here, the wheel motion estimator 24f has a wheel motion model which indicates the relationship between the forces acting on each wheel 2-i (the wheel torque Tq_i and the driving/braking force) and the rotational motion of each wheel 2-i. The wheel motion model is represented by the following expression 1-27 in the present embodiment.

$$Tq\_i = Fsubx\_i * Rw\_i = Iw\_i * (Vwdot\_i/Rw\_i) \quad \text{Expression 1-27}$$

"Vwdot_i" in expression 1-27 denotes the temporal change rate (a differential value) of the wheel speed Vw_i of an i-th wheel 2-i and will be hereinafter referred to as the wheel speed change rate. The left side of expression 1-27 means a resultant torque of the wheel torque Tq_i imparted to the i-th wheel 2-i from one or both of the driving system and the braking system of the vehicle 1 and the torque imparted to the wheel 2-i by the driving/braking force Fsubx_i of the i-th wheel 2-i.

Then, the wheel motion estimator 24f first calculates the wheel speed change rate estimated value Vwdot_i_estm of each wheel 2-i according to the following expression 1-27a derived from expression 1-27.

$$Vwdot\_i\_estm = Rw\_i * (Tq\_i\_sens - Fsubx\_i\_estm * Rw\_i)/Iw\_i \quad \text{Expression 1-27a}$$

In this case, Tq_i_sens of expression 1-27a denotes the detected value (the current value) obtained in S100 on each wheel 2-i, and Fsubx_i_estm denotes the value (the current value) determined in S110 on each wheel 2-i. Predetermined values set beforehand are used as the values of the effective wheel radius Rw_i and the wheel inertial moment Iw_i of each wheel 2-i.

Subsequently, the wheel motion estimator 24f calculates the wheel speed provisional estimated value Vw_i_predict as the preliminary value of the wheel speed estimated value according to the following expression 1-28 for each wheel 2-i on the basis of the wheel speed change rate estimated value Vwdot_i_estm determined as described above and the previous value of the wheel speed estimated value Vw_i_estm_p.

$$Vw\_i\_predict = Vw\_i\_estm\_p + Vwdot\_i\_estm * \Delta T \quad \text{Expression 1-28}$$

Expression 1-28 corresponds to the integral calculation of Vwdot_i_estm.

Here, in the present embodiment, the wheel motion estimator 24f determines the wheel speed estimated value Vw_i_estm such that the estimated value Vw_i_estm approaches the wheel speed detected value Vw_i_sens (such that the estimated value Vw_i_estm does not deviate from Vw_i_sens), as with the calculation of the yaw rate estimated value γ_estm by the wheel motion estimator 24d.

Then, according to the following expression 1-29, the wheel motion estimator 24f calculates, on each wheel 2-i, the wheel speed error Vw_i_estm_err indicating the difference between the wheel speed estimated value Vw_i_sens, which has been obtained in S110, and the wheel speed provisional estimated value Vw_i_predict, which has been calculated by expression 1-28 as described above.

$$Vw\_i\_estm\_err = Vw\_i\_sens - Vw\_i\_predict \quad \text{Expression 1-29}$$

Subsequently, the wheel motion estimator 24f determines, on each wheel 2-i, a final wheel speed estimated value Vw_i_estm in the current arithmetic processing cycle according to the following expression 1-30.

$$Vw\_i\_estm = Vw\_i\_predict + Kvw * Vw\_i\_estm\_err \quad \text{Expression 1-30}$$

"Kvw" in expression 1-30 denotes a gain coefficient of a predetermined value (<1), which has been set beforehand.

Thus, in the present embodiment, each wheel speed estimated value Vw_i_estm is determined by correcting each wheel speed provisional estimated value Vw_i_predict (an estimated value on a vehicle motion model), which has been calculated by the aforesaid expression 1-28, according to a feedback control law (the proportional law in this case) on the basis of the wheel speed error Vw_i_estm_err calculated by the aforesaid expression 1-29 such that Vw_i_estm_err approaches zero.

The description of the processing in S102 to S116 given above is the details of the processing carried out by the vehicle model calculator 24.

The controller 20 then carries out the processing by the bank angle estimator 28 in S118.

Here, the vehicle motion estimator 24d calculates the vehicle motional state amount estimated value by using the vehicle motion model constructed on the assumption that the road surface on which the vehicle 1 is traveling is a horizontal surface. Therefore, the vehicle center of gravity lateral acceleration estimated value Accy_estm means the value of the acceleration of a motion in the lateral direction (the Y-axis direction of the vehicle body coordinate system) of the center-of-gravity point of the vehicle 1 that has been estimated using the vehicle motion model on the assumption that the road surface bank angle θbank is zero.

Meanwhile, as described above, if the actual bank angle θbank_act of the road surface on which the vehicle 1 is actually traveling is not zero, then the actual acceleration sensed by the lateral acceleration sensor 15, i.e., an actual sensed-by-sensor lateral acceleration Accy_sensor_act, is obtained by superimposing an acceleration component in a direction parallel to the lateral direction of the vehicle 1 of the gravitational acceleration (=g*sin((θbank_act)) onto the actual vehicle center of gravity lateral acceleration Accy_act (=Vgdot_y_act+Vgx_act*γ). Hence, provided that there is no error of the vehicle center of gravity lateral acceleration detected value Accy_sens, the following expression 2-1 holds.

$$\text{Accy\_sens} = \text{Accy\_sensor\_act} \quad \text{Expression 2-1}$$
$$= \text{Accy\_act} + g * \sin(\theta\text{bank\_act})$$

It is considered, therefore, that the difference between the vehicle center of gravity lateral acceleration detected value Accy_sens based on an output of the lateral acceleration sensor 15 (=the detected value of the sensed-by-sensor lateral acceleration Accy_sensor) and the vehicle center of gravity lateral acceleration estimated value Accy_estm based on the vehicle motion model (=Accy_sens−Accy_estm; hereinafter referred to as the vehicle center of gravity lateral acceleration error Accy_estm_err) depends on the actual bank angle θbank_act and agrees with the acceleration component in a direction parallel to the lateral direction of the vehicle body 1B of the gravitational acceleration (=g*sin(θbank_act)) in a steady state.

Accordingly, in the present embodiment, the bank angle estimator 28 carries out the processing illustrated by the flowchart of FIG. 9 to determine the road surface bank angle estimated value θbank_estm.

The bank angle estimator 28 calculates in S118-1 the vehicle center of gravity lateral acceleration error Accy_estm_err according to the following expression 2-2. More specifically, the vehicle center of gravity lateral acceleration estimated value Accy_estm calculated by the vehicle motion estimator 24e in S114 is subtracted from the vehicle center of gravity lateral acceleration detected value Accy_sens generated by the lateral acceleration detector 22f in S100 of FIG. 4 to calculate Accy_estm_err.

$$Accy\_estm\_err = Accy\_sens - Accy\_estm \quad \text{Expression 2-2}$$

Subsequently, the bank angle estimator 28 calculates in S118-2 the road surface bank angle provisional estimated value θbank_pre as the preliminary value of the road surface bank angle estimated value. In this case, the bank angle estimator 28 calculates θbank_pre according to the following expression 2-3 from the vehicle center of gravity lateral acceleration error Accy_estm_err determined in S118-1.

$$\theta bank\_pre = \sin^{-1}(Accy\_estm\_err/g) \quad \text{Expression 2-3}$$

Subsequently, the bank angle estimator 28 determines in S118-3 the road surface bank angle estimated value θbank_estm by passing the road surface bank angle provisional estimated value θbank_pre, which has been calculated as described above, through a filter having a low-pass characteristic (high-cut characteristic).

The above has described the processing in S118 (the processing by the bank angle estimator 28) in detail.

Then, the controller 20 carries out the processing by the slope angle estimator 30 in S120.

Here, as with Accy_estm, the vehicle center of gravity longitudinal acceleration estimated value Accx_estm means the value of the acceleration of a motion in the longitudinal direction (in the X-axis direction of the vehicle body coordinate system) of the center-of-gravity point of the vehicle 1, which has been estimated by using the vehicle motion model on the assumption that the road surface slope angle θslope is zero.

Meanwhile, as with the case of the road surface bank angle θbank, if the actual slope angle θslope_act of the road surface on which the vehicle 1 is actually traveling is not zero, then the actual acceleration sensed by the longitudinal acceleration sensor 14, i.e., an actual sensed-by-sensor longitudinal acceleration Accx_sensor_act, is obtained by superimposing an acceleration component in a direction parallel to the longitudinal direction of the vehicle body 1B of the gravitational acceleration (=−g*sin((θslope_act)) onto the actual vehicle center of gravity longitudinal acceleration Accx_act (=Vgdot_x_act+Vgy_act*γ). Hence, provided that there is no error of the vehicle center of gravity longitudinal acceleration detected value Accx_sens, the following expression 3-1 holds.

$$Accx\_sens = Accx\_sensor\_act \quad \text{Expression 3-1}$$
$$= Accx\_act - g * \sin(\theta slope\_act)$$

It is considered, therefore, that the difference between the vehicle center of gravity longitudinal acceleration detected value Accx_sens based on an output of the longitudinal acceleration sensor 14 (=the detected value of the sensed-by-sensor longitudinal acceleration Accx_sensor) and the vehicle center of gravity longitudinal acceleration estimated value Accx_estm based on the vehicle motion model (=Accx_sens−Accx_estm; hereinafter referred to as the vehicle center of gravity longitudinal acceleration error Accx_estm_err) depends on the actual slope angle θslope_act and agrees with the acceleration component in a direction parallel to the longitudinal direction of the vehicle body 1B of the gravitational acceleration (=−g*sin(θslope_act)) in a steady state.

Accordingly, the slope angle estimator 30 carries out the processing similar to that carried out by the bank angle estimator 28 to calculate the road surface slope angle estimated value θslope_estm.

To be more specific, the slope angle estimator 30 carries out the processing illustrated by the flowchart of FIG. 10 so as to determine the road surface slope angle estimated value θslope_estm.

The slope angle estimator 30 calculates in S120-1 the vehicle center of gravity longitudinal acceleration error Accx_estm_err according to the following expression 3-2. More specifically, the vehicle center of gravity longitudinal acceleration estimated value Accx_estm calculated by the vehicle motion estimator 24e in S114 is subtracted from the vehicle center of gravity longitudinal acceleration detected value Accx_sens generated by the longitudinal acceleration detector 22e in S100 of FIG. 4 to calculate Accx_estm_err.

$$Accx\_estm\_err = Accx\_sens - Accx\_estm \quad \text{Expression 3-2}$$

Subsequently, the slope angle estimator 30 calculates in S120-2 the road surface slope angle provisional estimated value θslope_pre as the preliminary value of the road surface slope angle estimated value. In this case, the slope angle estimator 30 calculates θslope_pre according to the following expression 3-3 from the vehicle center of gravity longitudinal acceleration error Accx_estm_err determined in S120-1.

$$\theta slope\_pre = -\sin^{-1}(Accx\_estm\_err/g) \quad \text{Expression 3-3}$$

Subsequently, the slope angle estimator 30 determines in S120-3 the road surface slope angle estimated value θslope_estm by passing the road surface slope angle provisional estimated value θslope_pre, which has been calculated as described above, through a filter having a low-pass characteristic (high-cut characteristic).

The above has described the processing in S120 (the processing by the slope angle estimator 30) in detail.

Subsequently, the controller 20 carries out the processing by the μ estimator 26 in S122.

Before describing the processing in detail, the principle for estimating the road surface frictional coefficient μ in the present embodiment will be first described.

In this case, for the convenience of explanation, it is assumed that the dynamics of the actual vehicle 1 is approximately represented by the following expression 4-1.

$$\frac{d}{dt}\begin{bmatrix} Vgy\_act \\ \gamma\_act \end{bmatrix} = \quad \text{Expression 4-1}$$

$$\frac{1}{Vgx\_act} * \begin{bmatrix} A11 & -Vgx\_act^2 + \\ & A12s \\ A21 & A22 \end{bmatrix} * \begin{bmatrix} Vgy\_act \\ \gamma\_act \end{bmatrix} +$$

$$\begin{bmatrix} B1 \\ B2 \end{bmatrix} * \delta f\_act - \begin{bmatrix} g \\ 0 \end{bmatrix} * \sin(\theta bank\_act)$$

where
A11=−2*(CPf+CPr)/m
A12s=−2*(Lf*CPf−Lr*CPr)/m
A21=−2*(Lf*CPf−Lr*CPr)/Iz
A22=−2*(Lf$^2$*CPf+Lr$^2$*CPr)/Iz
B1=2*CPf/m
B2=2*Lf*CPf/Iz
CPf: Cornering power of the front wheel of the 2-wheel model CPr: Cornering power of the rear wheel of the 2-wheel model More detailedly, this expression 4-1 denotes a dynamic model which is a so-called two-wheeled model (a linear two-wheeled model) which approximately represents a side slip motion of the actual vehicle 1 and a rotational motion about the yaw axis as dynamic behaviors of a model vehicle having one front wheel serving as a steering control wheel and one rear wheel serving as a non-steering control wheel.

The cornering power CPf of the front wheel in this two-wheeled model corresponds to the cornering power per wheel of the front wheels 2-1 and 2-2 of the actual vehicle 1 (a 4-wheel vehicle). The cornering power CPr of the rear wheel in the two-wheeled model corresponds to the cornering power per wheel of the rear wheels 2-3 and 2-4 of the actual vehicle 1 (the 4-wheel vehicle).

Here, the cornering power CPf per wheel of the front wheels 2-1 and 2-2 on a reference road surface on which the value of the actual road surface frictional coefficient μ_act is 1 is denoted by CPf0, and the cornering power CPr per wheel of the rear wheels 2-3 and 2-4 on the reference road surface is denoted by CPr0. At this time, a proportional relationship approximately holds between each of the cornering powers CPf and CPr on a road surface having the actual road surface frictional coefficient μ_act of an arbitrary value and the actual road surface frictional coefficient μ_act, as indicated by expressions 4-2a and 4-2b given below.

$$Cpf = CPf0 * \mu\_act \quad \text{Expression 4-2a}$$

$$CPr = Cpr0 * \mu\_act \quad \text{Expression 4-2b}$$

Applying the expressions 4-2a and 4-2b to expression 4-1 given above rewrites expression 4-1 to expression 4-3 given below.

$$\frac{d}{dt}\begin{bmatrix} Vgy\_act \\ \gamma\_act \end{bmatrix} = \quad \text{Expression 4-3}$$

$$\frac{1}{Vgx\_act} * \begin{bmatrix} \mu\_act*a11 & -Vgx\_act^2 + \\ & \mu\_act*a12s \\ \mu\_act*a21 & \mu\_act*a22 \end{bmatrix} * \begin{bmatrix} Vgy\_act \\ \gamma\_act \end{bmatrix} +$$

$$\begin{bmatrix} \mu\_act*b1 \\ \mu\_act*b2 \end{bmatrix} * \delta f\_act - \begin{bmatrix} g \\ 0 \end{bmatrix} * (\theta bank\_act)$$

where
a11=−2*(CPf0+CPr0)/m
a12s=−2*(Lf*CPf0−Lr*CPr0)/m
a21=−2*(Lf*CPf0−Lr*CPr0)/Iz
a22=−2*(Lf$^2$*CPf0+Lr$^2$*CPr0)/Iz
b1=2*CPf0/m
b2=2*Lf*CPf0/Iz Based on this expression 4-3, which represents the linear two-wheeled model, the following will explain a method for estimating the road surface frictional coefficient μ by using a moment about the yaw axis, i.e., the aforesaid NSP yaw moment Mnsp generated at the neutral steer point (NSP) of the vehicle 1.

First, the technological meaning of the actual NSP yaw moment Mnsp_act related to the estimation of the road surface frictional coefficient μ and a method for identifying or estimating the value of the actual NSP yaw moment Mnsp_act from the observed value of the state amount of a motion of the vehicle 1 associated therewith will be described.

The left side of the first line of expression 4-3 means the differential value of the actual vehicle center of gravity side slip velocity Vgy_act (temporal change rate), i.e., the actual vehicle center of gravity side slip velocity change rate Vgdot_y_act. Therefore, the first line of expression 4-3 can be rewritten to the following expression 4-4.

$$Vgdot\_y\_act + Vgx\_act * \gamma\_act + g * \sin(\theta bank\_act) = \quad \text{Expression 4-4}$$

$$\mu\_act * a11 * Vgy\_act / Vgx\_act +$$

$$\mu\_act * a12s * \gamma\_act / Vgx\_act + \mu\_act * b1 * \delta f\_act$$

Meanwhile, expression 4-5 given below is derived from the definition of the vehicle center of gravity lateral acceleration Accy (Accy=Vgdot_y+Vgx*γ) and the aforesaid expression 2-1 related to the sensed-by-sensor lateral acceleration Accy_sensor.

$$Accy\_sensor\_act = Vgdot\_y\_act + Vgx\_act * \gamma\_act + g * \sin(\theta bank\_act) \quad \text{Expression 4-5}$$

This expression 4-5 indicates that the left side of expression 4-4 agrees with the actual sensed-by-sensor lateral acceleration Accy_sensor_act. Thus, the following expression 4-6 is derived from expressions 4-4 and 4-5.

$$Accy\_sensor\_act = \mu\_act * a11 * Vgy\_act/Vgx\_act + \mu\_act * a12s * \gamma\_act/Vgx\_act + \mu\_act * b1 * \delta f\_act \quad \text{Expression 4-6}$$

The right side of this expression 4-6 corresponds to the value obtained by dividing a component in the lateral direction of the vehicle body 1B in the translational force vector acting on the center-of-gravity point of the vehicle 1 due to the resultant force of the actual road surface reaction forces acting on each wheel 2-i from a road surface (i.e., a component in the X-axis direction Fgy_total_act of the actual total road surface reaction force resultant translational force vector ↑Fg_total_act) by the vehicle mass m. Hence, expression 4-6 represents a relationship in which Accy_sensor_act (=Accy_act+g*sin(θbank_act)) agrees with Fgy_total_act/m.

The left side of the expression of the second line of expression 4-3 means the differential value (the temporal change rate) of the actual yaw rate γ_act, that is, the actual yaw angular acceleration γdot_act, so that the expression of the second line of expression 4-3 can be rewritten to expression 4-7 given below.

$$\gamma\_dot\_act = \mu\_act * a21 * Vgy\_act/Vgx\_act + \mu\_act * a22 * \gamma\_act/Vgx\_act + \mu\_act * b2 * \delta f\_act \quad \text{Expression 4-7}$$

The right side of this expression 4-7 corresponds to the value obtained by dividing a moment about the yaw axis acting on the center-of-gravity point of the vehicle 1 due to the resultant force of the actual road surface reaction forces acting on each wheel 2-i from a road surface (i.e., an actual total road surface reaction force resultant yaw moment Mgz_act) by a vehicle yaw inertial moment Iz. Hence, expression 4-7 represents a relationship in which γdot_act agrees with Mgz_act/Iz.

Taking the above expressions 4-6 and 4-7 as simultaneous equations, eliminating Vy_act results in the following expression 4-8.

$$\gamma dot\_act - (a21/a11) * Accy\_sensor\_act = \mu\_act * \quad \text{Expression 4-8}$$

$$\begin{pmatrix} (a22 - (a21/a11) * a12s) * \\ \gamma\_act/Vgx\_act + (b2 - (a21/a11) * b1) * \delta f\_act \end{pmatrix}$$

Here, as described above, NSP means the load application point (the working point) of the resultant force of the lateral forces Fsuby_i (i=1, 2, 3, 4) acting on all the wheels 2-*i* (i=1, 2, 3, 4) when the vehicle center of gravity side slip angle βg occurs while the vehicle 1 is traveling in the situation wherein δ1=δ2=0 holds. Therefore, in the dynamic model of the vehicle 1 represented by the aforesaid expression 4-3, the relationship indicated by expression 4-9 given below holds between the distance Lnsp between the vehicle center of gravity and NSP, which is the distance between the center-of-gravity point of the vehicle 1 and NSP, and the cornering powers CPf0 and CPr0 of the aforesaid reference road surface.

$$Lnsp=-(Lf*CPf0-Lr*CPr0)/(CPf0+CPr0)$$ Expression 4-9

Further, expression 4-10 given below is derived from the above expression 4-9 and the definitions of a11 and a21 given in the note of the aforesaid expression 4-2.

$$a21/a11=-Lnsp*m/Iz$$ Expression 4-10

Then, applying the derived expression 4-10 to the left side of expression 4-8 given above rewrites expression 4-8 to the following expression 4-11.

$$Iz*\dot{\gamma}\_act + Lnsp*m*Accy\_sensor\_act = \mu\_act*p(\gamma\_act, \delta f\_act, Vgx\_act)$$ Expression 4-11 where $$p(\gamma\_act, \delta f\_act, Vgx\_act) = Iz*\begin{pmatrix}(a22-(a21/a11)*a12s)*\\ \gamma\_act/Vgx\_act+(b2-(a21/a11)*b1)*\delta f\_act\end{pmatrix}$$ Expression 4-12

Both sides of expression 4-11 mean an actual moment about the yaw axis at NSP (an actual NSP yaw moment Mnsp_act). More specifically, the actual NSP yaw moment Mnsp_act agrees with the left side and the right side of expression 4-11, as indicated by expressions 4-13a and 4-13b given below.

$$Mnsp\_act=Iz*\dot{\gamma}\_act+Lnsp*m*Accy\_sensor\_act$$ Expression 4-13a $$Mnsp\_act=\mu\_act*p(\gamma\_act, \delta f\_act, Vgx\_act)$$ Expression 4-13b Expression 4-13a represents the actual NSP yaw moment Mnsp_act as an external force moment (a moment with a sign reversed from the sign of an actual inertial force moment) balancing out the actual inertial force moment about the yaw axis generated at NSP by a motion of the vehicle 1 (a moment component of an actual inertial force).

The first term of the right side of expression 4-13a corresponds to an external force moment (i.e., the actual total road surface reaction force resultant yaw moment Mgz_total_act) balancing out the actual inertial force moment about the yaw axis generated at the center-of-gravity point of the vehicle 1 by a motion of the vehicle 1.

The second term of the right side of expression 4-13b corresponds to a moment (=Lnsp*Fgy_total_act) generated about the yaw axis at NSP by a translational external force (i.e., the component in the Y-axis direction of the vehicle body coordinate system Fgy_total_act of the actual total road surface reaction force resultant translational force vector ↑Fg_total_act) balancing out an actual translational inertial force (a translational force component of an actual inertial force) in the Y-axis direction of the vehicle body coordinate system generated at the center-of-gravity point of the vehicle 1 by a motion of the vehicle 1.

Expression 4-13b represents the actual NSP yaw moment Mnsp_act as the actual moment about the yaw axis acting on NSP due to the resultant force of actual road surface reaction forces acting on each wheel 2-*i* from a road surface, depending on the actual road surface frictional coefficient μ_act.

As is obvious from the aforesaid expression 4-13b, p(γ_act, δf_act, Vgx_act) defined by expression 4-12 denotes the ratio of an incremental amount of Mnsp_act relative to an incremental amount of μ_act (a differential value of Mnsp_act based on μ_act). In other words, p(γ_act, δf_act, Vx_act) means the sensitivity of Mnsp_act to a change in μ_act (hereinafter referred to as the μ sensitivity). Further in other words, p(γ_act, δf_act, Vgx_act) denotes the actual NSP yaw moment Mnsp_act in the case where μ_act=1 holds (in the case where μ_act is 1), that is, the actual road surface frictional coefficient μ_act agrees with the frictional coefficient of the reference road surface.

Here, the right sides of both expressions 4-13a and 4-13b do not include the actual vehicle center of gravity side slip velocity Vgy_act and the actual road surface bank angle θbank_act. It is known therefore that the value of the actual NSP yaw moment Mnsp_act is defined without depending directly on the values of the actual vehicle center of gravity side slip velocity Vgy_act and the actual road surface bank angle θbank_act.

More specifically, when the actual vehicle center of gravity side slip velocity Vgy_act changes or the actual road surface bank angle θbank_act changes, the moment component of the first term and the moment component of the second term of the right side of the aforesaid expression 4-13a change; however, the moment components basically change in opposite directions from each other.

Thus, the changes in the moment components of the first term and the second term, respectively, of expression 4-13a caused by a change in Vgy_act or a change in θbank_act take place such that the changes cancel each other. As a result, the actual NSP yaw moment Mnsp_act is hardly influenced by a change in Vgy_act or a change in θbank_act.

Further, as is obvious from expression 4-13b, the actual NSP yaw moment Mnsp_act changes depending on the actual road surface frictional coefficient μ_act and the μ sensitivity p without depending directly on the value of Vgy_act or θbank_act in a situation wherein the μ sensitivity p(γ_act, δf_act, Vgx_act) is not zero (p≠0).

When attention is focused on expression 4-13a out of the aforesaid expressions 4-13a and 4-13b, it is understood that observing the actual yaw angular acceleration γdot_act and the actual sensed-by-sensor lateral acceleration Accy_sensor_act makes it possible to identify the value of the actual NSP yaw moment Mnsp_act generated by the resultant force of actual road surface reaction forces acting on each wheel 2-*i* from a road surface on the basis of the observed values of γdot_act and Accy_sensor_act. The actual road surface reaction forces depend upon the actual road surface frictional coefficient μ_act.

In this case, the right side of expression 4-13a does not include not only the actual road surface frictional coefficient μ_act but also the actual vehicle center of gravity lateral acceleration Vgy_act and the actual road surface bank angle θbank_act. Thus, the observed value of the actual NSP yaw moment Mnsp_act can be obtained from the observed values of the actual yaw angular acceleration γdot_act and the actual sensed-by-sensor lateral acceleration Accy_sensor_act without the need for the observed values of the actual road surface frictional coefficient μ_act, the actual vehicle center of gravity lateral acceleration Vgy_act, and the actual road surface bank angle θbank_act.

Here, the aforesaid yaw angular acceleration detected value γdot_sens means the observed value of the actual yaw angular acceleration γdot_act, while the aforesaid vehicle center of gravity lateral acceleration detected value Accy_sens means the observed value of the actual sensed-by-sensor lateral acceleration Accy_sensor_act.

Hence, the values calculated by an expression in which γdot_act and Accy_sensor_act of the right side of expression 4-13a have been replaced by γdot_sens and Accy_sens, which are the observed values thereof, will be hereinafter referred to as the NSP yaw moment detected value Mnsp_sens. This Mnsp_sens is defined by expression 4-14 given below.

$$Mnsp\_sens = Iz * \gamma dot\_sens + Lnsp * m * Accy\_sens \quad \text{Expression 4-14}$$

In this case, if it is assumed that the yaw angular acceleration detected value γdot_sens and the vehicle center of gravity lateral acceleration detected value Acct_sens accurately agree with the actual yaw angular acceleration detected value γdot_act and the actual sensed-by-sensor lateral acceleration Accy_sensor_act, then Mnsp_act equals Mnsp_sens. Accordingly, from the yaw angular acceleration detected value γdot_sens and the vehicle center of gravity lateral acceleration detected value Accy_sens, the NSP yaw moment detected value Mnsp_sens as the observed value of the actual NSP yaw moment Mnsp_act can be calculated by expression 4-14.

The NSP yaw moment detected value Mnsp_sens calculated as described above carries a meaning as the value (detected value) of Mnsp estimated on the basis of the observed value of a motional state amount of the vehicle 1 without the need for the value of the actual external force (actual road surface reaction force) acting on the vehicle 1 or the value of the actual road surface frictional coefficient μ_act.

The description will now be given of the processing in which the estimated value of the road surface frictional coefficient μ is used to estimate the road surface reaction forces acting on a wheel of the vehicle 1 on an appropriate dynamic model of the vehicle 1 in place of the aforesaid NSP yaw moment detected value Mnsp_sens and then the value of the NSP yaw moment generated by the resultant force of the estimated road surface reaction forces is estimated.

Here, in the present embodiment, the road surface reaction force estimated value is calculated by the vehicle model calculator 24 as described above by using a friction characteristic model or a vehicle motion model. Then, the value of the NSP yaw moment Mnsp can be estimated from the estimated value of the road surface reaction force, as will be discussed later.

However, in the description herein, for the convenience of explaining the principle of estimating the road surface frictional coefficient μ, a vehicle model calculator, which is different from the vehicle model calculator 24 (hereinafter referred to as the vehicle model calculator for the explanation) will sequentially carries out the arithmetic processing for estimating the motional state amount of the vehicle 1 or the road surface reaction force at a predetermined arithmetic processing cycle by using the dynamic model of the vehicle 1 represented by the aforesaid expression 4-3.

In this case, at each arithmetic processing cycle, the latest values (the previous values or the current values) of the vehicle center of gravity longitudinal velocity estimated value Vgx_estm, the road surface frictional coefficient estimated value μ_estm, and the road surface bank angle estimated value θbank_estm as the observed values of the front wheel steering angle detected value δf_sens, the yaw rate detected value γ_sens, and the road surface bank angle estimated value θbank_estm are input to the vehicle model calculator for the explanation as the observed values of δf_act, γ_act, Vgx_act, μ_act, and θbank_act, respectively, of the right side of expression 4-3.

Incidentally, Vgx_estm, μ_estm, and θbank_estm mean the observed values obtained by an arbitrary appropriate method. The values of parameters a11, a12s, a21, a22, b1, and b2 in the aforesaid expression 4-3 are to be preset.

Then, the vehicle model calculator for the explanation carries out the following estimation arithmetic processing. More specifically, the vehicle model calculator for the explanation calculates the vehicle center of gravity side slip velocity change rate estimated value Vgdot_y_estm, which is the estimated value of the temporal change rate (differential value) of the vehicle center of gravity side slip velocity Vgy, according to the following expression 5-1, in which the actual value of γ_act or the like in the expression of the first line of the aforesaid expression 4-3 has been replaced by an estimated value or a detected value.

$$\text{Vgdot\_y\_estm} = \mu\_estm * a11 * \text{Vgy\_estm\_p} / \text{Vgx\_estm} + \quad \text{Expression 5-1}$$
$$\mu\_estm * a12s * \gamma\_sens / \text{Vgx\_estm} +$$
$$\mu\_estm * b1 * \delta f\_sens -$$
$$\text{Vgx\_estm} * \gamma\_sens - g * \sin(\theta bank\_estm)$$

The vehicle center of gravity side slip velocity estimated value Vgy_estm_p required for the computation of the first term of the right side of expression 5-1 is the previous value as the latest value of Vgy_estm already calculated by the vehicle model calculator for the explanation.

In this case, the result obtained by removing the fourth term and the fifth term from the right side of expression 5-1 carries a meaning as a value obtained by dividing the estimated value of a lateral component of the vehicle body 1B of the translational force vector acting on the center-of-gravity point of the vehicle 1 due to the resultant force of the road surface reaction forces of each wheel 2-i (i.e., the estimated value of a component in the Y-axis direction of the total road surface reaction force resultant translational force vector ↑Fg_total) by the vehicle mass m.

The fourth term of the right side means the estimated value of the acceleration generated at the center-of-gravity point of the vehicle 1 due to a centrifugal force from a turning motion of the vehicle 1, and the fifth term means the estimated value of the lateral acceleration component of the vehicle body 1B of the gravitational acceleration.

Accordingly, expression 5-1 denotes the processing for calculating the vehicle center of gravity side slip velocity change rate estimated value Vgdot_y_estm by calculating Fgy_total_estm/m on the basis of μ_estm, Vgy_estm_p, Vgx_estm, γ_sens, and δf_sens, and then by subtracting the estimated value of the acceleration of the centrifugal force acting on the center-of-gravity point of the vehicle 1 (=Vgx_estm*γ_sens) and the estimated value of an acceleration component in the lateral direction of the vehicle body 1B out of the gravitational acceleration (=g*sin(θbank_estm)) from the calculated value of Fgy_total_estm/m.

Then, the vehicle model calculator for the explanation calculates a new vehicle center of gravity side slip velocity estimated value Vgy_estm (a current value) according to the following expression 5-2 indicating the integral calculation of Vgdot_y_estm on the basis of the vehicle center of gravity side slip velocity change rate estimated value Vgdot_y_estm determined as described above and the previous value of the vehicle center of gravity side slip velocity estimated value Vgy_estm_p. In expression 5-2, $\Delta T$ denotes the arithmetic processing cycle of the vehicle model calculator for the explanation.

$$Vgy\_estm = Vgy\_estm\_p + Vgdot\_y\_estm * \Delta T \quad \text{Expression 5-2}$$

The value of Vgy_estm calculated as described above is used to calculate the new vehicle center of gravity side slip velocity change rate Vgdot_y_estm at the next arithmetic processing cycle.

Further, the vehicle model calculator for the explanation calculates the sensed-by-sensor lateral acceleration estimated value Accy_sensor_estm, which is the estimated value of the actual acceleration sensed by the lateral acceleration sensor 15 of the vehicle 1 (the actual sensed-by-sensor lateral acceleration Accy_sensor_act) according to expression 5-3 given below (in other words, by the calculation of the first to the third terms of the right side of expression 5-1).

$$Accy\_sensor\_estm = \mu\_estm*a11*Vgy\_estm\_p/Vgx\_estm + \mu\_estm*a12s*\gamma\_sens/Vgx\_estm + \mu\_estm*b1*\delta f\_sens \quad \text{Expression 5-3}$$

Supplementally, regarding this expression 5-3, the following expression 5-4 holds, as is obvious from the aforesaid expression 4-5.

$$Accy\_sensor\_estm = Vgdot\_y\_estm + Vgx\_estm*\gamma\_sens + g*\sin(\theta\text{ bank\_estm}) \quad \text{Expression 5-4}$$

Further, as is obvious from this expression 5-4 and the aforesaid expression 5-1, the right side of expression 5-4 agrees with the sum of the first to the third terms of the right side of expression 5-1. Hence, the sensed-by-sensor lateral acceleration estimated value Accy_sensor_estm can be calculated according to the aforesaid expression 5-3.

The right side of expression 5-3 means the value obtained by dividing the estimated value of a component in the lateral direction of the vehicle body 1B of the translational force vector acting on the center-of-gravity point of the vehicle 1 due to the resultant force of the road surface reaction force of each wheel 2-$i$ (i.e., the estimated value of a component in the Y-axis direction Fgy_total_estm of the total road surface reaction force resultant translational force vector ↑Fg_total) by the vehicle mass m. Therefore, expression 5-3 denotes the processing for calculating Vgy_total_estm/m on the basis of $\mu$_estm, Vgy_estm_p, Vgx_estm, $\gamma$_sens, and $\delta$f_sens, and then obtaining the calculated Fgy_total_estm/m as Accy_sensor_estm.

Further, the vehicle model calculator for the explanation calculates the yaw angular acceleration estimated value $\gamma$dot_estm, which is the estimated value of the temporal change rate (a differential value) of the yaw angular acceleration $\gamma$dot, according to the following expression 5-5 obtained by replacing the actual value of $\gamma$_act or the like in the expression of the second line of the aforesaid expression 4-3.

$$\gamma\text{dot}\_estm = \mu\_estm*a21*Vgy\_estm\_p/Vgx\_estm + \mu\_estm*a22*\gamma\_sens/Vgx\_estm + \mu\_estm*b2*\delta f\_sens \quad \text{Expression 5-5}$$

The right side of this expression 5-5 means the arithmetic processing for determining the value obtained by dividing the estimated value of a moment about the yaw axis acting on the center-of-gravity point of the vehicle 1 due to the resultant force of the road surface reaction forces of each wheel 2-$i$ (i.e., the total road surface reaction force resultant yaw moment estimated value Mgz_estm) by a vehicle yaw inertial moment Iz. Therefore, expression 5-5 denotes the processing for calculating Mgz_estm/Iz on the basis of $\mu$_estm, Vgy_estm_p, Vgx_estm, $\gamma$_sens, and $\delta$f_sens, and then obtaining the calculated value of Mgz_estm/Iz as the yaw angular acceleration estimated value $\gamma$dot_estm.

Here, eliminating Vgy_estm, taking the above expressions 5-3 and 5-5 as simultaneous equations, and applying the aforesaid expression leads to expression 5-6 given below.

$$Iz*\gamma\text{dot}\_estm + Lnsp*m*Accy\_sensor\_estm = \mu\_estm*p(\gamma\_sens, \delta f\_sens, Vgx\_estm) \quad \text{Expression 5-6}$$

where $$p(\gamma\_sens, \delta f\_sens, Vgx\_estm) = Iz*\begin{pmatrix} (a22-(a21/a11)*a12s)* \\ \gamma\_sens/Vgx\_estm + \\ (b2-(a21/a11)*b1)*\delta f\_sens \end{pmatrix} \quad \text{Expression 5-7}$$

Incidentally, $p(\gamma\_sens, \delta f\_sens, Vgx\_estm)$ means the value of the $\mu$ sensitivity calculated from $\gamma$_sens, $\delta$f_sens, and Vgx_estm, which are the observed values of $\gamma$, $\delta$f, and Vgx. In the following description, the $\mu$ sensitivity p will mean $p(\gamma\_sens, \delta f\_sens, Vgx\_estm)$ defined by the above expression 5-7 unless otherwise specified.

More generally, the $\mu$ sensitivity p defined by expression 5-7 denotes the value of the $\mu$ sensitivity calculated by linearly coupling $\gamma$_sens and $\delta$f_sens. In this case, if the coefficients by which $\gamma$_sens and $\delta$f_sens are multiplied are denoted by A1 and A2, respectively, (if $p = A1*\gamma\_sens + A2*\delta f\_sens$), then $A1 = Iz*((a22-(a21/a11)*a12s)/Vgx\_estm$ and $A2 = (b2-(a21/a11)*b1)$ hold. Therefore, the coefficients A1 and A2 may be said to be the coefficients that are set such that A1 and A2 change according to Vgx_estm as the observed value of the vehicle speed of the vehicle 1 (such that A2/A1 changes in proportion to Vgx_estm).

In other words, the linear coupling of $\gamma$_sens and $\delta$f_sens by expression 5-7 may be said to be the linear coupling configured such that the value of the $\mu$ sensitivity p calculated by the linear coupling is proportional to the value of the actual NSP yaw moment Mnsp_act identified using the observed values or the detected values $\gamma$_sens, $\delta$f_sens, and Vgx_estm as the values of $\gamma$_act, $\delta$f_act, and Vgx_act in the case where it is assumed that the road surface frictional coefficient $\mu$_act takes a constant value in the linear two-wheeled vehicle model denoted by the aforesaid expression 4-3.

Supplementally, in the present embodiment, the yaw rate estimated value $\gamma$_estm is determined such that the value $\gamma$_estm agrees or substantially agrees with the yaw rate detected value $\gamma$_sens, as described above. Hence, an expression in which $\gamma$_sens in the right side of the aforesaid expression 5-7 has been replaced by $\gamma$_estm may be used as a definitional expression for determining the value of the $\mu$ sensitivity p.

Both sides of the above expression 5-6 mean an NSP yaw moment estimated value Mnsp_estm, which is the estimated value of a moment about the yaw axis at NSP (the value of a moment on a model based on the aforesaid expression 4-3). In other words, the NSP yaw moment estimated value Mnsp_estm agrees with the left side and the right side of expression 5-6, as indicated by expressions 5-8a and 5-8b given below.

$$Mnsp\_estm = Iz*\gamma\text{dot}\_estm + Lnsp*m*Accy\_sensor\_estm \quad \text{Expression 5-8a}$$

$$Mnsp\_estm = \mu\_estm*p(\gamma\_sens, \delta f\_sens, Vgx\_estm) \quad \text{Expression 5-8b}$$

Expression 5-8a represents the NSP yaw moment estimated value Mnsp_estm as the estimated value of a moment balancing out an inertial force moment (a moment with a sign reversed from the sign of the inertial force moment) generated about the yaw axis at NSP by a motion of the vehicle 1 on the model.

Expression 5-8b represents the NSP yaw moment estimated value Mnsp_estm as the estimated value of a moment about the yaw axis generated at NSP due to the resultant force of the road surface reaction forces of each wheel 2-$i$, which depends on μ_estm (the resultant force of road surface reaction forces on the model).

In this case, the NSP yaw moment estimated value Mnsp_estm calculated by expression 5-8b out of expressions 5-8a and 5-8b is calculated depending on the road surface frictional coefficient estimated value μ_estm, so that the Mnsp_estm reflects an influence of an error of the road surface frictional coefficient estimated value μ_estm.

The right side of expression 5-8b does not directly include the vehicle center of gravity lateral acceleration estimated value Vgy_estm or the road surface bank angle estimated value θbank_estm. For this reason, the NSP yaw moment estimated value Mnsp_estm calculated by expression 5-8b will not be directly subjected to the influence of an error of the vehicle center of gravity lateral acceleration estimated value Vgy_estm or the road surface bank angle estimated value θbank_estm.

Accordingly, the vehicle model calculator for the explanation calculates the NSP yaw moment estimated value Mnsp_estm by expression 5-8b. Further generalizing the NSP yaw moment estimated value Mnsp_estm thus calculated, the estimated value Mnsp_estm carries a meaning as the estimated value of Mnsp_act calculated depending on μ_estm on the basis of a dynamic model of the vehicle 1 (more specifically, the estimated value of Mnsp_act calculated on the assumption that μ_estm is accurate).

The above has described the processing by the vehicle model calculator for the explanation. Supplementally, for the convenience of explanation of the principle for estimating the road surface frictional coefficient μ, the vehicle model calculator for the explanation has calculated the vehicle center of gravity side slip velocity change rate estimated value Vgdot_y_estm, the vehicle center of gravity side slip velocity estimated value Vgy_estm, the yaw angular acceleration estimated value γdot_estm, and the sensed-by-sensor lateral acceleration estimated value Accy_sensor_estm.

However, if the NSP yaw moment estimated value Mnsp_estm is calculated according to the aforesaid expression 5-8b on the basis of the dynamic model (the linear two-wheeled vehicle model) represented by the aforesaid expression 4-3, then Vgdot_y_estm, Vgy_estm, γdot_estm, and Accy_sensor_estm are not required, as is obvious from the aforesaid expressions 5-7 and 5-8b.

If the dynamic model represented by the aforesaid expression 4-3 is used, then the value of the calculation result of the right side of the aforesaid expression 5-8a and the value of the calculation result of the right side of the aforesaid expression 5-8b will be the same. Therefore, Mnsp_estm may alternatively be calculated by expression 5-8a.

A method for estimating the road surface frictional coefficient μ will now be discussed on the basis of the NSP yaw moment detected value Mnsp_sens obtained by the aforesaid expression 4-14 and the NSP yaw moment estimated value Mnsp_estm calculated by the aforesaid expression 5-8b.

As described above, Mnsp_sens carries a meaning as the observed value (detected value) of Mnsp_act obtained on the basis of the observed value of the state amount of a motion of the vehicle 1 (γdot_sens, Accy_sens) without the need for the value of a road surface reaction force acting on the vehicle 1 as an external force or the value of the road surface frictional coefficient μ. Similarly, Mnsp_estm carries a meaning as the observed value (estimated value) of Mnsp_act calculated using μ_estm on the basis of a dynamic model of the vehicle 1. Hence, the difference between Mnsp_sens and Mnsp_estm is considered to have correlation with the error of μ_estm relative to μ_act.

Here, it is assumed that the yaw rate detected value γ_sens, the yaw angular acceleration detected value γ_dot_sens, the front wheel steering angle detected value δf_sens, the vehicle center of gravity longitudinal velocity estimated value Vgx_estm (the estimated value of a vehicle speed), and the vehicle center of gravity lateral acceleration detected value Accy_sens accurately coincide with the actual yaw rate γ_act, the actual yaw angular acceleration γdot_act, the actual front wheel steering angle detected value δf_act, the actual vehicle center of gravity longitudinal velocity Vgx_act, and the actual sensed-by-sensor lateral acceleration Accy_sensor_act, respectively. At this time, expression 6-1 given below is derived from the aforesaid expression 4-11.

$$Iz*\gamma\text{dot\_sens}+Lnsp*m*Accy\_\text{sens}=\mu\_\text{act}*p(\gamma\_\text{sens}, \delta f\_\text{sens}, Vgx\_\text{estm}) \quad \text{Expression 6-1}$$

Further, expression 6-2 given blow is derived from this expression 6-1 and the aforesaid expressions 4-14, 5-6, and 5-8b.

$$\text{Mnsp\_sens} - \text{Mnsp\_estm} = \begin{pmatrix} Iz*\gamma\text{dot\_sens}+ \\ Lnsp*m*\text{Accy\_sens} \end{pmatrix} - \begin{pmatrix} Iz*\gamma\text{dot\_estm}+ \\ Lnsp*m* \\ \text{Accy\_sensor\_estm} \end{pmatrix}$$

$$= (\mu\_\text{act} - \mu\_\text{estm})*$$

$$p(\gamma\_\text{sens}, \delta f\_\text{sens}, Vgx\_\text{estm})$$

Expression 6-2

Based on this expression 6-2, the road surface frictional coefficient estimated value μ_estm may be determined such that Mnsp_estm coincides with Mnsp_sens in order to cause the value of μ_estm to coincide with the actual road surface frictional coefficient μ_act in a situation wherein p(γ_sens, δf_sens, and Vgx_estm) is not zero (≠0).

More generally, this means that the road surface frictional coefficient estimated value μ_estm to be applied to the dynamic model may be determined such that the estimated value of the actual NSP yaw moment Mnsp_act (the NSP yaw moment estimated value Mnsp_estm) calculated using a dynamic model including the friction characteristic of each wheel 2-$i$ of the vehicle 1 (a dynamic model dependant upon the road surface frictional coefficient estimated value μ_estm) agrees with the estimated value of the actual NSP yaw moment Mnsp_act (NSP yaw moment detected value Mnsp_sens) calculated from the yaw angular acceleration detected value γdot_sens as the observed value of a motional state amount of the vehicle 1 and the vehicle center of gravity lateral acceleration detected value Accy_sens (=the detected value of the sensed-by-sensor lateral acceleration Accy_sensor).

In this case, p(γ_sens, δf_sens, Vgx_estm) of the right side of expression 6-2 does not include the vehicle center of gravity side slip velocity estimated value Vgy_estm or the road surface bank angle estimated value θbank_estm, as is obvious from the aforesaid expression 5-7. Therefore, in the situation wherein p(γ_sens, δf_sens, Vgx_estm) is not zero (≠0), the value of the difference between Mnsp_sens and Mnsp_estm (the left side of expression 6-2) is considered to have high correlation with the difference between μ_act and μ_estm, i.e., the error of μ_estm. In other words, in the situation wherein p(γ_sens, δf_sens, Vgx_estm) is not zero (≠0), the difference between Mnsp_sens and Mnsp_estm is considered primarily due to the error of μ_estm.

Accordingly, it is considered that determining the road surface frictional coefficient estimated value μ_estm on the basis of expression 6-2 makes it possible to estimate the actual road surface frictional coefficient μ_act while restraining the influence of the error of the vehicle center of gravity side slip velocity estimated value Vgy_estm or the road surface bank angle estimated value θbank_estm. Thus, the μ estimator 26 in the present embodiment calculates the road surface frictional coefficient estimated value μ_estm on the basis of the aforesaid expression 6-2.

To determine the road surface frictional coefficient estimated value μ_estm on the basis of expression 6-2 as described above such that Mnsp_estm coincides with Mnsp_sens in the situation wherein p(γ_sens, δf_sens, Vgx_estm) is not zero (≠0), it is conceivable to determine the road surface frictional coefficient estimated value μ_estm such that, for example, the following expression 6-3 is satisfied.

$$Mnsp\_sens = \mu\_estm * p(\gamma\_sens, \delta f\_sens, Vgx\_estm) \quad \text{Expression 6-3}$$

In this case, however, the road surface frictional coefficient estimated value μ_estm tends to develop an undue change due to errors of Mnsp_sens, γ_sens, δf_sens, and Vx_sens. Especially when the value of p(γ_sens, δf_sens, Vgx_estm) is close to zero, it is difficult to secure the reliability and stability of the road surface frictional coefficient estimated value μ_estm determined on the basis of expression 6-3.

Hence, the μ estimator 26 in the present embodiment carries out feedback arithmetic processing based on the difference between the NSP yaw moment detected value Mnsp_sens determined from the observed value of a motional state amount of the vehicle 1 and the NSP yaw moment estimated value Mnsp_estm determined on the basis of a road surface reaction force, which is estimated depending on the road surface frictional coefficient estimated value μ_estm, so as to sequentially determine the increasing/decreasing manipulated variable of μ_estm such that the difference converges to zero, i.e., such that Mnsp_estm converges to Mnsp_sens.

The μ estimator 26 updates the value of μ_estm on the basis of the determined increasing/decreasing manipulated variable. Thus, the value of μ_estm is sequentially calculated such that the road surface frictional coefficient estimated value μ_estm converges to the actual road surface frictional coefficient μ_act (steadily agrees with μ_act). Hereinafter, the difference between Mnsp_sens and Mnsp_estm (=Mnsp_sens−Mnsp_estm) will be referred to as the NSP yaw moment estimation error Mnsp_err.

In this case, as is obvious from the aforesaid expression 6-2, the NSP yaw moment estimation error Mnsp_err is proportional to the μ sensitivity p. As the μ sensitivity p approaches zero, the sensitivity of Mnsp_err to the error to μ_estm (the magnitude of the ratio of a change in Mnsp_err with respect to a change in the error of μ_estm) decreases.

In the present embodiment, therefore, the gain value, which indicates the ratio of a change in the increasing/decreasing manipulated variable of μ_estm with respect to a change in Mnsp_err (i.e., the feedback gain of the feedback arithmetic processing for converging Mnsp_err to zero), is changed according to the μ sensitivity p in order to secure the reliability and stability of μ_estm.

The above has described the basic principle for estimating the road surface frictional coefficient μ in the present embodiment.

Based on the basic principle for estimating the road surface frictional coefficient μ explained above, the processing by the μ estimator 26 in the present embodiment will be described with reference to FIG. 11 to FIG. 13.

Figure 11:
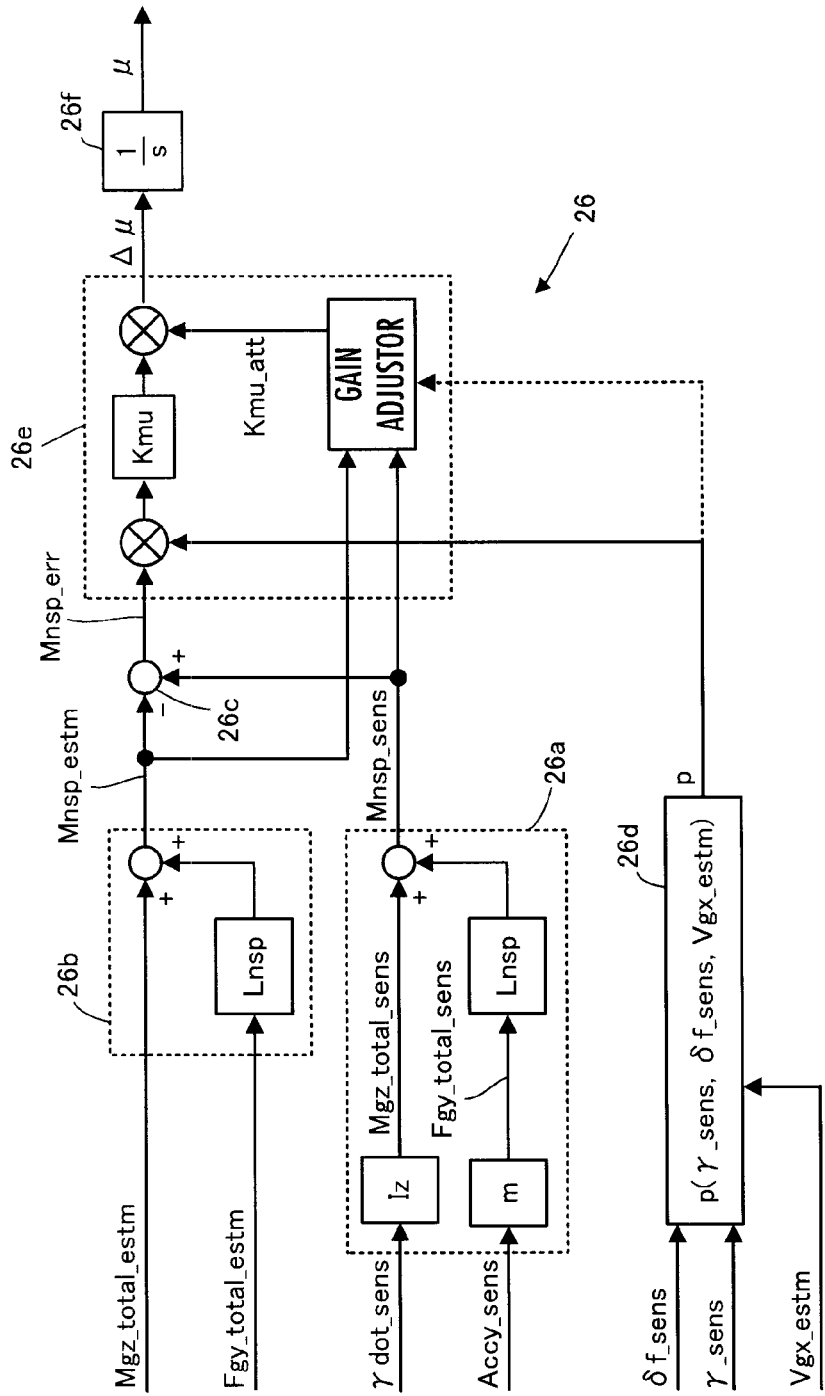
FIG. 11 is a block diagram illustrating functions of a μ estimator illustrated in FIG. 3.

As illustrated in the block diagram of FIG. 11, the μ estimator 26 includes, as its functions, an Mnsp_sens calculator 26a, which calculates the NSP yaw moment detected value Mnsp_sens, an Mnsp_estm calculator 26b, which calculates an NSP yaw moment estimated value Mnsp_estm, an Mnsp_err calculator 26c, which calculates the NSP yaw moment estimation error Mnsp_err, a μ sensitivity calculator 26d, which calculates the μ sensitivity p(γ_sens, δf_sens, Vgx_estm), a frictional coefficient increasing/decreasing manipulated variable determiner 26e, which determines the increasing/decreasing manipulated variable Δμ of the road surface frictional coefficient μ, and a frictional coefficient estimated value updater 26f, which updates the road surface frictional coefficient estimated value μ_estm on the basis of the increasing/decreasing manipulated variable Δμ.

Figure 12:
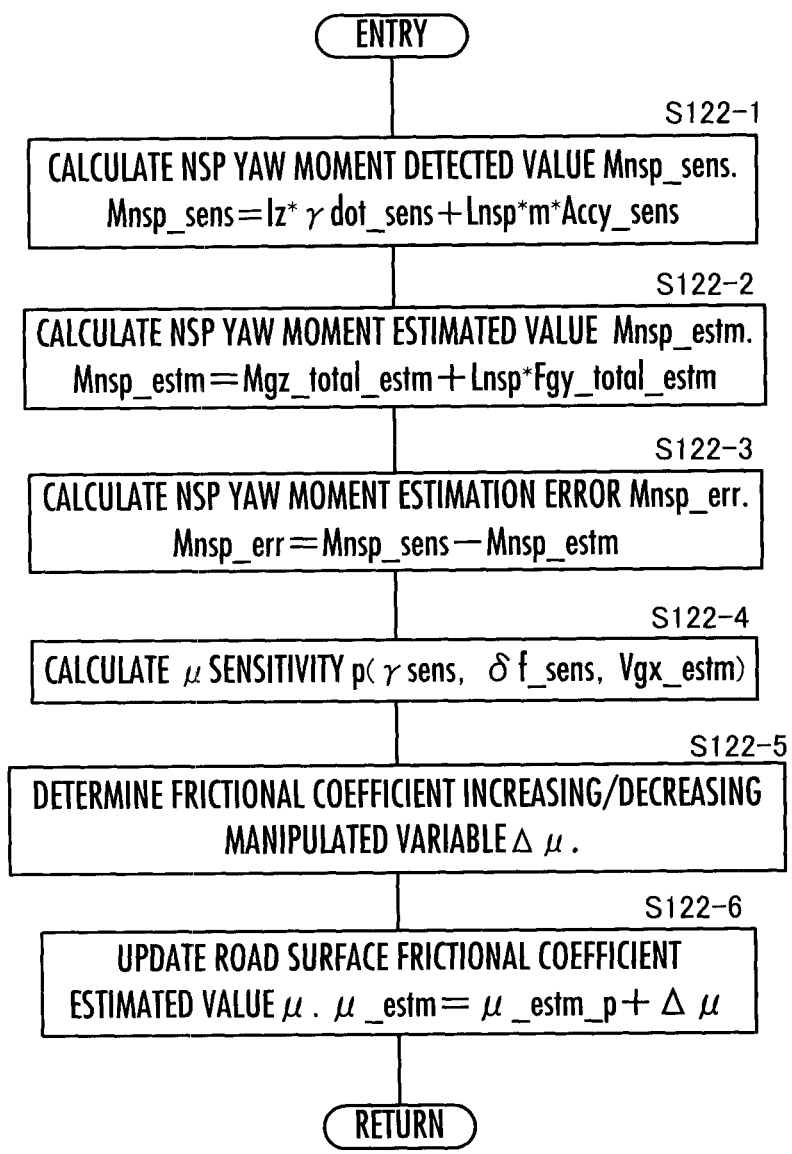
FIG. 12 is a flowchart illustrating the processing by the μ estimator illustrated in FIG. 3.

The μ estimator 26 carries out the processing illustrated by the flowchart of FIG. 12 thereby to sequentially determine the road surface frictional coefficient estimated value μ_estm.

More specifically, the μ estimator 26 carries out the processing by an Mnsp_sens calculator 26a in S122-1 to calculate the NSP yaw moment detected value Mnsp_sens.

To be more specific, the Mnsp_sens calculator 26a computes the right side of the aforesaid expression 4-14 by using the yaw angular acceleration detected value γdot_sens as the observed value of a motional state amount of the vehicle 1 associated with an inertial force moment balancing out the NSP yaw moment Mnsp and the vehicle center of gravity lateral acceleration detected value Accy_sens (the sensed-by-sensor lateral acceleration detected value) out of the amount-to-be-observed detected values generated by the amount-to-be-observed detector 22 in the aforesaid S100.

In this case, predetermined values set in advance are used as the value of the vehicle yaw inertial moment Iz, the value of the vehicle mass m, and the distance Lnsp between the vehicle center of gravity and the NSP, which are necessary to compute expression 4-14.

The first term of the right side of expression 4-14 corresponds to a total road surface reaction force resultant force yaw moment detected value Mgz_total_sens, and "m*Accy_sens" in the second term corresponds to the total road surface reaction force resultant lateral force detected value Fgy_total_sens.

Further, the μ estimator 26 carries out the processing by an Mnsp_estm calculator 26b in S122-2 to calculate the NSP yaw moment estimated value Mnsp_estm.

To be more specific, the Mnsp_estm calculator 26b calculates Mnsp_estm according to the following expression 7-1 on the basis of the total road surface reaction force resultant lateral force estimated value Fgy_total_estm (a component in the Y-axis direction of the total road surface reaction force resultant translational force vector estimated value ↑Fg_total_estm) and the total road surface reaction force resultant yaw moment estimated value Mgz_total_estm, which have been calculated by the vehicle model calculator 24 in the aforesaid S112.

$$Mnsp\_estm = Mgz\_total\_estm + Lnsp * Fgy\_total\_estm \quad \text{Expression 7-1}$$

Subsequently, the μ estimator 26 carries out the processing by the Mnsp_err calculator 26c in S122-3 to calculate the NSP yaw moment estimation error Mnsp_err.

To be more specific, the Mnsp_err calculator 26c calculates Mnsp_err by subtracting the NSP yaw moment estimated value Mnsp_estm calculated in S122-2 from the NSP yaw moment detected value Mnsp_sens calculated in S122-1.

Further, the µ estimator 26 calculates the µ sensitivity p by carrying out the processing by the µ sensitivity calculator 26d in S122-4.

To be more specific, the µ sensitivity calculator 26d calculates the µ sensitivity p(γ_sens, δf_sens, Vgx_estm) by carrying out the calculation of the right side of the aforesaid expression 5-7 from the yaw rate detected value γ_sens and the front wheel steering angle detected value δf_sens, which have been generated by the amount-to-be-observed detector 22 in the aforesaid S100, and the vehicle center of gravity longitudinal velocity estimated value Vgx_estm determined by the vehicle model calculator 24 in the aforesaid S114. In this case, predetermined values that are set beforehand are used as the value of the vehicle inertial yaw moment Iz and the values of the parameters a11, a12s, a21, a22, b1 and b2, which are necessary for the calculation of expression 5-7.

In this case, as is obvious from expression 5-7, the µ sensitivity p is determined by linearly coupling γ_sens and δf_sens. In this linear coupling, the ratio between a coefficient by which γ_sens is multiplied and a coefficient by which δf_sens is multiplied changes according to Vgx_estm.

Subsequently, the µ estimator 26 carries out the processing by the frictional coefficient increasing/decreasing manipulated variable determiner 26e in S122-5 to determine a frictional coefficient increasing/decreasing manipulated variable Δµ.

To schematically explain the processing, basically, the frictional coefficient increasing/decreasing manipulated variable determiner 26e determines the frictional coefficient increasing/decreasing manipulated variable Δµ on the basis of the NSP yaw moment estimation error Mnsp_err calculated in S122-3 (more specifically, on the basis of Mnsp_err and the µ sensitivity p calculated in S122-4).

To be more specific, the frictional coefficient increasing/decreasing manipulated variable determiner 26e determines the frictional coefficient increasing/decreasing manipulated variable Δµ according to the feedback control law such that the NSP yaw moment error Mnsp_err is converged to zero, i.e., such that Mnsp_estm is converged to Mnsp_sens. In this case, the proportional law is used as the feedback control law, and the Δµ is calculated by multiplying Mnsp_err by a given gain value Gmu. Further, in this case, Δµ is determined to be proportional to the product of Mnsp_err and the aforesaid µ sensitivity p. Thus, the gain value Gmu indicative of the ratio of a change in Δµ with respect to a change in Mnsp_err (hereinafter, Gmu will be referred to as the frictional coefficient operating gain) is determined such that the gain value Gmu changes according to the µ sensitivity p.

Here, Mnsp_sens and Mnsp_estm carry a meaning as different approaches or methods for estimating the value of the same actual NSP yaw moment Mnsp_act.

The polarity (direction) of the actual NSP yaw moment Mnsp_act can be either the positive polarity or the negative polarity, depending on the traveling condition of the vehicle 1. Hence, in a situation wherein Mnsp_act is not zero (Mnsp_act≠0), Mnsp_sens and Mnsp_estm should denote moments that share the same polarity, i.e., the moments in the same direction.

In a situation wherein Mnsp_sens and Mnsp_estm have polarities that are opposite to each other, it is considered that the error of Mnsp_estm is relatively large, as compared with the absolute value of Mnsp_sens or Mnsp_estm, and the reliability of the value of Mnsp_sens or Mnsp_estm is low, i.e., the S/N ratio is low.

Accordingly, there is a danger in such a situation that updating the road surface frictional coefficient estimated value µ_estm on the basis of the NSP yaw moment estimation error Mnsp_err calculated from Mnsp_sens and Mnsp_estm leads to a further increase in the absolute value of Mnsp_err with the consequent divergence of the road surface frictional coefficient estimated value µ_estm.

According to the present embodiment, therefore, in the case where a predetermined updating cancellation condition, which includes at least a condition that the polarities of Mnsp_sens and Mnsp_estm are different, that is, opposite from each other, the frictional coefficient increasing/decreasing manipulated variable determiner 26e cancels determining the frictional coefficient increasing/decreasing manipulated variable Δµ on the basis of Mnsp_err (i.e., the updating of the road surface frictional coefficient estimated value µ_estm on the basis of Mnsp_err), and determines a predetermined value that has been set beforehand as the value of Δµ.

Figure 13:
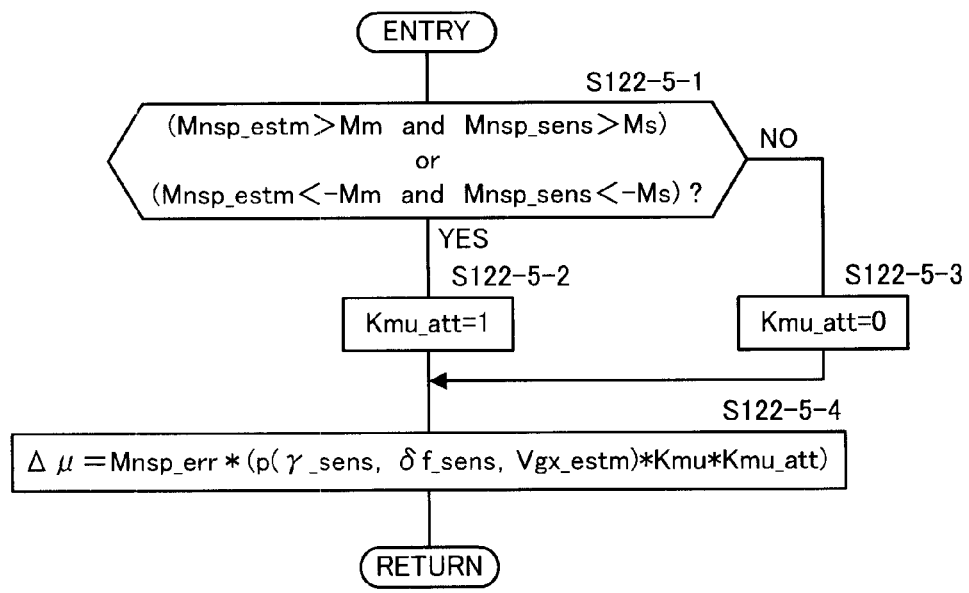
FIG. 13 is a flowchart illustrating the processing in S122-5 of FIG. 12.

To be more specific, the frictional coefficient increasing/decreasing manipulated variable determiner 26e carries out the processing as illustrated by the flowchart of FIG. 13.

The frictional coefficient increasing/decreasing manipulated variable determiner 26e first determines in S122-5-1 whether a condition that Mnsp_estm>Mm and Mnsp_sens>Ms or a condition that Mnsp_estm<−Mm and Mnsp_sens<−Ms holds on the NSP yaw moment detected value Mnsp_sens calculated in S122-1 and the NSP yaw moment estimated value Mnsp_estm calculated in S122-2. The reference characters Mm and Ms denote non-negative predetermined values (zero or positive values in the vicinity of zero), which are set beforehand.

The determination processing in S122-5-1 determines whether the aforesaid updating cancellation condition holds. If the determination result of S122-5-1 is negative, then it means that the updating cancellation condition holds.

In this case, if the predetermined values Mm and Ms are set to zero, then the determination result of S122-5-1 will be negative, that is, the updating cancellation condition will hold. This is equivalent to Mnsp_estm and Mnsp_sens having polarities that are opposite from each other.

Meanwhile, if the predetermined values Mm and Ms are positive values, then the determination result in S122-5-1 will be negative, meaning that the updating cancellation condition applies, not only in the case where Mnsp_estm and Mnsp_sens have polarities that are opposite from each other but also in the case where −Mm≤Mnsp_estm≤Mm or −Ms≤Mnsp_sens≤Ms holds (in other words, in the case where Mnsp_estm or Mnsp_sens takes a value in a range in the vicinity of zero).

In this case, therefore, the updating cancellation condition includes a condition that at least one of Mnsp_estm and Mnsp_sens takes a value within the predetermined range in the vicinity of zero in addition to the condition that the polarities of Mnsp_estm and Mnsp_sens are opposite to each other.

Subsequently, in S122-5-2 or S122-5-3, the frictional coefficient increasing/decreasing manipulated variable determiner 26e sets a gain adjustment parameter Kmu_att for adjusting the aforesaid frictional coefficient operation gain Gmu (a parameter by which the NSP yaw moment error Mnsp_err is multiplied, together with the µ sensitivity p) according to the determination result in S122-5-1.

To be more specific, the frictional coefficient increasing/decreasing manipulated variable determiner 26e sets the value of Kmu_att to 1 in S122-5-2 if the determination result in S122-5-1 is affirmative, that is, the updating cancellation condition does not hold. If the determination result is negative, that is, if the updating cancellation condition applies, then the frictional coefficient increasing/decreasing manipulated variable determiner 26e sets the value of Kmu_att to zero in S122-5-3.

The processing of S122-5-1 to S122-5-3 described above is the processing carried by the gain adjustor in FIG. 11. The dashed-line arrow in FIG. 11 indicates that the value of the μ sensitivity p is input to the gain adjustor, which is related to a third embodiment or a fourth embodiment to be discussed later. In the present embodiment, the processing by the gain adjustor does not use the value of the μ sensitivity p.

Subsequently, the frictional coefficient increasing/decreasing manipulated variable determiner 26e calculates in S122-5-4 the frictional coefficient increasing/decreasing manipulated variable Δμ according to the following expression 7-2.

$$\Delta\mu = \text{Mnsp\_err} * Gmu \qquad \text{Expression 7-2}$$
$$= \text{Mnsp\_err} * \left( p\left( \begin{array}{c} \gamma\_\text{sens}, \delta f\_\text{sens}, \\ \text{Vgx\_estm} \\ Kmu * \text{Kmu\_att} \end{array} \right) * \right)$$

More specifically, the frictional coefficient increasing/decreasing manipulated variable determiner 26e determines, as the frictional coefficient operation gain Gmu, a value obtained by multiplying the μ sensitivity p calculated in S122-4 by a basic gain Kmu, which is a preset positive predetermined value, and a gain adjustment parameter Kmu_att set on the basis of the determination result in S122-5-1 (=p*Kmu*Kmu_att). Then, the frictional coefficient increasing/decreasing manipulated variable determiner 26e multiplies the NSP yaw moment error Mnsp_err calculated in S122-3 by the obtained frictional coefficient operation gain Gmu so as to determine the frictional coefficient increasing/decreasing manipulated variable Δμ.

In this case, the frictional coefficient operation gain Gmu in the case where the determination result in S122-5-1 is negative (where the updating cancellation condition does not apply) has the same polarity as that of the μ sensitivity p and Gmu is determined such that the magnitude (the absolute value) of Gmu decreases as the magnitude (the absolute value) of the μ sensitivity p decreases.

Further, if the determination result of S122-5-1 is affirmative (if the updating cancellation condition applies), then the value of the gain adjustment parameter Kmu_att is set to zero, causing the frictional coefficient operation gain Gmu to be set to zero. This forcibly sets the frictional coefficient increasing/decreasing manipulated variable Δμ to zero.

The above has described the processing carried out by the frictional coefficient increasing/decreasing manipulated variable determiner 26e in S122-5.

Referring back to FIG. 12, the μ estimator 26 then carries out the processing by the frictional coefficient estimated value updater 26f in S122-6 to update the road surface frictional coefficient estimated value μ_estm.

To be more specific, the frictional coefficient estimated value updater 26f adds the frictional coefficient increasing/decreasing manipulated variable Δμ calculated in S122-5 to the previous value of the road surface frictional coefficient estimated value μ_estm_p so as to update the road surface frictional coefficient estimated value μ_estm from the previous value μ_estm_p, thereby determining a new road surface frictional coefficient estimated value μ_estm (the current value of μ_estm).

In other words, this processing is carried out to determine the road surface frictional coefficient estimated value μ_estm by integrating Δμ. In this case, if the determination result in S122-5-1 is affirmative (if the updating cancellation condition applies), then Δμ becomes zero (Δμ=0), so that the current value of the road surface frictional coefficient estimated value μ_estm is retained at the previous value μ_estm_p.

In other words, in a situation wherein the determination result in S122-5-1 is affirmative, the road surface frictional coefficient estimated value μ_estm is retained at the road surface frictional coefficient estimated value μ_estm determined lastly in the situation wherein the determination result in S122-5-1 is negative.

The above has described the details of the processing by the μ estimator 26 in the present embodiment.

Supplementally, in the present embodiment, the processing by the vehicle model calculator 24 (the processing of S102 to S116 in FIG. 4) and the processing for the NSP yaw moment estimated value Mnsp_estm by the μ estimator 26 (S122-2 in FIG. 12) together implement the function of a first estimator of a to-be-compared external force in the present invention.

In this case, Mnsp_estm corresponds to a first estimated value of a to-be-compared external force in the present invention. Further, the detected values of the amounts to be observed (ε1_sens, δ2_sens, Vw_i_sens, γ_sens, Accx_sens, Accy_sens, Tq_i_sens) input to the vehicle model calculator 24 correspond to the observed values of the predetermined types of amounts to be observed in the present invention. The detected values of the amounts to be observed (δ1_sens, δ2_sens, Vw_i_sens, γ_sens, Accx_sens, Accy_sens, Tq_i_sens) are the detected values of the amounts to be observed that are necessary for identifying the values of input parameters (κi, βi, Fz_i) other than the road surface frictional coefficient μ among the input parameters in the aforesaid friction characteristic model.

The steps from S102 to S116 in the processing carried by the vehicle model calculator 24 implements the function of the vehicle motion/road surface reaction force estimator in the present invention.

In this case, the vehicle motion side slip velocity Vgy_estm corresponds to the state amount of a side slip motion of a vehicle in the present invention. Further, the relationship represented by the aforesaid expression 1-14 corresponds to the dynamic relationship associated with the vehicle motion/road surface reaction force estimator. The processing in S122-2 of FIG. 12 may alternatively be carried out by the vehicle model calculator 24.

In the present embodiment, the processing for determining the NSP yaw moment detected value Mnsp_sens by the μ estimator 26 (S122-1 of FIG. 12) implements the function of a second estimator of a to-be-compared external force in the present invention.

In this case, Mnsp_sens corresponds to a second estimated value of a to-be-compared external force in the present invention. The yaw angular acceleration detected value γdot_sens and the vehicle center of gravity lateral acceleration detected value Accy_sens (the sensed-by-sensor lateral acceleration detected value Accy_sensor_sens) correspond to the observed values of motional state amounts of the vehicle 1 that define the inertial moment about the yaw axis at NSP (the inertial force corresponding to a to-be-compared external force).

Further, the processing by the μ sensitivity calculator 26d of the μ estimator 26 (the processing in S122-4 of FIG. 12)

corresponds to the processing by the μ sensitivity calculating means in the present invention, the processing by the frictional coefficient increasing/decreasing manipulated variable determiner 26e (the processing in S122-5 of FIG. 12) corresponds to the processing by the frictional coefficient increasing/decreasing manipulated variable determining means in the present invention, and the processing by the frictional coefficient estimated value updater 26f (the processing in S122-6 of FIG. 12) corresponds to the processing by the frictional coefficient estimated value updating means in the present invention.

Further, the determination processing in S122-5-1 of the processing carried out by the frictional coefficient increasing/decreasing manipulated variable determiner 26e corresponds to the processing by the updating cancellation condition determining means in the present invention.

The same correspondence relationship between the present embodiment described above and the present invention will be applied to a second embodiment to an eighth embodiment, which will be discussed hereinafter, except for the updating cancellation condition determiner.

In the present embodiment explained above, the frictional coefficient increasing/decreasing manipulated variable Δμ is determined such that the NSP yaw moment error Mnsp_err, which indicates the difference between the NSP yaw moment detected value Mnsp_sens and the NSP yaw moment estimated value Mnsp_estm, is converged to zero in the case where the updating cancellation condition does not apply.

This arrangement makes it possible to determine the value of μ_estm while restraining the error of the estimated value of the state amount of a side slip motion of the vehicle 1, such as the vehicle center of gravity side slip velocity estimated value Vgy_estm, or restraining a change in the actual road surface bank angle θ_act from influencing the road surface frictional coefficient estimated value μ_estm. Thus, highly reliable μ_estm can be stably determined.

In the case where the updating cancellation condition does not apply, the road surface frictional coefficient estimated value μ_estm is determined such that estm is proportional to the product of the NSP yaw moment error Mnsp_err and the μ sensitivity p calculated by linearly coupling γ_sens and δf_sens indicated by the aforesaid expression 5-7. Consequently, the frictional coefficient operation gain Gmu is set such that the magnitude of Gmu decreases as the magnitude of the μ sensitivity p decreases.

This arrangement makes it possible to prevent the road surface frictional coefficient estimated value μ_estm from being excessively updated in a situation wherein the value of the μ sensitivity p is zero or close to zero, i.e., in a situation wherein the Mnsp_err is likely to include relatively many unwanted components that do not depend on an error of the road surface frictional coefficient estimated value μ_estm.

Thus, the robustness of the estimation of the road surface frictional coefficient μ can be enhanced, and the Mns_err can be reflected in updating the road surface frictional coefficient estimated value μ_estm according to the degree of dependence of Mnsp_err on the error of the road surface frictional coefficient estimated value μ_estm. As a result, the estimation accuracy of the road surface frictional coefficient μ can be enhanced and the robustness of the estimation processing can be enhanced.

Further, in a situation wherein the NSP yaw moment detected value Mnsp_sens and the NSP yaw moment estimated value Mnsp_estm carry polarities that are opposite from each other, the determination result in S122-5-1 becomes negative (the updating cancellation condition applies), so that the value of the gain adjustment parameter Kmu_att is set to zero. Consequently, the Δμ is forcibly set to zero.

Accordingly, the updating of the road surface frictional coefficient estimated value μ_estm based on Mnsp_err is cancelled and μ_estm is maintained at a value immediately before the determination result in S122-5-1 turns to be negative.

This arrangement makes it possible to prevent the road surface frictional coefficient estimated value μ_estm from diverging in the situation wherein Mnsp_sens and Mnsp_estm have opposite polarities.

Supplementally, in the case where the predetermined values Mm and Ms in the determination processing in S122-5-1 are set to positive values, if the Mnsp_sens or Mnsp_estm takes a value in a range in the vicinity of zero, as described above, then the determination result in S122-5-1 will be negative, so that the value of Δμ will be forcibly set to zero.

Thus, it is possible to cancel the updating of μ_estm based on Mnsp_err in the case where Mnsp_estm and Mnsp_sens have opposite polarities and also in the case where the error of Mnsp_sens or Mnsp_estm is likely to be relatively large, as compared with the magnitude of the actual NSP yaw moment Mnsp_act.

In the present embodiment, the value of the gain adjustment parameter Kmu_att has been determined on the basis of the determination result in S122-5-1. Alternatively, however, the value of Δμ may be determined according to the aforesaid expression 7-2 without using Kmu_att in the case where the determination result in S122-5-1 is affirmative, or the value of Δμ may be set to zero in the case where the determination result is negative.

Second Embodiment

A second embodiment of the present invention will now be described with reference to FIG. 14 and FIG. 15. The present embodiment differs from the aforesaid first embodiment only in the method for setting the gain adjustment parameter Kmu_att in a frictional coefficient increasing/decreasing manipulated variable determiner 26e.

In the first embodiment described above, Kmu_att has always been set to 1 in the case where the determination result in S122-5-1 is affirmative, i.e., the updating cancellation condition does not apply. In contrast thereto, according to the present embodiment, Kmu_att is set such that Kmu_att changes within a range from 0 to 1 according to Mnsp_estm and Mnsp_sens as illustrated in, for example, FIG. 14 in the case where the determination result in S122-5-1 is affirmative.

Figure 14:
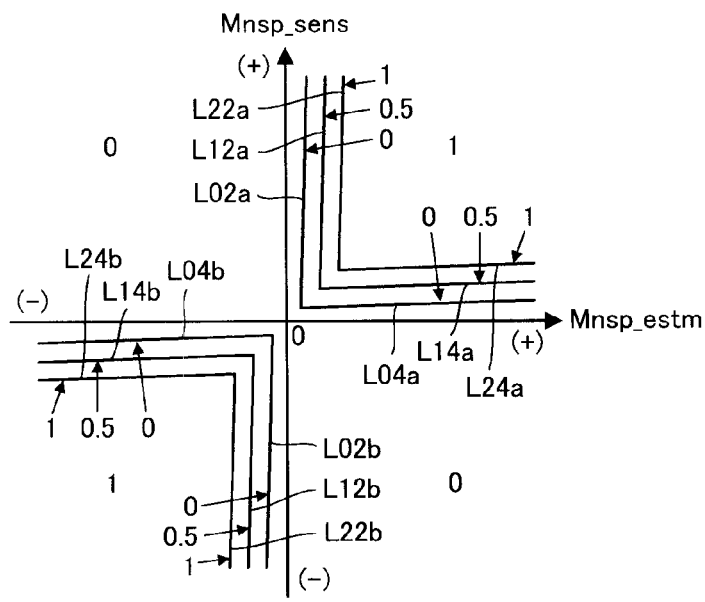
FIG. 14 is a diagram for explaining the processing for determining a frictional coefficient increasing/decreasing manipulated variable Δμ in a second embodiment.

FIG. 14 visually illustrates the set values of Kmu_att corresponding to pairs of the values of Mnsp_estm and the values of Mnsp_sens on a coordinate plane, Mnsp_estm being on the axis of abscissas and Mnsp_sens being on the axis of ordinates. In the diagram, the numeral values 0 (excluding 0 at the intersection (the point of origin) of the axis of ordinates and the axis of abscissas, 0.5, and 1 indicate the representative examples of set values of Kmu_att.

In the example given in FIG. 14, Kmu_att is always set to zero in the case where the point of the pair of the value of Mnsp_estm and the value of Mnsp_sens (Mnsp_estm, Mnsp_sens lies in a second quadrant (the range wherein Mnsp_estm<0 and Mnsp_sens>0) or a fourth quadrant (Mnsp_estm>0 and Mnsp_sens<0), i.e., Mnsp_estm and Mnsp_sens have polarities opposite from each other.

Further, if a point (Mnsp_estm, Mnsp_sens) falls in a first quadrant (the range wherein Mnsp_estm>0 and Mnsp_sens>0), Kmu_att is set to 0, 0.5, or 1, respectively, when the point (Mnsp_estm, Mnsp_sens) lies on a half line L02a or L04a, a half line L12a or L14a, or a half line L22a or L24a, respectively.

Further, Kmu_att is always set to 0 in the range between the half lines L02a, L04a and the axis of ordinates and the axis of abscissas in the first quadrant.

Further, Kmu_att is always set to 1 in the range above the half line L24a, in which Mnsp_sens is larger, and on the right to the half line L22a, in which Mnsp_estm is larger in the first quadrant.

In the range between the half lines L02a and L22a, if the value of Mnsp_sens is fixed, then Kmu_att is set such that Kmu_att continuously changes between 0 and 1 according to Mnsp_estm.

Similarly, in the range between the half lines L04a and L24a, if the value of Mnsp_estm is fixed, then Kmu_att is set such that Kmu_att continuously changes between 0 and 1 according to Mnsp_sens.

Further, if a point (Mnsp_estm, Mnsp_sens) falls in a third quadrant (a range wherein Mnsp_estm<0 and Mnsp_sens<0), then Kmu_att is set to be origin-symmetrical to Kmu_att set in the first quadrant.

More specifically, Kmu_att is set such that, if Kmu_att is defined as a function of Mnsp_estm and Mnsp_sens and represented as Kmu_att=f_kmuatt(Mnsp_estm, Mnsp_sens), then Kmu_att in the third quadrant will be Kmu_att=f_kmuatt (−Mnsp_estm, −Mnsp_sens). In this case, the half lines L02b, L12b, L22b, L04b, L14b, and L24b in the third quadrant of FIG. 14 correspond to the half lines L02a, L12a, L22a, L04a, L14a, and L24a, respectively, in the first quadrant.

Figure 15:
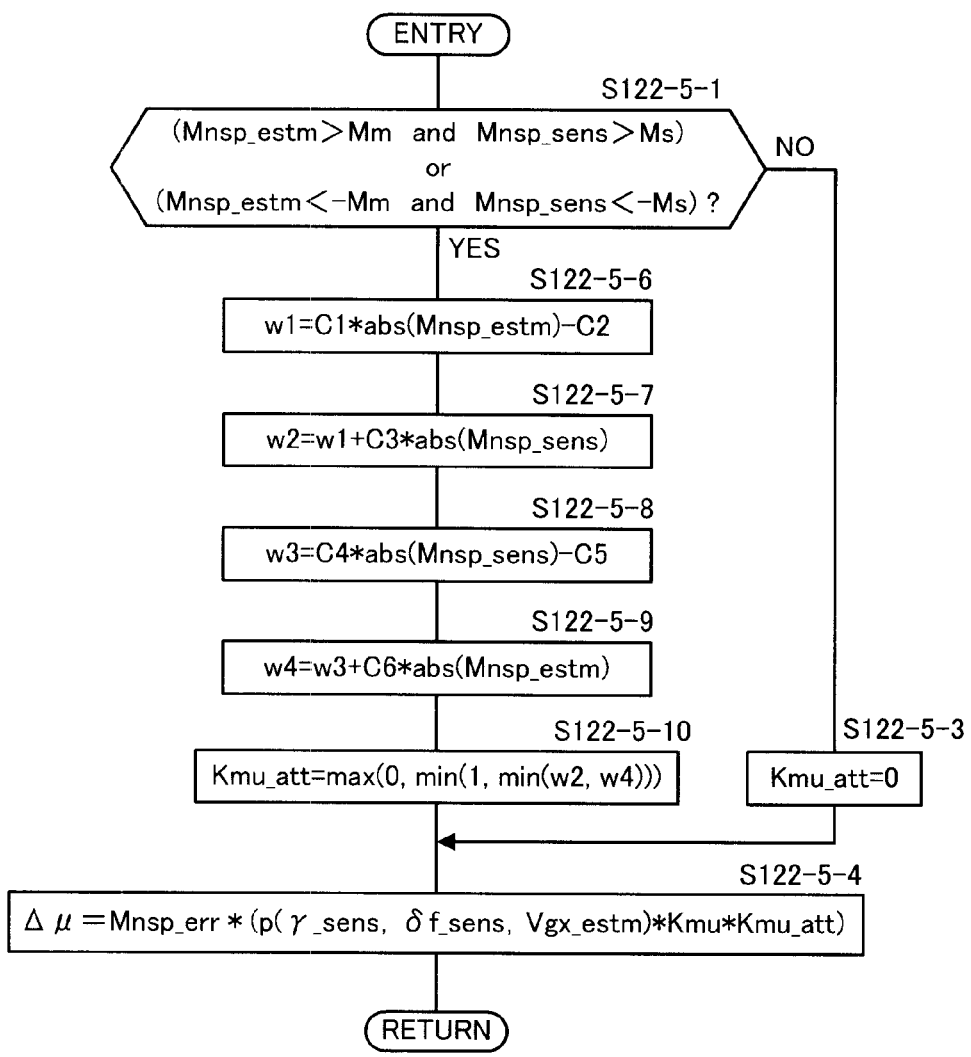
FIG. 15 is a flowchart illustrating the processing for determining the frictional coefficient increasing/decreasing manipulated variable Δμ in the second embodiment.

The frictional coefficient increasing/decreasing manipulated variable determiner 26e in the present embodiment carries out the processing illustrated by, for example, the flowchart of FIG. 15 thereby to determine the road surface frictional coefficient increasing/decreasing manipulated variable Δμ while setting Kmu_att as described above. In FIG. 15, for the same processing as the processing illustrated by the flowchart of FIG. 13 in the first embodiment, the same reference characters as those in FIG. 13 are used.

The frictional coefficient increasing/decreasing manipulated variable determiner 26e first carries out the same determination processing in S122-5-1 as that in the first embodiment. If the determination result in S122-5-1 is positive (i.e., if the updating cancellation condition does not apply), then the frictional coefficient increasing/decreasing manipulated variable determiner 26e carries out the processing of S122-5-6 to S122-5-10 so as to set the value of the gain adjustment parameter Kmu_att. If the determination result is negative (i.e., if the updating cancellation condition applies), then the frictional coefficient increasing/decreasing manipulated variable determiner 26e sets the value of the gain adjustment parameter Kmu_att to 0 in S122-5-3.

In the aforesaid processing from S122-5-6 to S122-5-10, the frictional coefficient increasing/decreasing manipulated variable determiner 26e first determines in S122-5-6 the value of a parameter w1 by the expression shown in the flowchart on the basis of the absolute value of Mnsp_estm (a b s(Mnsp_estm)).

The parameter w1 defines the form of changes in Kmu_att based on the absolute value of Mnsp_estm when the value of Mnsp_sens is fixed. In this case, in the example of setting Kmu_att in the present embodiment as illustrated in FIG. 14, C1 and C2 in the expression of S122-5-6 are set to predetermined positive values beforehand.

Subsequently, in S122-5-7, the frictional coefficient increasing/decreasing manipulated variable determiner 26e determines the value of a parameter w2 as a first candidate value of Kmu_att by the expression given in the flowchart on the basis of the value of w1 and the absolute value Mnsp_sens (a b s(Mnsp_sens)).

In this case, in the example for setting Kmu_att in the present embodiment as illustrated in FIG. 14, C3 in the expression of S122-5-7 is set to a predetermined negative value beforehand. The relationship between Mnsp_estm and Mnsp_sens when the value of w2 is set to 0 or 0.5 or 1 in the expression of S122-5-7 will be the relationship between Mnsp_estm and Mnsp_sens on the half lines L02a, L02b or the half lines L12a, L12b, or the half lines L22a, L22b in FIG. 14.

Subsequently, the frictional coefficient increasing/decreasing manipulated variable determiner 26e determines in S122-5-8 the value of a parameter w3 by the expression shown in the flowchart on the basis of the absolute value of Mnsp_sens (a b s (Mnsp_sens)). The parameter w3 defines the form of changes in Kmu_att based on the absolute value of Mnsp_sens when the value of Mnsp_estm is fixed. In this case, in the example of setting Kmu_att in the present embodiment as illustrated in FIGS. 14, C4 and C5 in the expression of S122-5-8 are set to predetermined positive values beforehand.

Subsequently, in S122-5-9, the frictional coefficient increasing/decreasing manipulated variable determiner 26e determines the value of a parameter w4 as a second candidate value of Kmu_att by the expression given in the flowchart on the basis of the value of w3 and the absolute value of Mnsp_estm (a b s(Mnsp_estm)). In this case, in the example for setting Kmu_att in the present embodiment as illustrated in FIG. 14, C6 in the expression of S122-5-9 is set to a predetermined negative value beforehand.

The relationship between Mnsp_estm and Mnsp_sens when the value of w4 is set to 0 or 0.5 or 1 in the expression of S122-5-9 will be the relationship between Mnsp_estm and Mnsp_sens on the half lines L04a, L04b or the half lines L14a, L14b, or the half lines L24a, L24b.

Subsequently, the frictional coefficient increasing/decreasing manipulated variable determiner 26e determines Kmu_att in S122-5-10 by the expression in the flowchart.

The value of Kmu_att in the first quadrant and the third quadrant of the coordinate plane shown in FIG. 14 will be set as illustrated in the diagram by carrying out the processing in S122-5-6 to S122-5-10 as described above.

In the present embodiment, the processing in S122-5-1, S122-5-3, and S122-5-6 to S122-5-10 described above is the processing carried out by the gain adjuster in FIG. 11.

The present embodiment is the same as the first embodiment except for the aspects described above. According to the present embodiment, as described above, in the case where the road surface frictional coefficient estimated value μ_estm is updated according to Mnsp_err by setting the value of Kmu_att (i.e., in the case where the updating cancellation condition does not apply), if the Mnsp_sens or Mnsp_estm is relatively close to zero, then the magnitude of the frictional coefficient operation gain Gmu decreases as the Mnsp_sens or Mnsp_estm approaches to zero. As a result, the absolute value of the updating amount of the road surface frictional coefficient estimated value μ_estm, i.e., the frictional coefficient increasing/decreasing manipulated variable Δμ, is restrained to be small.

This arrangement makes it possible to restrain improper updating of the road surface frictional coefficient estimated value μ_estm as Mnsp_sens or Mnsp_estm approaches zero, causing the error of Mnsp_sens or Mnsp_estm to easily become relatively large with respect to the magnitude of the actual NSP yaw moment Mnsp_act.

Third Embodiment

A third embodiment of the present invention will now be described with reference to FIG. 16. The present embodiment differs from the aforesaid second embodiment only in the method for setting the gain adjustment parameter Kmu_att in the frictional coefficient increasing/decreasing manipulated variable determiner 26e.

More specifically, the present embodiment considers not only the polarities of an NSP yaw moment estimated value Mnsp_estm and an NSP yaw moment detected value Mnsp_sens but also the polarity of a μ sensitivity p (γ_sens, δf_sens, Vgx_estm). Further, if a predetermined updating cancellation condition including at least a condition related to the polarities applied, then updating of the road surface frictional coefficient estimated value μ_estm according to a yaw moment estimation error Mnsp_err is cancelled.

Here, as is obvious from the aforesaid expression 4-13b, the μ sensitivity p indicative of the ratio of an increment of an actual NSP yaw moment Mnsp_act in response to an increment of an actual road surface frictional coefficient μ_act should have the same polarity as that of the actual NSP yaw moment Mnsp_act.

Hence, in the present embodiment, if the polarity of any one of Mnsp_estm, Mnsp_sens, and p is different from those of the remaining two polarities, then it is decided that the updating cancellation condition applies, and the updating of μ_estm according to Mnsp_err is cancelled.

Figure 16:
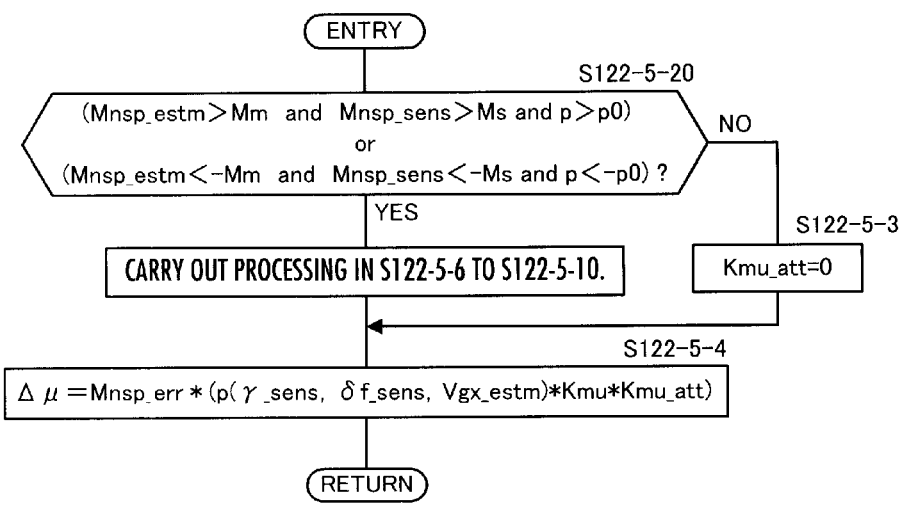
FIG. 16 is a flowchart illustrating the processing for determining the frictional coefficient increasing/decreasing manipulated variable Δμ in a third embodiment.

To be more specific, according to the present embodiment, a frictional coefficient increasing/decreasing manipulated variable determiner 26e carries out the processing illustrated by the flowchart of FIG. 16 so as to determine a frictional coefficient increasing/decreasing manipulated variable Δμ. In FIG. 16, the same processing steps as those in the flowchart of FIG. 15 in the second embodiment are assigned the same reference characters as those in FIG. 15.

According to the processing illustrated by the flowchart of FIG. 16, the determination processing in S122-5-20 is carried out in place of the determination processing in S122-5-1 of FIG. 15 in the second embodiment. The rest of the processing is the same as that of the second embodiment.

In this case, the frictional coefficient increasing/decreasing manipulated variable determiner 26e determines in the determination processing in S122-5-20 whether a condition that Mnsp_estm>Mm and Mnsp_sens>Ms and p>p0 or a condition that Mnsp_estm<−Mm and Mnsp_sens<−Ms and p<−p0 applies. Here, the Mm, Ms and p0 denote non-negative predetermined values (zero or positive values in the vicinity of zero), which are set beforehand.

In the present embodiment, if the determination result in S122-5-20 is negative, then it means that the updating cancellation condition applies. In this case, if the predetermined values of Mm, Ms and p0 have been set to zero, then a negative determination result in S122-5-20 (i.e., the updating cancellation condition applies) is equivalent to the polarity of one of Mnsp_estm, Mnsp_sens and p being different from the polarities of the remaining two.

Meanwhile, if the predetermined values Mm, Ms and p0 have been set to positive values, then the determination result in S122-5-20 will be negative (the updating cancellation condition applies) not only in the case where the polarity of one of Mnsp_estm, Mnsp_sens, and p is different from the polarities of the remaining two but also in the case where −Mm≤Mnsp_estm≤Mm or −Ms≤Mnsp_sens≤Ms or −p0≤p≤p0 holds (in other words, in the case where one of Mnsp_estm, Mnsp_sens and p takes a value in a range in the vicinity of zero).

In this case, therefore, the updating cancellation condition includes a condition that p has a polarity opposite from at least one of Mnsp_estm and Mnsp_sens and a condition that one of Mnsp_estm, Mnsp_sens and p takes a value within a predetermined range in the vicinity of zero, in addition to the condition that Mnsp_estm and Mnsp_sens have polarities opposite from each other.

In the present embodiment, the function of the updating cancellation condition determiner in the present invention is implemented by the determination processing in the aforesaid S122-5-20. The same applies to a fourth to the eighth embodiments, which will be discussed hereinafter.

The present embodiment is the same as the second embodiment except for the aspects described above.

In the present embodiment, the processing in S122-5-20, S122-5-3, and S122-5-6 to S122-5-14 is the processing carried out by the gain adjustor in FIG. 11. In this case, the polarity of the μ sensitivity p is taken into account, so that the μ sensitivity p is input to the gain adjustor, as indicated by the dashed-line arrow in the figure.

In the present embodiment, updating the μ_estm on the basis of Mnsp_err is cancelled in the case where the polarity of one of Mnsp_estm, Mnsp_sens and p is different from the polarities of the remaining two. This makes it possible to further securely prevent μ_estm from diverting.

Further, in the case where the predetermined values Mm, Ms and p0 have been set to positive values, if Mnsp_sens or Mnsp_estm or p takes a value within a range in the vicinity of zero, then the determination result in S122-5-20 becomes negative. This causes the value of Δμ to be forcibly set to zero. Thus, updating the μ_estm on the basis of Mnsp_err can be cancelled also in the case where the error of Mnsp_sens or Mnsp_estm or p is apt to become relatively large, as compared with the magnitude of the actual NSP yaw moment Mnsp_act.

Fourth Embodiment

A fourth embodiment of the present invention will now be described with reference to FIG. 17. The present embodiment differs from the third embodiment described above only in the method for setting the gain adjustment parameter Kmu_att in a frictional coefficient increasing/decreasing manipulated variable determiner 26e.

In the aforesaid third embodiment, if the determination result in S122-5-20 is affirmative (in the case where the updating cancellation condition does not apply), then the road surface frictional coefficient estimated value μ_estm has always been updated according to an NSP yaw moment error Mnsp_err.

In contrast thereto, according to the present embodiment, if the determination result in S122-5-20 is negative (in the case where the updating cancellation condition applies), then thereafter, μ_estm is updated according to Mnsp_err only if the determination result in S122-5-20 remains to be affirmative (the updating cancellation condition does not apply) continuously for a predetermined period of time or more.

In other words, according to the present embodiment, once the updating cancellation condition has been applied, then a state wherein the updating cancellation condition does not apply is required to last for the predetermined period of time or more before the μ_estm is allowed to be updated on the basis of Mnsp_err.

Figure 17:
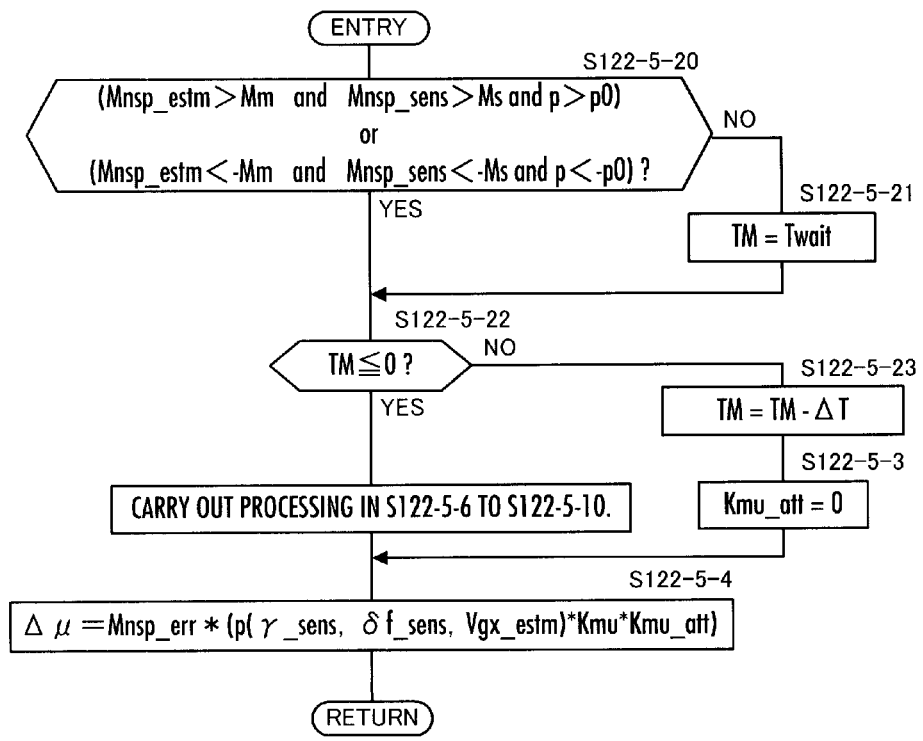
FIG. 17 is a flowchart illustrating the processing for determining the frictional coefficient increasing/decreasing manipulated variable Δμ in a fourth embodiment.

To be more specific, in the present embodiment, a frictional coefficient increasing/decreasing manipulated variable determiner 26e carries out the processing illustrated in the flowchart of FIG. 17 to determine the frictional coefficient increasing/decreasing manipulated variable $\Delta\mu$. In FIG. 17, the same processing steps as those illustrated by the flowchart of FIG. 16 in the third embodiment are assigned the same reference characters as those in FIG. 16.

The frictional coefficient increasing/decreasing manipulated variable determiner 26e first carries out in S122-5-20 the same determination processing (processing for determining whether an updating cancellation condition applies) as that in the third embodiment.

If the determination result of S122-5-20 is negative (if the updating cancellation condition applies), then the frictional coefficient increasing/decreasing manipulated variable determiner 26e sets, in S122-5-21, the value on a countdown timer TM to an initial value Twait determined in advance and then carries out the determination processing in S122-5-22.

If the determination result of S122-5-20 is affirmative (if the updating cancellation condition does not apply), then the frictional coefficient increasing/decreasing manipulated variable determiner 26e directly carries out the determination processing in S122-5-22.

In the aforesaid determination processing in S122-5-22, the frictional coefficient increasing/decreasing manipulated variable determiner 26e determines whether the current value on the countdown timer TM is zero or less (whether the counting of time equivalent to the aforesaid initial value Twait has been completed).

If the determination result of S122-5-22 is affirmative, then the frictional coefficient increasing/decreasing manipulated variable determiner 26e carries out the processing of S122-5-6 to S122-5-14 described in the second embodiment, thereby setting the value of a gain adjustment parameter Kmu_att.

Meanwhile, if the determination result of S122-5-22 is negative, then the frictional coefficient increasing/decreasing manipulated variable determiner 26e decrements in S122-5-23 the value on the countdown timer TM by the time equivalent to an arithmetic processing cycle $\Delta T$.

Further, the frictional coefficient increasing/decreasing manipulated variable determiner 26e sets the value of the gain adjustment parameter Kmu_att to zero in S122-5-24.

Subsequently, the frictional coefficient increasing/decreasing manipulated variable determiner 26e carries out in S122-5-4 the same processing as that in the second embodiment so as to determine the frictional coefficient increasing/decreasing manipulated variable $\Delta\mu$.

According to the processing described above, once the determination result in S122-5-20 turns to be negative (once the updating cancellation condition applies), then the value of the gain adjustment parameter Kmu_att is set to zero even if the determination result in S122-5-20 is affirmative until the state wherein the determination result in S122-5-20 is affirmative (the state wherein the updating cancellation condition does not apply) continues for not less than predetermined time specified by the initial value Twait of the countdown timer TM. Thus, the state wherein the updating of $\mu$_estm according to Mnsp_err is cancelled is maintained.

Then, updating $\mu$_estm on the basis of Mnsp_err is resumed in the case where the state in which the determination result in S122-5-20 is affirmative (the state wherein the updating cancellation condition does not apply) continues for not less than the predetermined time specified by the initial value Twait of the countdown timer TM.

The present embodiment is the same as the aforesaid third embodiment except for the aspects described above. According to the present embodiment, if the state wherein the updating cancellation condition applies is changed over to the state wherein the updating cancellation condition does not apply, then updating $\mu$_estm according Mnsp_err is prohibited during a period immediately following the changeover (a period equivalent to the time of the initial value Twait). This arrangement makes it possible to prevent the road surface frictional coefficient estimated value $\mu$_estm from being updated to an improper value if the state wherein the updating cancellation condition does not temporarily apply is accidentally set due to an influence of a disturbance or the like.

In the third embodiment and the fourth embodiment described above, in the case where the determination result in S122-5-20 is affirmative (in the case where the updating cancellation condition does not apply), the gain adjustment parameter Kmu_att has been determined by the processing in S122-5-6 to S122-5-14 in the second embodiment. Alternatively, however, the value of Kmu_att may be set to 1 as with the first embodiment in the case where the determination result in S122-5-20 is affirmative (in the case where the updating cancellation condition does not apply).

Further, the updating cancellation condition in the fourth embodiment is the same as that in the third embodiment. Alternatively, however, the fourth embodiment may use the same updating cancellation condition as that in the first embodiment and the second embodiment. In other words, in the fourth embodiment, the determination processing in S122-5-1 may be carried out instead of the determination processing in S122-5-20.

In the first to the fourth embodiments, in the case where the updating cancellation condition applies (in the case where the determination result in S122-5-1 or S122-5-20 is negative), the frictional coefficient increasing/decreasing manipulated variable $\Delta\mu$ may be set to zero without using the value of the gain adjustment parameter Kmu_att. Alternatively, the value of $\Delta\mu$ may be set to a predetermined positive value, which has been decided beforehand, in place of setting the frictional coefficient increasing/decreasing manipulated variable 4 to zero, and the road surface frictional coefficient estimated value $\mu$_estm may be gradually increased at a certain temporal incremental rate in the state wherein the updating cancellation condition applies.

Fifth Embodiment

Figure 18:
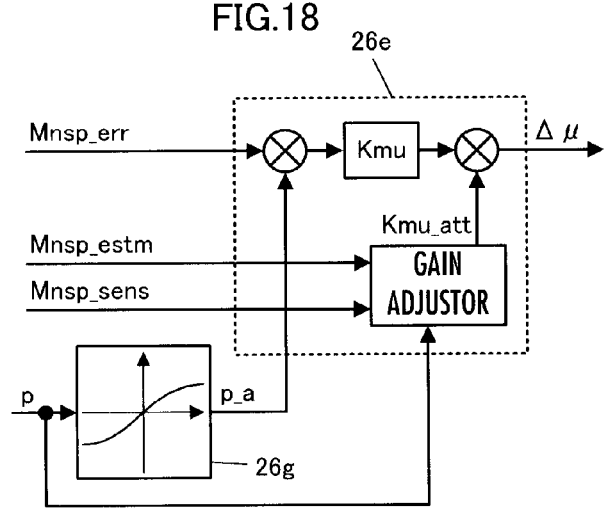
FIG. 18 is a block diagram illustrating a major section of the processing for determining the frictional coefficient increasing/decreasing manipulated variable in a fifth embodiment.

Referring now to FIG. 18, a fifth embodiment of the present invention will be described. The present embodiment differs from the third embodiment or the fourth embodiment only partly in the processing carried out by a $\mu$ estimator 26.

To be more specific, in the present embodiment, the $\mu$ estimator 26 has a saturation characteristic element 26g to which a $\mu$ sensitivity p ($\gamma$_sens, $\delta f$_sens, Vgx_estm) calculated by the aforesaid $\mu$ sensitivity calculator 26d is supplied. The saturation characteristic element 26g generates an output (a function value of the $\mu$ sensitivity p) having a saturation characteristic relative to the $\mu$ sensitivity p that is input. Hereinafter, the output will be referred to as a $\mu$-sensitivity-dependent value p_a.

In this case, a relationship between the $\mu$ sensitivity p and the $\mu$-sensitivity-dependent value p_a is set beforehand in the form of map data or an arithmetic expression.

More specifically, the relationship between the $\mu$ sensitivity p and the $\mu$-sensitivity-dependent value p_a is set such that if p is zero, then p_a is also zero and p_a monotonically increases as p increases and the magnitude of the change rate with respect to an increase in p (a value obtained by differentiating p_a by p) decreases (the value of p_a gradually saturates) as the absolute value of p increases.

A frictional coefficient increasing/decreasing manipulated variable determiner 26e of the μ estimator 26 in the present embodiment uses the μ-sensitivity-dependent value p_a instead of the μ sensitivity p to calculate the right side of the aforesaid expression 7-2 so as to determine a frictional coefficient increasing/decreasing manipulated variable Δμ in the processing in the aforesaid S122-5-4. In other words, Δμ is determined by the calculation of expression 7-2a given below.

$$\Delta\mu = \text{Mnsp\_err} * Gmu$$
$$= \text{Mnsp\_err} * (p\_a * Kmu * \text{Kmu\_att})$$

Expression 7-2a

The present embodiment is the same as the third embodiment or the fourth embodiment except for the aspects described above. Thus, according to the present embodiment, in the case where the frictional coefficient increasing/decreasing manipulated variable Δμ is determined on the basis of Mnsp_err (in the case where the determination result in S122-5-20 is affirmative or the determination results in S122-5-20 and S122-5-22 are affirmative), the value of Δμ is determined such that Δμ is proportional to the product of Mnsp_err and the μ-sensitivity-dependent value p_a.

In the determination processing of S122-5-20, namely, the processing for determining whether the updating cancellation condition applies, the μ-sensitivity-dependent value p_a may be used instead of the μ sensitivity p to carry out the determination processing.

In determining the frictional coefficient increasing/decreasing manipulated variable Δμ on the basis of Mnsp_err, the present embodiment restrains the magnitude of a frictional coefficient operation gain Gmu (feedback gain) from becoming excessively large when the absolute value of the μ sensitivity p is large. As a result, it is possible to prevent a road surface frictional coefficient estimated value μ_estm calculated by the μ estimator 26 from unstably fluctuating or vibrating.

Supplementally, determining the frictional coefficient increasing/decreasing manipulated variable Δμ by using the μ-sensitivity-dependent value p_a as in the present embodiment can be applied also to the first embodiment or the second embodiment described above. In this case, the processing in S122-5-4 (the processing for calculating Δμ in the case where the updating cancellation condition does not apply) in the first embodiment or the second embodiment may carry out the computation of the aforesaid expression 7-2a to determine the frictional coefficient increasing/decreasing manipulated variable Δμ.

Sixth Embodiment

Figure 19:
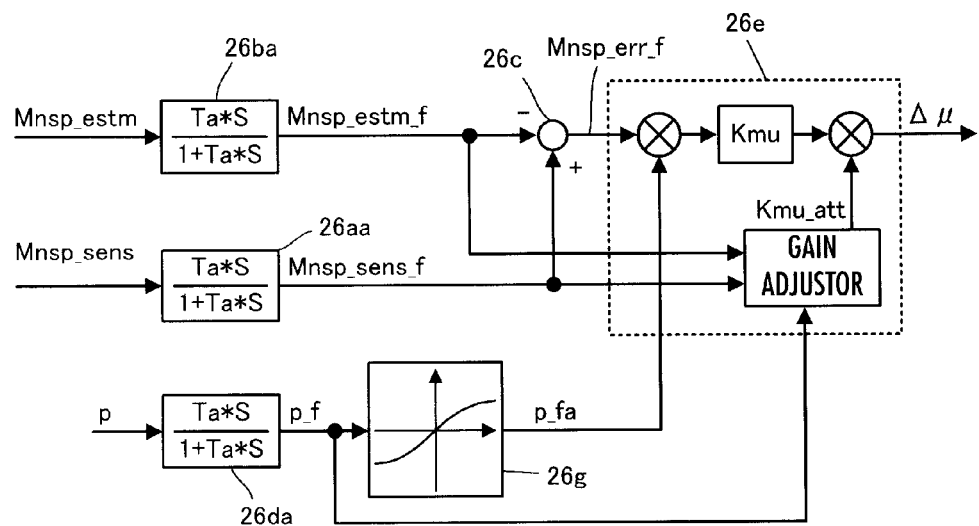
FIG. 19 is a block diagram illustrating a major section of the processing for determining the frictional coefficient increasing/decreasing manipulated variable Δμ in a sixth embodiment.

A sixth embodiment of the present invention will now be described with reference to FIG. 19. The present embodiment differs from the third or the fourth embodiment only partly in the processing carried out by a μ estimator 26.

To be more specific, according to the present embodiment, the μ estimator 26 has frequency component regulating filters 26ba, 26aa, and 26da which receive the NSP yaw moment estimated value Mnsp_estm calculated by the aforesaid Mnsp_estm calculator 26b, the NSP yaw moment dv Mnsp_sens calculated by the aforesaid Mnsp_sens calculator 26a, and the μ sensitivity p (γ_sens, δf_sens, Vgx_estm) calculated by the aforesaid η sensitivity calculator 26d, respectively, and the saturation characteristic element 26g described in the fifth embodiment described above.

In this example, all the filters 26ba, 26aa, and 26da have a low-cut characteristic, which cuts off low-frequency components of a predetermined frequency or lower. More specifically, the transfer functions of the filters 26ba, 26aa, and 26da are represented by, for example, Ta*S/(1+Ta*S). In other words, the frequency characteristics of the filters 26ba, 26aa, and 26da are set to share the same target characteristic, namely, a low-cut characteristic (set to share the same transfer function time constant Ta).

If a phase disagreement between Mnsp_err and p or a phase disagreement between Mnsp_sens and Mnsp_estm takes place in a state wherein μ_estm and μ_act are in accurate agreement due to, for example, different frequency characteristics or the like of the sensors used to generate input values of the filters 26ba, 26aa, and 26da, then the frequency characteristics of the filters 26ba, 26aa, and 26da may be shifted from each other to resolve the phase disagreement.

Further, according to the present embodiment, the μ estimator 26 calculates, by an Mnsp_err calculator 26c, an NSP yaw moment filtering estimation error Mnsp_err_f (=Mnsp_sens_f−Mnsp_estm_f) in place of the difference between Mnsp_sens and Mnsp_estm (the NSP yaw moment estimation error). The NSP yaw moment filtering estimation error Mnsp_err_f is the difference between an NSP yaw moment filtering detected value Mnsp_sens_f, which is an output of the filter 26aa to which Mnsp_sens is input, and an NSP yaw moment filtering estimated value Mnsp_estm_f, which is an output of the filter 26ba to which Mnsp_estm is input.

In the present embodiment, the frequency characteristics of the filters 26aa and 26ba are the same, so that determining the difference Mnsp_err_f between Mnsp_sens_f and Mnsp_estm_f as described above is equivalent to determining Mnsp_err_f by passing the NSP yaw moment error Mnsp_err, which is the difference between Mnsp_sens and Mnsp_estm, through a filter having the same frequency characteristics of the filters 26aa and 26ba.

Therefore, a filter which receives Mnsp_err and which has the same frequency characteristic as those of the filters 26aa and 26ba may be provided so as to obtain Mnsp_err_f by passing Mnsp_err through the filter.

The μ estimator 26 determines a μ-sensitivity-dependent value p_fa as the function value of p_f by inputting the μ sensitivity filtering value p_f, which is an output of the filter 26da receiving the μ sensitivity p, in place of the μ sensitivity p to the aforesaid saturation characteristic element 26g. In this case, the relationship between p_f and p_fa is the same as the relationship between an input (p) and an output (p_a) of the saturation characteristic element 26g described in the aforesaid fifth embodiment.

Alternatively, the μ-sensitivity-dependent value p_fa may be determined by supplying an output (p_a), which has been obtained by passing the μ sensitivity p through the saturation characteristic element 26g, to the filter 26da.

Subsequently, a frictional coefficient increasing/decreasing manipulated variable determiner 26e of the μ estimator 26 in the present embodiment uses Mnsp_sens_f, Mnsp_estm_f and p_f, which are the filtering values of Mnsp_sens, Mnsp_estm and p, respectively, in place of Mnsp_sens, Mnsp_estm and p to carry out the determination processing in S122-5-20, thereby determining whether the updating cancellation condition applies.

In this determination processing, instead of the μ sensitivity filtering value p_f, the μ-sensitivity-dependent value p_fa obtained by passing the μ sensitivity p through both the filter 26*da* and the saturation characteristic element 26*g* may be used.

Further, the frictional coefficient increasing/decreasing manipulated variable determiner 26*e* of the μ estimator 26 in the present embodiment uses the NSP yaw moment filtering estimation error Mnsp_err_f and the μ-sensitivity-dependent value p_fa in place of NSP yaw moment estimation error Mnsp_err and the μ sensitivity p, respectively, to calculate the right side of the aforesaid expression 7-2, thereby determining the frictional coefficient increasing/decreasing manipulated variable Δμ in the processing in S122-5-4. In other words, Δμ is determined according to expression 7-2b given below.

$$\Delta\mu = \text{Mnsp\_err\_f} * Gmu$$
$$= \text{Mnsp\_err\_f} * (\text{p\_fa} * Kmu * \text{Kmu\_att})$$

Expression 7-2b

The present embodiment is the same as the third or the fourth embodiment except for the aspects described above. Thus, according to the present embodiment, in the case of determining the frictional coefficient increasing/decreasing manipulated variable Δμ on the basis of Mnsp_err (in the case where the determination result in S122-5-20 is affirmative or the determination results in S122-5-20 and S122-5-22 are affirmative), the value of Δμ is determined on the basis of the NSP yaw moment filtering estimation error Mnsp_err_f and the μ sensitivity filtering value p_f (more specifically, such that the value of Δμ is proportional to the product of the Mnsp_err_f and the μ-sensitivity-dependent value p_fa).

In the present embodiment, the filters 26*ba*, 26*aa*, and 26*da* correspond to a first filter, a second filter, and a third filter, respectively, in the present invention. Further, the NSP yaw moment filtering estimated value Mnsp_estm_f corresponds to a first estimated filtering value in the present invention and the NSP yaw moment filtering detected value Mnsp_sens_f corresponds to a second estimated filtering value.

According to the present embodiment, determining the frictional coefficient increasing/decreasing manipulated variable Δμ by using the NSP yaw moment filtering estimation error Mnsp_err_f and the μ-sensitivity-dependent value p_fa obtained using the filters 26*ba*, 26*aa*, and 26*da* having the low-cut characteristics makes it possible to determine the road surface frictional coefficient estimated value μ_estm while removing unwanted components included in Mnsp_lens, Mnsp_estm, and p attributable to a steady offset or drift of an output of sensors, such as a yaw rate sensor 13 and a lateral acceleration sensor 15, or an actual road surface bank angle θbank_act. This permits higher accuracy of μ_estm.

Supplementally, determining the frictional coefficient increasing/decreasing manipulated variable Δμ by using the NSP yaw moment filtering estimation error Mnsp_err_f and the μ-sensitivity-dependent value p_fa as in the present embodiment can be applied also to the first or the second embodiment described above.

In this case, the processing in S122-5-4 (the processing for calculating Δμ in the case where the updating cancellation condition does not apply) in the first or the second embodiment described above may carry out the computation of the aforesaid expression 7-2b so as to determine the frictional coefficient increasing/decreasing manipulated variable Δμ.

Further, regarding the determination processing related to the updating cancellation condition, when carrying out the determination processing in S122-5-1, Mnsp_sens_f and Mnsp_estm_f may be used in place of Mnsp_sens and Mnsp_estm to perform the determination processing.

Further, in the present embodiment, the μ sensitivity p has been passed through both the filter 26*da* and the saturation characteristic element 26*g*. However, if the magnitude of the μ sensitivity p is not expected to increase much, then the saturation characteristic element 26*g* may be omitted. In this case, the processing in S122-5-4 may calculate the frictional coefficient increasing/decreasing manipulated variable Δμ according to an expression which has replaced p_fa of the right side of the aforesaid expression 7-2b by the μ sensitivity filtering value p_f.

Further alternatively, of the filters 26*ba*, 26*aa*, and 26*da*, the filters 26*ba* and 26*aa* related to the NSP yaw moment estimated value and detected value may be omitted, or the filter 26*da* related to the μ sensitivity p may be omitted.

Seventh Embodiment

Figure 20:
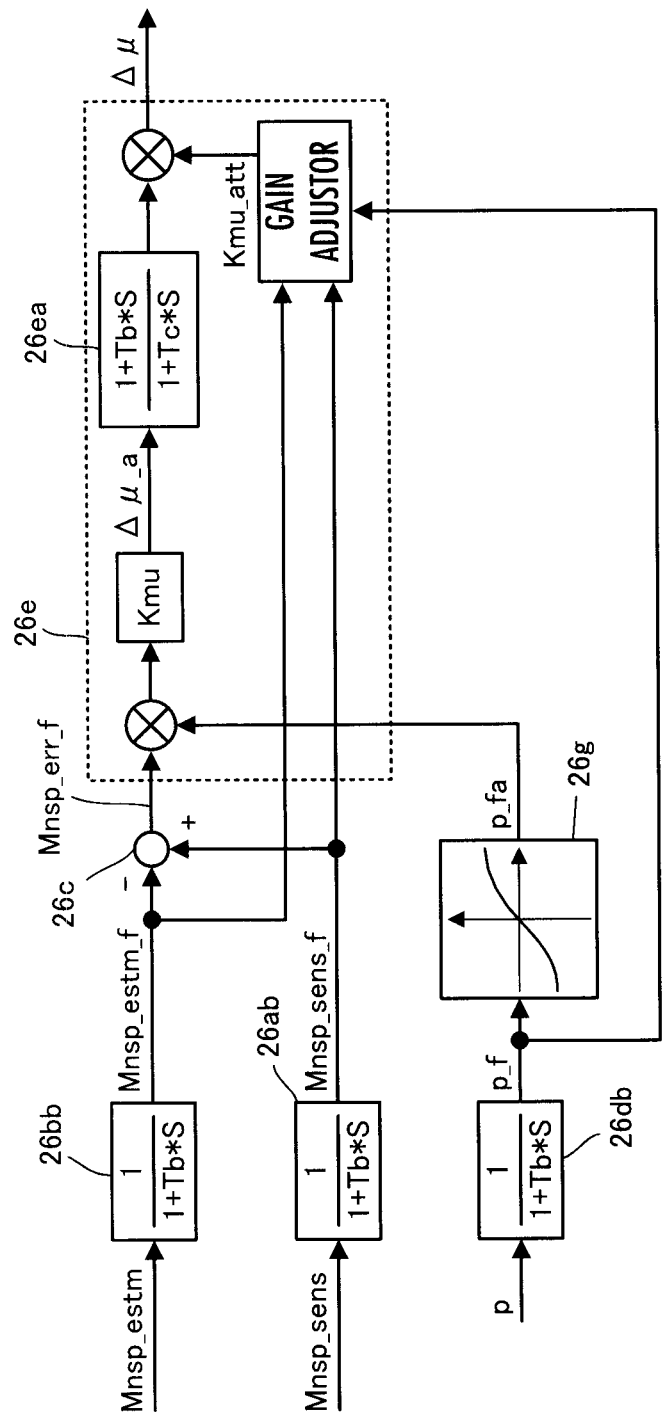
FIG. 20 is a block diagram illustrating a major section of the processing for determining the frictional coefficient increasing/decreasing manipulated variable Δμ in a seventh embodiment.

A seventh embodiment of the present invention will now be described with reference to FIG. 20. The present embodiment differs from the third or the fourth embodiment only partly in the processing carried out by the aforesaid μ estimator 26.

To be more specific, a μ estimator 26 in the present embodiment has filters 26*bb*, 26*ab*, and 26*db*, which have different frequency characteristics from those of the filters 26*ba*, 26*aa*, and 26*da* described in the aforesaid sixth embodiment. The NSP yaw moment estimated value Mnsp_estm calculated by the aforesaid Mnsp_estm calculator 26*b*, an NSP yaw moment detected value Mnsp_sens, the NSP yaw moment detected value Mnsp_sens calculated by the aforesaid Mnsp_sens calculator 26*a*, and a μ sensitivity p (γ_sens, δf_sens, Vgx_estm) calculated by the aforesaid μ sensitivity calculator 26*d* are input to the filters 26*bb*, 26*ab*, and 26*db*, respectively.

In this example, all the filters 26*bb*, 26*ab*, and 26*db* have a high-cut characteristic (characteristic that cuts off high-frequency components of a predetermined frequency or higher). More specifically, the transfer functions of the filters 26*bb*, 26*ab*, and 26*db* are represented by, for example, 1/(1+Tb*S).

In other words, the frequency characteristics of the filters 26*bb*, 26*ab*, and 26*db* are set to share the same target characteristic, namely, a high-cut characteristic (set to share the same transfer function time constant Tb). In other words, the frequency characteristics of the filters 26*bb*, 26*ab*, and 26*db* are low-pass characteristics.

If a phase disagreement between Mnsp_err and p or a phase disagreement between Mnsp_sens and Mnsp_estm takes place in a state wherein μ_estm and μ_act are in accurate agreement due to different frequency characteristics or the like of the sensors used to generate input values of the filters 26*bb*, 26*ab*, and 26*db*, then the frequency characteristics of the filters 26*bb*, 26*ab*, and 26*db* may be shifted from each other to resolve the phase disagreement. The frequency characteristics of the filters 26*bb*, 26*ab*, and 26*db* may be those of band-pass filters as long as they have the high-cut characteristics rather than being limited to the low-pass characteristics.

Further, according to the present embodiment, the μ estimator 26 calculates, by an Mnsp_err calculator 26*c*, an NSP yaw moment filtering estimation error Mnsp_err_f (=Mnsp_sens_f−Mnsp_estm_f) in place of the difference between Mnsp_sens and Mnsp_estm (the NSP yaw moment estimation error Mnsp_err). The NSP yaw moment filtering estimation error Mnsp_err_f is the difference between an NSP yaw moment filtering detected value Mnsp_sens_f, which is an output of the filter 26*ab* to which Mnsp_sens is input, and an NSP yaw moment filtering estimated value Mnsp_estm_f, which is an output of the filter 26bb to which Mnsp_estm is input.

As with the case described in the sixth embodiment, the NSP yaw moment estimation error Mnsp_err, which is the difference between Mnsp_sens and Mnsp_estm, may be passed through a filter having the same frequency characteristic (high-cut characteristic) as those of the filters 26ba and 26aa thereby to obtain Mnsp_err_f.

The µ estimator 26 in the present embodiment further has a saturation characteristic element 26g described in the aforesaid fifth embodiment. The µ estimator 26 passes the µ sensitivity filtering value p_f, which is an output of the filter 26db receiving the µ sensitivity p, in place of the µ sensitivity p through the saturation characteristic element 26g to determine the µ-sensitivity-dependent value p_fa as the function value of p_f, as with the sixth embodiment described above. An output (p_a) obtained by passing the µ sensitivity p through the saturation characteristic element 26g may be passed through the filter 26db to determine the µ-sensitivity-dependent value p_fa.

As with the sixth embodiment, in the aforesaid determination processing in S122-5-20, the frictional coefficient increasing/decreasing manipulated variable determiner 26e of the µ estimator 26 in the present embodiment uses Mnsp_sens_f, Mnsp_estm_f and p_f, which are the filtering values of Mnsp_sens, Mnsp_sens and p, to carry out the determination processing to determine whether the updating cancellation condition applies.

In the determination processing, the µ-sensitivity-dependent value p_fa obtained by passing the µ sensitivity p through both the filter 26da and the saturation characteristic element 26g may be used in place of the µ sensitivity filtering value p_f.

Further, the frictional coefficient increasing/decreasing manipulated variable determiner 26e of the µ estimator 26 in the present embodiment determines the frictional coefficient increasing/decreasing manipulated variable Δµ as described below by carrying out the processing in S122-5-4.

The frictional coefficient increasing/decreasing manipulated variable determiner 26e first multiplies the aforesaid NSP yaw moment filtering estimation error Mnsp_err_f by the µ-sensitivity-dependent value p_fa and the basic gain Kmu to determine a preliminary value µ_a of the frictional coefficient increasing/decreasing manipulated variable Δµ. More specifically, the value determined by an expression in which the value of Kmu_att of the right side of the aforesaid expression 7-2b is 1 is obtained as the preliminary value Δµ_a.

In the present embodiment, the filters 26bb, 26ab, and 26db have the high-cut characteristics, so that a phase delay in the NSP yaw moment filtering estimation error Mnsp_err_f or the µ-sensitivity-dependent value p_fa (or the µ sensitivity filtering value p_f) is apt to occur in a relatively high-frequency range, frequently causing a phase delay in the preliminary value Δµ_a determined as described above. For this reason, if the Δµ_a were used as it is to update the road surface frictional coefficient estimated value µ_estm, then the µ_estm would be likely to vibrate.

According to the present embodiment, therefore, the frictional coefficient increasing/decreasing manipulated variable determiner 26e is provided with a phase compensation element 26ea for advancing the phase of the preliminary value Δµ_a to correct a phase delay. The transfer function of the phase compensation element 26ea is represented by (1+Tb*s)/(1+Tc*S). The time constant Tb of the numerator is the same as the time constant Tb of the denominator of the transfer function representing the filters 26bb, 26ab, and 26db.

Then, the frictional coefficient increasing/decreasing manipulated variable determiner 26e in the present embodiment passes the preliminary value Δµ_a determined as described above through the phase compensation element 26ea and further multiplies the output of the phase compensation element 26ea by the gain adjustment parameter Kmu_att so as to determine a final frictional coefficient increasing/decreasing manipulated variable Δµ (a current value).

Thus, the value of Δµ is determined on the basis of the NSP yaw moment filtering estimation error Mnsp_err_f and the µ sensitivity filtering value p_f (more specifically, the product of Mnsp_err_f and the µ-sensitivity-dependent value p_fa).

Alternatively, the product of the NSP yaw moment filtering estimation error Mnsp_err_f and the µ-sensitivity-dependent value p_may be determined as the preliminary value Δµ_a, and then the output of the phase compensation element 26ea obtained by passing the preliminary value Δµ_a through the phase compensation element 26ea may be multiplied by the basic gain Kmu and the gain adjustment parameter Kmu_att, thereby determining the frictional coefficient increasing/decreasing manipulated variable Δµ (a current value).

Further alternatively, the result obtained by multiplying Mnsp_err_f by the µ-sensitivity-dependent value p_fa, the basic gain Kmu, and the gain adjustment parameter Kmu_att may be determined as the preliminary value Δµ_a, and the preliminary value Δµ_a may be passed through the phase compensation element 26ea so as to determine the frictional coefficient increasing/decreasing manipulated variable Δµ (a current value).

The present embodiment is the same as the third or the fourth embodiment except for the aspects described above.

In the present embodiment, the filters 26bb, 26ab, and 26db correspond to the first filter, the second filter, and the third filter, respectively, in the present invention. The NSP yaw moment filtering estimation value Mnsp_estm_f corresponds to a first estimated filtering value in the present invention, and the NSP yaw moment filtering detected value Mnsp_sens_f corresponds to a second estimated filtering value in the present invention.

In the present embodiment, the NSP yaw moment filtering estimation error Mnsp_err_f and the µ-sensitivity-dependent value p_fa obtained by using the filters 26bb, 26ab, and 26db having the high-cut characteristics are used to determine the frictional coefficient increasing/decreasing manipulated variable Δµ.

This arrangement makes it possible to determine the road surface frictional coefficient estimated value µ_estm, removing unwanted components included in Mnsp_sens, Mnsp_estm, and p due to high-frequency noises contained in the outputs of sensors, such as a yaw rate sensor 13 and a lateral acceleration sensor 15. As a result, the accuracy of µ_estm can be enhanced.

Furthermore, correcting the phase delay of Δµ by the phase compensation element 26ea prevents µ_estm determined by the µ estimator 26 from vibrating. This permits enhanced robustness of the processing for estimating the road surface frictional coefficient µ.

Supplementally, determining the frictional coefficient increasing/decreasing manipulated variable Δµ by using the NSP yaw moment filtering estimation error Mnsp_err_f and the µ-sensitivity-dependent value p_fa as in the present embodiment can be applied also to the first or the second embodiment described above.

In this case, the processing in S122-5-4 (the processing for calculating Δμ when the updating cancellation condition does not apply) may use the phase compensation element 26ea to determine the frictional coefficient increasing/decreasing manipulated variable Δμ as described above.

Further, when carrying out the determination processing in S122-5-1, Mnsp_sens_f and Mnsp_estm_f may be used in place of Mnsp_sens and Mnsp_estm to carry out the determination processing.

Further, in the present embodiment, the μ sensitivity p has been passed through both the filter 26db and the saturation characteristic element 26g. However, if the magnitude of the μ sensitivity p is not expected to increase much, then the saturation characteristic element 26g may be omitted.

Eighth Embodiment

Figure 21:
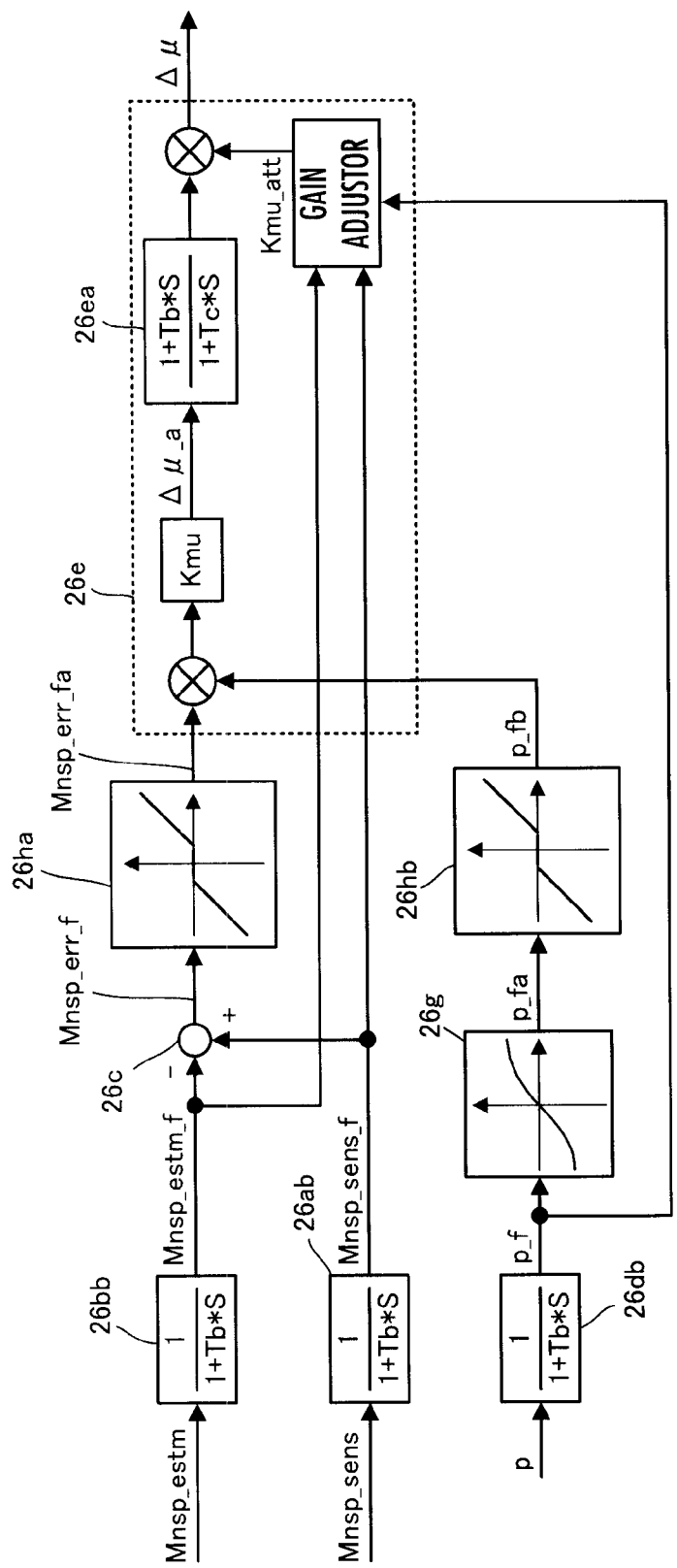
FIG. 21 is a block diagram illustrating a major section of the processing for determining the frictional coefficient increasing/decreasing manipulated variable Δμ in an eighth embodiment.

An eighth embodiment of the present invention will now be described with reference to FIG. 21. The present embodiment differs from the aforesaid seventh embodiment only partly in the processing carried out by the aforesaid μ estimator 26.

To be more specific, a μ estimator 26 in the present embodiment further includes a dead-zone processor 26ha which receives an NSP yaw moment filtering estimation error Mnsp_err_f calculated by the aforesaid Mnsp_err calculator 26c and a dead-zone processor 26hb which receives a μ-sensitivity-dependent value p_fa obtained by passing a μ sensitivity p through the aforesaid filter 26db and the saturation characteristic element 26g.

If an input value to the dead-zone processor 26ha is in a predetermined dead zone in the vicinity of zero, which has been set beforehand, then the dead-zone processor 26ha outputs zero. If the input value to the dead-zone processor 26ha is larger than an upper limit value (>0) of the dead zone, then the dead-zone processor 26ha outputs a value obtained by subtracting the upper limit value from the input value. If the input value to the dead-zone processor 26ha is smaller than a lower limit value (=−upper limit value) of the dead zone, then the dead-zone processor 26ha outputs a value obtained by subtracting the lower limit value from the input value. The same applies to the dead-zone processor 26hb. The dead zones of the dead-zone processors 26ha and 26hb do not have to be the same zones.

According to the present embodiment, the NSP yaw moment filtering estimation error Mnsp_err_fa, which is an output of the dead-zone processor 26ha having received Mnsp_err_f, and the μ-sensitivity-dependent value p_fb, which is an output of the dead-zone processor 26hb having received p_fa, are input in place of Mnsp_err and μ to a frictional coefficient increasing/decreasing manipulated variable determiner 26e. Further, according to the present embodiment, the frictional coefficient increasing/decreasing manipulated variable determiner 26e uses the supplied Mnsp_err_fa and p_fb to determine the frictional coefficient increasing/decreasing manipulated variable Δμ by the same processing as that in the seventh embodiment.

The present embodiment is the same as the aforesaid seventh embodiment except for the aspects described above.

In addition to providing the same advantages as those of the aforesaid seventh embodiment, the present embodiment makes it possible to remove steady unwanted components included in Mnsp_sens, Mnsp_estm, and p attributable to a steady offset or drift in an output of a sensor, such as a yaw rate sensor 13 or a lateral acceleration sensor 15, or an actual road surface bank angle θbank_act by the dead-zone processors 26ha and 26hb. As a result, the accuracy of μ_estm can be further enhanced.

Supplementally, determining the frictional coefficient increasing/decreasing manipulated variable Δμ by using the dead-zone processors 26ha and 26hb as in the present embodiment can be applied also to the first or the second embodiment described above.

In this case, the processing in S122-5-4 (the processing for calculating Δμ when the updating cancellation condition does not apply) may use the phase compensation element 26ea to determine the frictional coefficient increasing/decreasing manipulated variable Δμ as with the aforesaid present embodiment.

Regarding the determination processing related to the updating cancellation condition, the determination processing in S122-5-1 may use Mnsp_sens_f and Mnsp_estm_f in place of Mnsp_sens and Mnsp_estm, respectively.

Further, in the present embodiment, the μ sensitivity p has been passed through both the filter 26db and the saturation characteristic element 26g. However, in the case where the magnitude of the μ sensitivity p is not expected to increase much, then the saturation characteristic element 26g may be omitted.

The present embodiment is provided with the dead-zone processor 26ha to which Mnsp_err_f is input and the dead-zone processor 26hb to which p_fa is input. Alternatively, however, one of the dead-zone processors 26ha and 26hb may be omitted.

In the first to the eighth embodiments described above, the driving/braking force estimated value Fsubx_i_estm of each wheel 2-i and the lateral force estimated value Fsuby_i_estm have been determined and the value of Mnsp_estm has been calculated on the basis of the estimated values in order to determine the NSP yaw moment estimated value Mnsp_estm.

However, the actual NSP yaw moment Mnsp_act generally exhibits high dependency upon the lateral force out of the lateral force and the driving/braking force of each wheel 2-i and low dependency upon the driving/braking force. Hence, the step of determining the driving/braking force estimated value Fsubx_i_estm of each wheel 2-i may be omitted.

In this case, for example, the lateral translational force acting on the center-of-gravity point of a vehicle 1 due to the resultant force of the lateral force estimated values Fsuby_i_estm of the wheels 2-i (i=1, 2, 3, 4) and the moment about a yaw axis acting on the center-of-gravity point of the vehicle 1 due to the resultant force of the lateral force estimated values Fsuby_i_estm may be determined as the total road surface reaction force resultant lateral force estimated value Fgy_total_estm and the total road surface reaction force resultant yaw moment estimated value Mgz_total_estm, respectively. Then, based on the determined Fgy_total_estm and Mgz_total_estm, the NSP yaw moment estimated value Mnsp_estm may be determined according to the aforesaid expression 7-1.

The side slip motion of the vehicle 1 is also highly dependent upon the lateral force out of the lateral force and the driving/braking force of each wheel 2-i. Therefore, when estimating the side slip angle motion state amount of the vehicle 1 by the vehicle motion estimator 24d, only the lateral translational force acting on the center-of-gravity point of the vehicle 1 due to the resultant force of the lateral force estimated values Fsuby_i_estm of the wheels 2-i (i=1, 2, 3, 4) may be regarded as the entire lateral external force (translational force) acting on the center-of-gravity point of the vehicle 1 to estimate the side slip motion state amount of the vehicle 1.

For example, the value of the lateral translational force acting on the center-of-gravity point of the vehicle 1 due to the resultant force of the lateral force estimated values Fsuby_ i_estm of the wheels 2-*i* (i=1, 2, 3, 4) is determined as the total road surface reaction force resultant lateral force estimated values Fgy_total_estm. Then, the calculation of the aforesaid expression 1-14a is performed by using the Fgy_total_estm to determine a vehicle center of gravity side slip velocity change rate estimated value Vgdot_y_estm. Then, the determined Vgdot_y_estm is integrated to determine the vehicle center of gravity side slip velocity estimated value Vgy_estm.

In the first to the eighth embodiments described above, the μ sensitivity p has been calculated according to the aforesaid expression 5-7 in the processing of S122-4 in FIG. 12. Alternatively, however, the μ sensitivity may be calculated by using the aforesaid friction characteristic model.

For example, the same processing as that in S110 and S112 of FIG. 4 is carried out using the value of the road surface frictional coefficient, which is obtained by changing μ_estm_p by a predetermined minute amount dμ set beforehand (=μ_estm_p+dμ), in place of a latest value (a previous value) of the road surface frictional coefficient estimated value μ_estm_p, thereby calculating the total road surface reaction force resultant lateral force estimated values Fgy_total_estm (the lateral component of the total road surface reaction force translational force vector estimated value ↑Fg_total_estm) and the total road surface reaction force yaw moment Mgz_total_estm in the case where it is assumed that the value of the road surface frictional coefficient is μ_estm_p+dμ.

Then, the right side of the aforesaid expression 7-1 is calculated using the obtained Fgy_total_estm and Mgz_total_estm thereby to calculate the NSP yaw moment estimated value (hereinafter referred to as Mnsp_estm2) in the case where it is assumed that the value of the road surface frictional coefficient is μ_estm_p+dμ.

Subsequently, the difference between the calculated NSP yaw moment estimated value Mnsp_estm2 and the NSP yaw moment estimated value Mnsp_estm (the NSP yaw moment estimated value in the case where it is assumed that the value of the road surface frictional coefficient is μ_estm_p) calculated in the aforesaid S122-2 (=Mnsp_estm2−Mnsp_estm) is divided by dμ to calculate the μ sensitivity p.

Further, in the first to the eighth embodiments described above, the NSP yaw moment has been used as the to-be-compared external force in the present invention. However, the to-be-compared external force in the present invention is not limited to the NSP yaw moment. For example, the lateral component of the vehicle 1 (a component in the direction of the Y-axis of a vehicle body coordinate system) of the resultant force of the road surface reaction forces (more specifically, the driving/braking force and the lateral force) of the front wheels 2-1 and 2-2 may be used as the to-be-compared external force.

Further, in the first to the eighth embodiments described above, the value of p calculated by the aforesaid expression 5-7 has been used as the μ sensitivity. Alternatively, however, the value obtained by dividing the value of p by a latest value (a previous value) of the road surface frictional coefficient estimated value μ_estm (the ratio of p relative to the latest value of μ_estm) may be defined as the μ sensitivity, and the defined μ sensitivity may be used in place of p to determine the frictional coefficient increasing/decreasing manipulated variable Δμ.

Further, in the first to the eighth embodiments described above, the frictional coefficient increasing/decreasing manipulated variable Δμ has been determined by the processing in S122-5-4 only in the case where the updating cancellation condition does not apply. Alternatively, however, the frictional coefficient increasing/decreasing manipulated variable Δμ can be determined without determining whether the updating cancellation condition applies.

For example, the processing by the frictional coefficient increasing/decreasing manipulated variable determiner 26*e* omits the processing by the aforesaid gain adjustor. Further, the value of the gain adjustment parameter Kmu_att is always set to 1 or Kmu_att is determined by the processing in S122-5-6 to S122-5-10. In other words, Kmu_att is determined by the processing in S122-5-2 or the processing in S122-5-6 to S122-5-10 regardless of the determination result in the S122-5-1 or S122-5-20. Then, the frictional coefficient increasing/decreasing manipulated variable Δμ may be determined by the processing in S122-5-4 by using the gain adjustment parameter Kmu_att determined as described above.

Further, each of the first to the eighth embodiments described above has been provided with the bank angle estimator 28 and the slope angle estimator 30. However, the processing for estimating the road surface frictional coefficient μ in the first to the eighth embodiments does not need the road surface bank angle estimated value θbank_estm and the road surface slope angle estimated value θslope_estm. Hence, the bank angle estimator 28 and the slope angle estimator 30 may be omitted.

The processing by the vehicle model calculator 24 has used the vehicle motion model based on the assumption that a road surface is horizontal. Alternatively, however, a vehicle motion model taking the road surface bank angle θbank and the road surface slope angle θslope into account may be used. For example, a vehicle motion model that has replaced the aforesaid expressions 1-13 and 1-14 by the following expressions 1-13b and 1-14b, respectively, may be used.

$Fgx\_\text{total}=m*(Vgdot\_x-Vgy*\gamma-g*\sin(\theta \text{ slope}))$   Expression 1-13b $Fgy\_\text{total}=m*(Vgdot\_y+Vgx*\gamma+g*\sin(\theta \text{ bank}))$   Expression 1-14b In this case, for example, the vehicle model calculator 24 can estimate the road surface bank angle θbank and the road surface slope angle θslope while determining the vehicle center of gravity longitudinal velocity estimated value Vgx_estm and the vehicle center of gravity side slip velocity estimated value Vgy_estm as described below.

To be specific, in this case, the vehicle model calculator 24 calculates the vehicle center of gravity longitudinal velocity change rate estimated value Vgdot_x_estm and the vehicle center of gravity side slip velocity change rate estimated value Vgdot_y_estm according to the following expressions 1-13c and 1-14c in place of the aforesaid expressions 1-13a and 1-14a, respectively.

$Vgdot\_x\_estm=Fgx\_\text{total}\_estm/m+Vgy\_estm\_p*\gamma\_estm\_p+g*\sin(\theta \text{ slope}\_estm\_p)$   Expression 1-13c $Vgdot\_y\_estm=Fgy\_\text{total}\_estm/m-Vgx\_estm\_p*\gamma\_estm\_p-g*\sin(\theta \text{ bank}\_estm\_p)$   Expression 1-14c Then, the vehicle model calculator 24 uses the Vgdot_x_estm and Vgdot_y_estm to determine the vehicle center of gravity longitudinal velocity estimated value Vg_estm and the vehicle center of gravity side slip velocity estimated value Vgy_estm, as with the first embodiment described above. The vehicle center of gravity longitudinal velocity estimated value Vgx_estm may be set to agree with the aforesaid selected wheel speed detected value Vw_i_sens select.

Further, the vehicle model calculator 24 calculates the sensed-by-sensor longitudinal acceleration estimated value Accx_sensor_estm, which is an estimated value of acceleration sensed by the longitudinal acceleration sensor 14, and the sensed-by-sensor lateral acceleration estimated value Accy_sensor_estm, which is an estimated value of acceleration sensed by the lateral acceleration sensor 15, according to expressions 1-31 and 1-32 given below.

$$Accx\_\text{sensor\_estm} = Vgdot\_x\_estm - Vgy\_estm\_p * \gamma\_estm\_p - g * \sin(\theta \text{ slope\_estm}\_p) \quad \text{Expression 1-31}$$

$$Accy\_\text{sensor\_estm} = Vgdot\_y\_estm + Vgx\_estm\_p * \gamma\_estm\_p + g * \sin(\theta \text{ bank\_estm}\_p) \quad \text{Expression 1-32}$$

The values of Accx_sensor_estm and Accy_sensor_estm may be determined by calculating the first term of the right side of expression 1-13c and calculating the first term of the right side of expression 1-14c instead of using expressions 1-31 and 1-32, respectively.

Here, Accx_sensor_estm determined as described above means a sensed-by-sensor longitudinal acceleration estimated value determined on the assumption that a previous value (a latest value) θslope_estm_p of a road surface slope angle estimated value is accurate. Similarly, Accy_sensor_estm determined as described above means a sensed-by-sensor lateral acceleration estimated value determined on the assumption that a previous value (a latest value) θbank_estm_p of a road surface bank angle estimated value is accurate.

Accordingly, the difference between the vehicle center of gravity longitudinal acceleration detected value Accx_sens (=sensed-by-sensor longitudinal acceleration detected value) based on an output of the longitudinal acceleration sensor 14 and the sensed-by-sensor longitudinal acceleration estimated value Accx_sensor_estm is considered to be based on an error of θslope_estm_p.

Similarly, the difference between the vehicle center of gravity lateral acceleration detected value Accy_sens (=sensed-by-sensor lateral acceleration detected value) based on an output of the lateral acceleration sensor 15 and the sensed-by-sensor lateral acceleration estimated value Accy_sensor_estm is considered to be based on an error of θbank_estm_p.

Thus, the vehicle model calculator 24 determines a new road surface slope angle estimated value θslope_estm by updating the road surface slope angle estimated value θslope_estm according to a feedback control law on the basis of the difference between the vehicle center of gravity longitudinal acceleration detected value Accx_sens and the sensed-by-sensor longitudinal acceleration estimated value Accx_sensor_estm such that the difference is converged to zero.

Similarly, the vehicle model calculator 24 determines a new road surface bank angle estimated value θbank_estm by updating the value θbank_estm according to the feedback control law on the basis of the difference between the vehicle center of gravity lateral acceleration detected value Accy_sens and the sensed-by-sensor lateral acceleration estimated value Accy_sensor_estm such that the difference is converged to zero.

For example, the vehicle model calculator 24 determines the new road surface slope angle estimated value θslope_estm and the road surface bank angle estimated value θbank angle_estm, respectively, according to expressions 1-33 and 1-34 given below.

$$\theta \text{ slope\_estm} = \theta \text{ slope\_estm}\_p + K\text{slope} * (Accx\_\text{sens} - Accx\_\text{sensor\_estm}) \quad \text{Expression 1-33}$$

$$\theta \text{ bank\_estm} = \theta \text{ bank\_estm}\_p + K\text{bank} * (Accy\_\text{sens} - Accy\_\text{sensor\_estm}) \quad \text{Expression 1-34}$$

Kslope in expression 1-33 and Kbank in expression 1-34 denote predetermined values (proportional gains) set beforehand. In this example, the integral calculation of the difference (Accx_sens−Accx_sensor_estm) and the difference (Accy_sens−Accy_sensor_estm) is performed to calculate θslope_estm and θbank_estm.

Thus, the road surface bank angle θbank and the road surface slope angle θslope can be estimated while determining the vehicle center of gravity longitudinal velocity estimated value Vgx_estm and the vehicle center of gravity side slip velocity estimated value Vgy_estm.

In this case, there is no need to calculate the vehicle center of gravity longitudinal acceleration estimated value Accx_estm or the vehicle center of gravity lateral acceleration estimated value Accy_estm. Further, in this case, the relationship represented by the aforesaid expression 1-14b corresponds to the dynamic relationship related to the vehicle motion/road surface reaction force estimator.

What is claimed is:

1. An apparatus configured to estimate a frictional coefficient of a road surface on which a vehicle is traveling while updating the frictional coefficient, and to control a behavior of a vehicle, comprising:

first estimating means of a to-be-compared external force which defines a predetermined type of external force component acting on the vehicle due to a resultant force of road surface reaction forces acting on each wheel of the vehicle from the road surface as the to-be-compared external force and determines a first estimated value of the to-be-compared external force by using a friction characteristic model indicating a relationship between a slip between the wheel of the vehicle and the road surface and the road surface reaction force, a previous estimated value of the frictional coefficient already determined, and an observed value of a predetermined type of an amount to be observed, which is related to a behavior of the vehicle;

second estimating means of the to-be-compared external force which determines a value of a second external force component balancing out an inertial force corresponding to the to-be-compared external force on the basis of an observed value of a motional state amount of the vehicle that defines the inertial force, which is part of a total inertial force generated by motion of the vehicle, and obtains the determined value of the second external force component as a second estimated value of the to-be-compared external force;

frictional coefficient increasing/decreasing manipulated variable determining means which determines a current increasing/decreasing manipulated variable of an estimated value of the frictional coefficient of the road surface on the basis of a current value of both the first estimated value and the second estimated value;

frictional coefficient estimated value updating means which determines a current estimated value of the frictional coefficient by updating the previous estimated value of the frictional coefficient already determined on the basis of the current increasing/decreasing manipulated variable; and means for controlling a braking force applied to each wheel of the vehicle by a braking mechanism to control the vehicle behavior to be a predetermined desired vehicle behavior based on the current estimated value of the frictional coefficient, wherein the frictional coefficient increasing/decreasing manipulated variable determining means comprises updating cancellation condition determining means which determines whether or not a predetermined updating cancellation condition applies, the predetermined updating cancellation condition including at least a condition that the current value of the first estimated value and the second estimated value have polarities opposite to each other, and determines the current increasing/decreasing manipulated variable on the basis of at least a difference between the current value of the first estimated value and the second estimated value such that the difference therebetween is converged to zero provided that at least a determination result of the updating cancellation condition determining means is negative, and determines either zero or a manipulated variable of a predetermined value for incrementing the estimated value of the frictional coefficient as the current increasing/decreasing manipulated variable in the case where the determination result is affirmative.

2. The apparatus according to claim 1, wherein in the case where the determination result given by the updating cancellation condition determining means has changed from affirmative over to negative, the frictional coefficient increasing/decreasing manipulated variable determining means determines the current increasing/decreasing manipulated variable on the basis of at least the difference, provided that a status wherein the determination result remains negative lasts for predetermined time or more after the changeover, and determines, as the current increasing/decreasing manipulated variable, either zero or a manipulated variable of a predetermined value for incrementing the estimated value of the frictional coefficient until a status in which the determination result is negative lasts for the predetermined time.

3. The apparatus according to claim 1, wherein the updating cancellation condition further includes a condition that at least one of the current value of the first estimated value and the second estimated value falls within a predetermined range that has been preset as a range in the vicinity of zero.

4. The apparatus according to claim 1, comprising:
a μ sensitivity calculating means which determines a value of a μ sensitivity which indicates a ratio of an incremental amount of the to-be-compared external force relative to an incremental amount of the frictional coefficient of the road surface, or the value of the μ sensitivity obtained by dividing the ratio by the value of the frictional coefficient of the road surface,
wherein the updating cancellation condition further includes a condition that the value of the μ sensitivity has a polarity that is opposite to that of at least one of the current value of the first estimated value and the second estimated value.

5. The apparatus according to claim 4, wherein the updating cancellation condition further includes a condition that the value of the μ sensitivity is a value falling within a predetermined range that has been preset as a range in the vicinity of zero.

6. The apparatus according to claim 4, wherein in the case of determining the current increasing/decreasing manipulated variable on the basis of the difference, the frictional coefficient increasing/decreasing manipulated variable determining means determines the current increasing/decreasing manipulated variable on the basis of the difference and the value of the μ sensitivity.

7. The apparatus according to claim 6, wherein in the case of determining the current increasing/decreasing manipulated variable on the basis of the difference, the frictional coefficient increasing/decreasing manipulated variable determining means determines the current increasing/decreasing manipulated variable on the basis of the product of the difference and the μ sensitivity, which is the product of the value of the difference and the value of the μ sensitivity or the product of the difference and the μ sensitivity, which is the product of the difference and a μ-sensitivity-dependent value, which is obtained by passing the value of the μ sensitivity through one or both of a third filter for regulating frequency components and a saturation characteristic element.

8. The apparatus according to claim 7, wherein the frictional coefficient increasing/decreasing manipulated variable determining means determines the current increasing/decreasing manipulated variable on the basis of the product of the difference and the μ sensitivity such that the current increasing/decreasing manipulated variable is proportional to the product of the difference and the μ sensitivity.

9. The apparatus according to claim 1, wherein the to-be-compared external force is a moment about a yaw axis at a neutral steer point of the vehicle.

10. The apparatus according to claim 4, wherein the to-be-compared external force is a moment about a yaw axis at a neutral steer point of the vehicle, and
the μ sensitivity calculating means determines the value of the μ sensitivity by linearly coupling an observed value of a steering angle of a steering control wheel among wheels of the vehicle and an observed value of the yaw rate of the vehicle.

11. The apparatus according to claim 10, wherein the μ sensitivity calculating means sets at least one of a weighting factor applied to the observed value of the steering angle and a weighting factor applied to the observed value of the yaw rate in the linear coupling on the basis of an observed value of a vehicle speed of the vehicle such that the mutual ratio of both weighting factors changes according to the vehicle speed, and uses the set weighting factor to carry out the calculation of the linear coupling.

12. The apparatus according to claim 9, wherein the first estimating means of the to-be-compared external force comprises a vehicle motion/road surface reaction force estimating means which estimates at least a lateral force of the road surface reaction force acting on each wheel while estimating at least a side slip motional state amount of the motional state amount of the vehicle generated by the resultant force of the road surface reaction forces acting on each wheel of the vehicle, and determines the first estimated value of the moment about the yaw axis at the neutral steer point by using the estimated value of the lateral force that has been determined by the vehicle motion/road surface reaction force estimating means, and
the vehicle motion/road surface reaction force estimating means comprises:
means which determines an estimated value of a side slip angle as a slip of each wheel of the vehicle by using the observed value of the amount to be observed and the estimated value of the side slip motional state amount of the vehicle that has already been determined;
means which inputs at least the estimated value of the side slip angle of each wheel and the estimated value of the frictional coefficient of the road surface that has already been determined to the friction characteristic model so as to determine the estimated value of the lateral force acting on each wheel by the friction characteristic model; and means which determines a new estimated value of the side slip motional state amount of the vehicle by using a dynamic relationship between a resultant force of road surface reaction forces including at least the lateral force acting on each wheel and the side slip motional state amount of the vehicle and the estimated value of the lateral force acting on each wheel.

13. The apparatus according to claim 9,
wherein the first estimating means of the to-be-compared external force comprises a vehicle motion/road surface reaction force estimating means which estimates a driving/braking force and a lateral force of a road surface reaction force acting on each wheel while estimating at least the side slip motional state amount of the motional state amounts of the vehicle generated by a resultant force of the road surface reaction forces acting on each wheel of the vehicle, and determines the first estimated value of the moment about the yaw axis at the neutral steer point by using the estimated value of the lateral force determined by the vehicle motion/road surface reaction force estimating means, and
the vehicle motion/road surface reaction force estimating means comprises:
means which determines the estimated values of a slip rate and a side slip angle as a slip of each wheel of the vehicle by using the observed value of the amount to be observed and the estimated value of the side slip motional state amount of the vehicle that has already been determined;
means which inputs at least the estimated values of the slip rate and the side slip angle of each wheel and the estimated value of the frictional coefficient of the road surface that has already been determined to the friction characteristic model so as to determine the estimated values of the driving/braking force and the lateral force acting on each wheel by the friction characteristic model; and
means which determines a new estimated value of the side slip motional state amount of the vehicle by using a dynamic relationship between the resultant force of road surface reaction forces including at least the driving/braking force and the lateral force acting on each wheel and the side slip motional state amount of the vehicle and the estimated value of the lateral force acting on each wheel.

14. The apparatus according to claim 1,
wherein the frictional coefficient increasing/decreasing manipulated variable determining means determines the increasing/decreasing manipulated variable by using a first estimated filtering value obtained by passing the first estimated value through a first filter for regulating frequency components as the new first estimated value, and by using a second estimated filtering value obtained by passing the second estimated value through a second filter for regulating frequency components as the new second estimated value.

15. The apparatus according to claim 14,
wherein in the case where the determination result given by the updating cancellation condition determining means has changed from affirmative over to negative, the frictional coefficient increasing/decreasing manipulated variable determining means determines the increasing/decreasing manipulated variable on the basis of at least the difference, provided that a status wherein the determination result remains negative lasts for predetermined time or more after the changeover, and determines, as the increasing/decreasing manipulated variable, either zero or a manipulated variable of a predetermined value for incrementing the estimated value of the frictional coefficient until a status in which the determination result is negative lasts for the predetermined time.

16. The apparatus according to claim 14,
wherein the updating cancellation condition further includes a condition that at least one of the first estimated filtering value and the second estimated filtering value falls within a predetermined range that has been preset as a range in the vicinity of zero.

17. The apparatus according to claim 14, comprising:
μ sensitivity calculating means which determines the value of a μ sensitivity, which indicates the ratio of an incremental amount of the to-be-compared external force relative to an incremental amount of the frictional coefficient of a road surface, or the value of a μ sensitivity obtained by dividing the ratio by the value of the frictional coefficient of the road surface,
wherein the updating cancellation condition further includes a condition that a μ sensitivity filtering value obtained by passing the value of the μ sensitivity through a third filter for regulating frequency components has a polarity that is opposite to that of at least one of the first estimated filtering value and the second estimated filtering value.

18. The apparatus according to claim 17,
wherein the updating cancellation condition further includes a condition that the μ sensitivity filtering value is a value within a predetermined range that has been preset as a range in the vicinity of zero.

19. The apparatus according to claim 17,
wherein in the case of determining the increasing/decreasing manipulated variable on the basis of the difference, the frictional coefficient increasing/decreasing manipulated variable determining means determines the increasing/decreasing manipulated variable on the basis of the difference and the μ sensitivity filtering value.

20. The apparatus according to claim 19,
wherein in the case of determining the increasing/decreasing manipulated variable on the basis of the difference, the frictional coefficient increasing/decreasing manipulated variable determining means determines the increasing/decreasing manipulated variable on the basis of the product of the difference and the μ sensitivity, which is the product of the value of the difference and the value of the μ sensitivity filtering value or the product of the difference and a μ sensitivity, which is the product of the difference and a μ-sensitivity-dependent value, which is obtained by passing the μ sensitivity filtering value through a saturation characteristic element.

21. The apparatus according to claim 20,
wherein the frictional coefficient frictional coefficient increasing/decreasing manipulated variable determining means determines the increasing/decreasing manipulated variable on the basis of the product of the difference and the μ sensitivity such that the increasing/decreasing manipulated variable is proportional to the product of the difference and the μ sensitivity.

22. The apparatus according to claim 14,
wherein the to-be-compared external force is a moment about a yaw axis at a neutral steer point of a vehicle.

23. The apparatus according to claim 17,
wherein the to-be-compared external force is a moment about a yaw axis at a neutral steer point of a vehicle, and
the μ sensitivity calculating means determines the value of the μ sensitivity by linearly coupling an observed value of a steering angle of a steering control wheel among the wheels of the vehicle and an observed value of the yaw rate of the vehicle.

24. The apparatus according to claim 23,
wherein the μ sensitivity calculating means sets at least one of a weighting factor applied to the observed value of the steering angle and a weighting factor applied to the observed value of the yaw rate in the linear coupling on the basis of the observed value of a vehicle speed such that a mutual ratio of both weighting factors changes according to the vehicle speed of the vehicle, and uses the set weighting factor to carry out the calculation of the linear coupling.

25. The apparatus according to claim 22,
wherein the first estimating means of the to-be-compared external force comprises a vehicle motion/road surface reaction force estimating means which estimates at least a lateral force of a road surface reaction force acting on each wheel while estimating at least a side slip motional state amount of a motional state amount of the vehicle generated by the resultant force of the road surface reaction forces acting on each wheel of the vehicle, and determines the first estimated value of a moment about the yaw axis at the neutral steer point by using the estimated value of the lateral force that has been determined by the vehicle motion/road surface reaction force estimating means, and
the vehicle motion/road surface reaction force estimating means comprises:
means which determines the estimated value of a side slip angle as a slip of each wheel of the vehicle by using the observed value of the amount to be observed and the estimated value of the side slip motional state amount of the vehicle that has already been determined;
means which inputs at least the estimated value of the side slip angle of each wheel and the estimated value of the frictional coefficient of the road surface that has already been determined to the friction characteristic model so as to determine the estimated value of the lateral force acting on each wheel by the friction characteristic model; and
means which determines a new estimated value of the side slip motional state amount of the vehicle by using a dynamic relationship between the resultant force of road surface reaction forces including at least the lateral force acting on each wheel and the side slip motional state amount of the vehicle and the estimated value of the lateral force acting on each wheel.

26. The apparatus according to claim 22,
wherein the first estimating means of the to-be-compared external force comprises a vehicle motion/road surface reaction force estimating means which estimates the driving/braking force and the lateral force of the road surface reaction force acting on each wheel while estimating at least the side slip motional state amount of the motional state amount of the vehicle generated by the resultant force of the road surface reaction forces acting on each wheel of the vehicle, and determines the first estimated value of a moment about the yaw axis at the neutral steer point by using the estimated value of the lateral force that has been determined by the vehicle motion/road surface reaction force estimating means, and
the vehicle motion/road surface reaction force estimating means comprises:
means which determines the estimated values of a slip rate and a side slip angle as a slip of each wheel of the vehicle by using the observed value of the amount to be observed and the estimated value of the side slip motional state amount of the vehicle that has already been determined;
means which inputs at least the estimated values of the slip rate and the side slip angle of each wheel and the estimated value of the frictional coefficient of the road surface that has already been determined to the friction characteristic model so as to determine the estimated values of the driving/braking force and the lateral force acting on each wheel by the friction characteristic model; and
means which determines a new estimated value of the side slip motional state amount of the vehicle by using a dynamic relationship between the resultant force of road surface reaction forces including at least the driving/braking force and the lateral force acting on each wheel and the side slip motional state amount of the vehicle and the estimated value of the lateral force acting on each wheel.

* * * * *